United States Patent
Studebaker et al.

(10) Patent No.: US 9,677,263 B2
(45) Date of Patent: *Jun. 13, 2017

(54) COMPOSITE JOIST FLOOR SYSTEM

(71) Applicant: NUCOR CORPORATION, Charlotte, NC (US)

(72) Inventors: Glenn Wayne Studebaker, Norfolk, NE (US); David Lee Samuelson, Madison, NE (US); Lionel Edward Dayton, Norfolk, NE (US)

(73) Assignee: NUCOR CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,665

(22) Filed: Jan. 21, 2016

(65) Prior Publication Data

US 2016/0208475 A1  Jul. 21, 2016

Related U.S. Application Data

(63) Continuation of application No. 14/487,403, filed on Sep. 16, 2014, now Pat. No. 9,243,404, which is a
(Continued)

(51) Int. Cl.
*E04B 5/00* (2006.01)
*E04B 1/16* (2006.01)
(Continued)

(52) U.S. Cl.
CPC ............ *E04B 1/165* (2013.01); *E04B 1/4157* (2013.01); *E04B 5/17* (2013.01); *E04B 5/18* (2013.01);
(Continued)

(58) Field of Classification Search
CPC ... E04B 1/165; E04B 5/17; E04B 5/18; E04B 1/4157; E04B 5/40; E04B 2005/176;
(Continued)

(56) References Cited

U.S. PATENT DOCUMENTS 2,684,134 A   7/1954  Ruppel
2,703,003 A   3/1955  Ruppel
(Continued)

FOREIGN PATENT DOCUMENTS

CA           2407253         4/2004
WO    WO-2004031507         4/2004
WO    WO-2008116269        10/2008

OTHER PUBLICATIONS

Lauer, Douglas F., "Ultimate Strength Analysis of Partially Composite and Fully Composite Open-Web Steel Joists"; Master's Thesis Paper, Virginia Polytechnic Institute and State University, Blacksburg, VA, Oct. 1994; Digital Library and Archives [Online]: http://scholar.lib.vt.edu/theses/available/etd-06112009-063330/unrestricted/LD5655.V855_1994.L384.pdf; URN: etd-06112009-063330; pp. 1-288.

(Continued)

*Primary Examiner* — Patrick Maestri
(74) *Attorney, Agent, or Firm* — Moore & Van Allen PLLC; Jeffrey R. Gray

(57) ABSTRACT

Embodiments of the present invention provide systems for connecting a flooring system to a vertical wall. In one embodiment the building structure includes a floor comprising a cementitious slab and a wall supporting at least a portion of the cementitious slab. A plurality of stand-off fasteners extend from the top of the wall into the cementitious slab and are configured to transfer forces between the cementitious slab and the wall. The stand-off fasteners comprise a lower portion and an upper stand-off portion. The lower portion is operatively coupled to the top of the wall, and the upper stand-off portion extends above the top of the wall and is encapsulated within the cementitious slab. In some embodiments, at least a portion of the lower portion is (Continued)

heat treated to a higher degree of hardness relative to the remainder of the stand-off screw.

20 Claims, 37 Drawing Sheets

Related U.S. Application Data continuation of application No. 13/862,073, filed on Apr. 12, 2013, now Pat. No. 8,950,143, which is a continuation of application No. 13/538,491, filed on Jun. 29, 2012, now abandoned, which is a continuation of application No. 12/019,329, filed on Jan. 24, 2008, now Pat. No. 8,230,657.

(51) Int. Cl.

| | |
|---|---|
| F16B 5/02 | (2006.01) |
| F16B 25/00 | (2006.01) |
| F16B 25/10 | (2006.01) |
| F16B 33/06 | (2006.01) |
| F16B 35/04 | (2006.01) |
| E04B 5/40 | (2006.01) |
| E04B 1/41 | (2006.01) |
| E04C 3/08 | (2006.01) |
| E04B 5/17 | (2006.01) |
| E04B 5/18 | (2006.01) |
| E04B 5/32 | (2006.01) |
| E04C 3/04 | (2006.01) |

(52) U.S. Cl.
CPC .......... *E04B 5/40* (2013.01); *E04C 3/08* (2013.01); *F16B 5/0275* (2013.01); *F16B 25/0031* (2013.01); *F16B 25/0094* (2013.01); *F16B 25/103* (2013.01); *F16B 33/06* (2013.01); *F16B 35/048* (2013.01); *E04B 2005/173* (2013.01); *E04B 2005/176* (2013.01); *E04B 2005/322* (2013.01); *E04B 2103/02* (2013.01); *E04B 2103/06* (2013.01); *E04C 2003/0491* (2013.01)

(58) Field of Classification Search
CPC .......... E04B 2005/173; E04B 2103/06; E04B 2005/322; E04B 2103/02; E04C 3/08; E04C 2003/0491; F16B 35/048; F16B 33/06; F16B 25/0031; F16B 25/103; F16B 5/0275; F16B 25/0094
See application file for complete search history.

(56) References Cited

U.S. PATENT DOCUMENTS

| | | | |
|---|---|---|---|
| 3,307,304 A | 3/1967 | Klausner | |
| 3,363,379 A | 1/1968 | Curran | |
| 3,392,499 A | 7/1968 | McManus | |
| 3,394,514 A | 7/1968 | Lindner | |
| 3,397,497 A | 8/1968 | Shea et al. | |
| 3,457,818 A | 7/1969 | McManus | |
| 3,527,007 A | 9/1970 | McManus | |
| 3,600,868 A | 8/1971 | Wilson, Jr. et al. | |
| 3,624,980 A | 12/1971 | McManus | |
| 3,683,580 A * | 8/1972 | McManus | E04B 1/185 52/334 |
| 3,719,015 A | 3/1973 | Misawa | |
| 3,728,835 A | 4/1973 | McManus | |
| 3,902,350 A | 9/1975 | McManus | |
| 3,979,868 A | 9/1976 | Butts et al. | |
| 4,003,179 A | 1/1977 | Gilb | |
| 4,056,908 A | 11/1977 | McManus | |
| 4,186,535 A | 2/1980 | Morton | |
| 4,189,883 A | 2/1980 | McManus | |
| 4,259,822 A * | 4/1981 | McManus | E04B 1/164 52/334 |
| 4,285,173 A | 8/1981 | Grearson et al. | |
| 4,295,310 A | 10/1981 | McManus | |
| 4,333,280 A | 6/1982 | Morton | |
| 4,432,178 A | 2/1984 | Taft | |
| 4,454,695 A | 6/1984 | Person | |
| 4,476,662 A | 10/1984 | Fisher | |
| 4,507,901 A | 4/1985 | Carroll | |
| 4,527,372 A | 7/1985 | Ryan | |
| 4,566,240 A | 1/1986 | Schilger | |
| 4,587,782 A | 5/1986 | Shubow | |
| 4,592,184 A | 6/1986 | Person et al. | |
| 4,593,507 A | 6/1986 | Hartman | |
| 4,597,233 A | 7/1986 | Rongoe | |
| 4,619,090 A | 10/1986 | McManus | |
| 4,653,237 A | 3/1987 | Taft | |
| 4,700,519 A | 10/1987 | Person et al. | |
| 4,726,159 A | 2/1988 | Stohs | |
| 4,741,138 A * | 5/1988 | Rongoe, Jr. | E04B 1/164 52/334 |
| 4,802,786 A | 2/1989 | Yauger et al. | |
| 4,845,908 A | 7/1989 | Stohs | |
| 5,054,755 A | 10/1991 | Hawkes | |
| 5,383,320 A | 1/1995 | Sorton | |
| 5,544,464 A | 8/1996 | Dutil | |
| 5,605,423 A * | 2/1997 | Janusz | E04B 5/29 411/387.6 |
| 5,657,596 A | 8/1997 | Powers, III | |
| 5,755,542 A | 5/1998 | Janusz et al. | |
| 5,761,873 A | 6/1998 | Slater | |
| 5,836,131 A | 11/1998 | Viola et al. | |
| 5,836,133 A | 11/1998 | Bergeron et al. | |
| 5,941,035 A * | 8/1999 | Purse | E04B 5/29 52/252 |
| 6,064,755 A | 5/2000 | Some | |
| 6,230,467 B1 | 5/2001 | Leek | |
| 6,357,191 B1 | 3/2002 | Ault et al. | |
| 6,585,141 B2 | 7/2003 | Goss et al. | |
| 6,622,569 B2 | 9/2003 | Mallick et al. | |
| 6,668,510 B2 | 12/2003 | McManus | |
| 6,698,148 B1 | 3/2004 | Manna et al. | |
| 6,761,005 B1 | 7/2004 | Daudet et al. | |
| 6,993,881 B1 | 2/2006 | Ruble et al. | |
| 7,013,613 B1 | 3/2006 | Boellner et al. | |
| 7,017,314 B2 | 3/2006 | Pace | |
| 7,028,435 B2 | 4/2006 | Walker et al. | |
| 7,389,620 B1 | 6/2008 | McManus | |
| 7,562,500 B2 * | 7/2009 | Siu | E04B 1/24 52/236.3 |
| 8,230,657 B2 | 7/2012 | Studebaker et al. | |
| 2003/0093961 A1 | 5/2003 | Grossman | |
| 2005/0188638 A1 | 9/2005 | Pace | |
| 2006/0236815 A1 | 10/2006 | Beecherl et al. | |

OTHER PUBLICATIONS

Mujagic et al., "Drilled Standoff Screws for Shear Connection in Light Composite Steel-Concrete Trusses"; Journal of Constructional Steel Research, vol. 63, No. 10, Oct. 2007, pp. 1404-1414.
Pour Stop Selection Table, PDF document, Marlyn Steel Decks, Inc., Nov. 4, 2006. URL:http://marlynsteel.com/docs/composite_pourstop.pdf.
Canadian Office Action issued in Canadian Patent Application No. 2,650,688 dated Jul. 9, 2010.
Canadian Office Action issued in Canadian Patent Application No. 2,650,688 dated Mar. 28, 2011.
Canadian Office Action issued in Canadian Patent Application No. 2,650,688 dated Jan. 20, 2012.
Canadian Office Action issued in Canadian Patent Application No. 2,769,662 dated Apr. 10, 2012.
Mexican Office Action issued in Mexican Patent Application No. MX/a/2009/000891 dated Oct. 28, 2014.

* cited by examiner

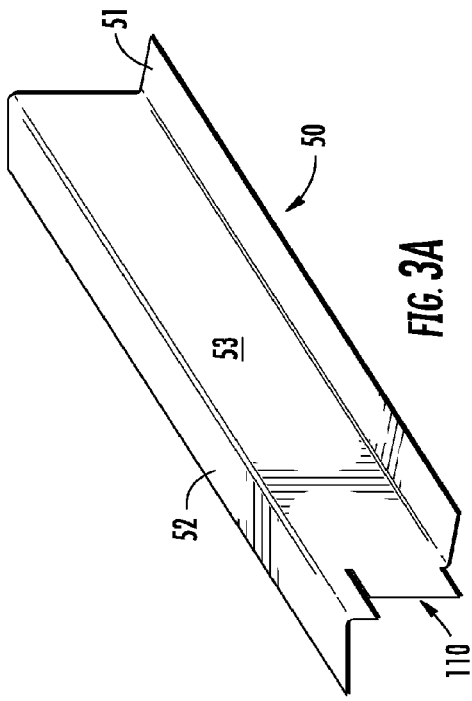
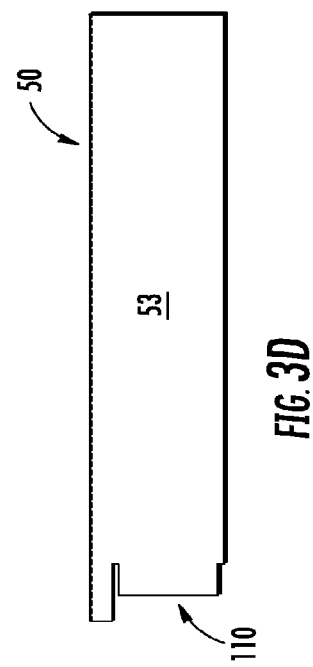
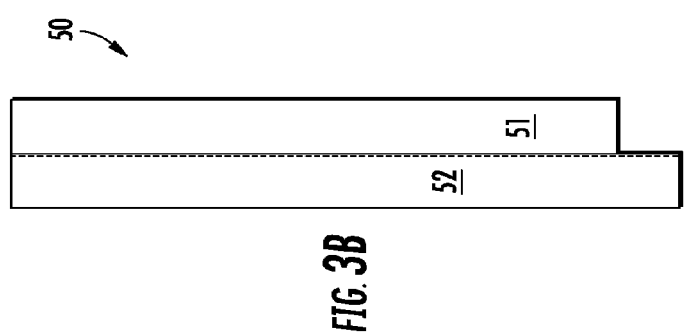
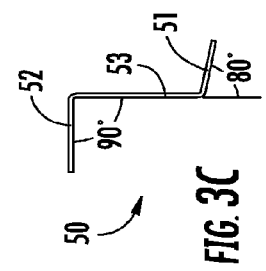
FIG. 3A
FIG. 3D
FIG. 3B
FIG. 3C

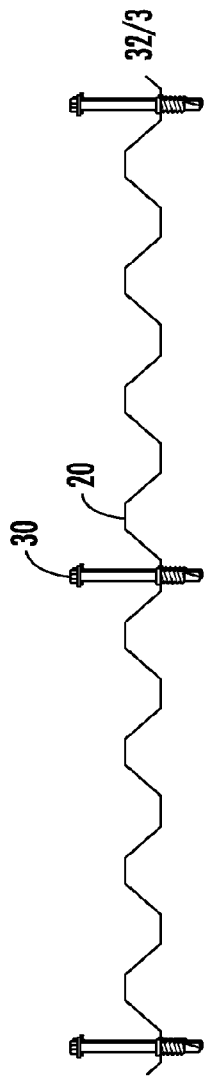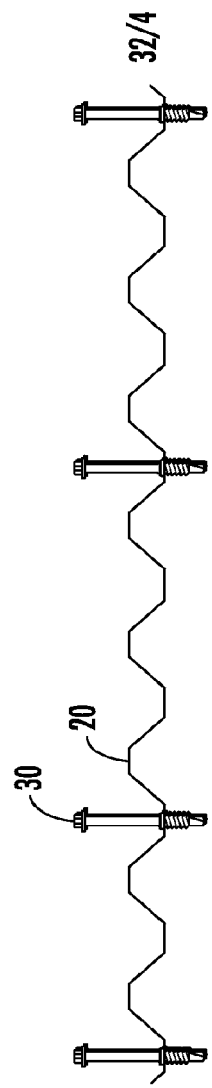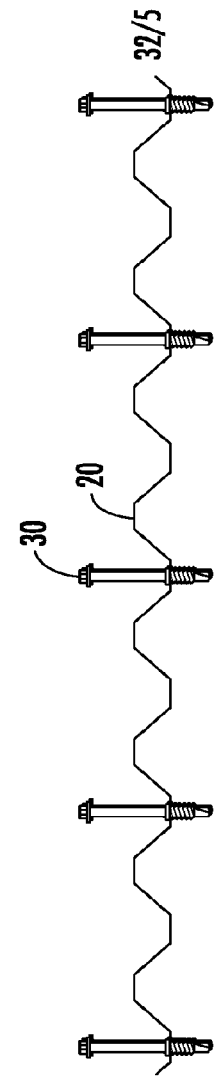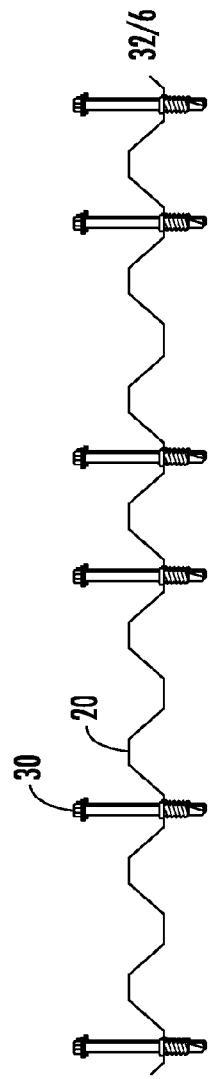

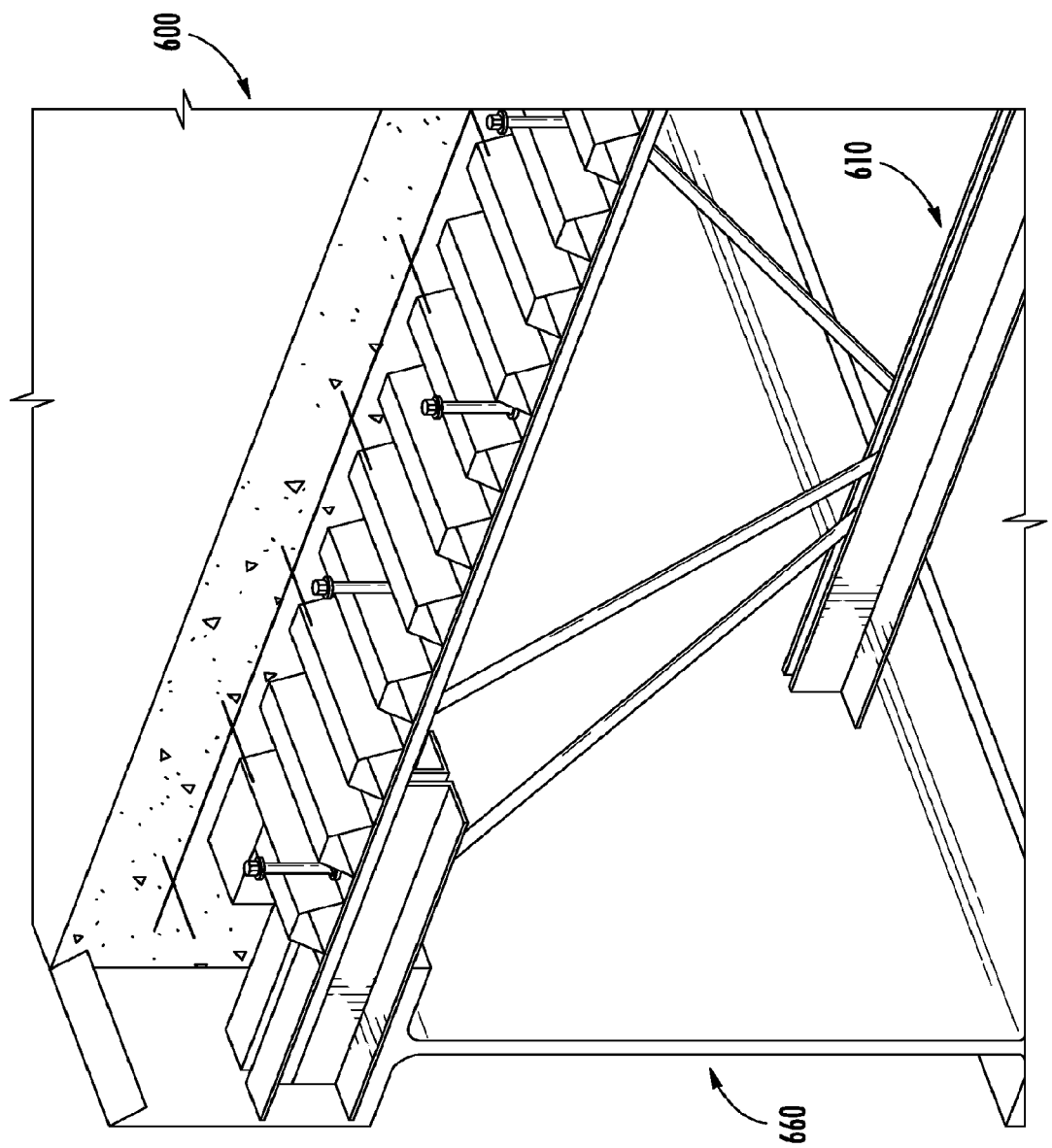

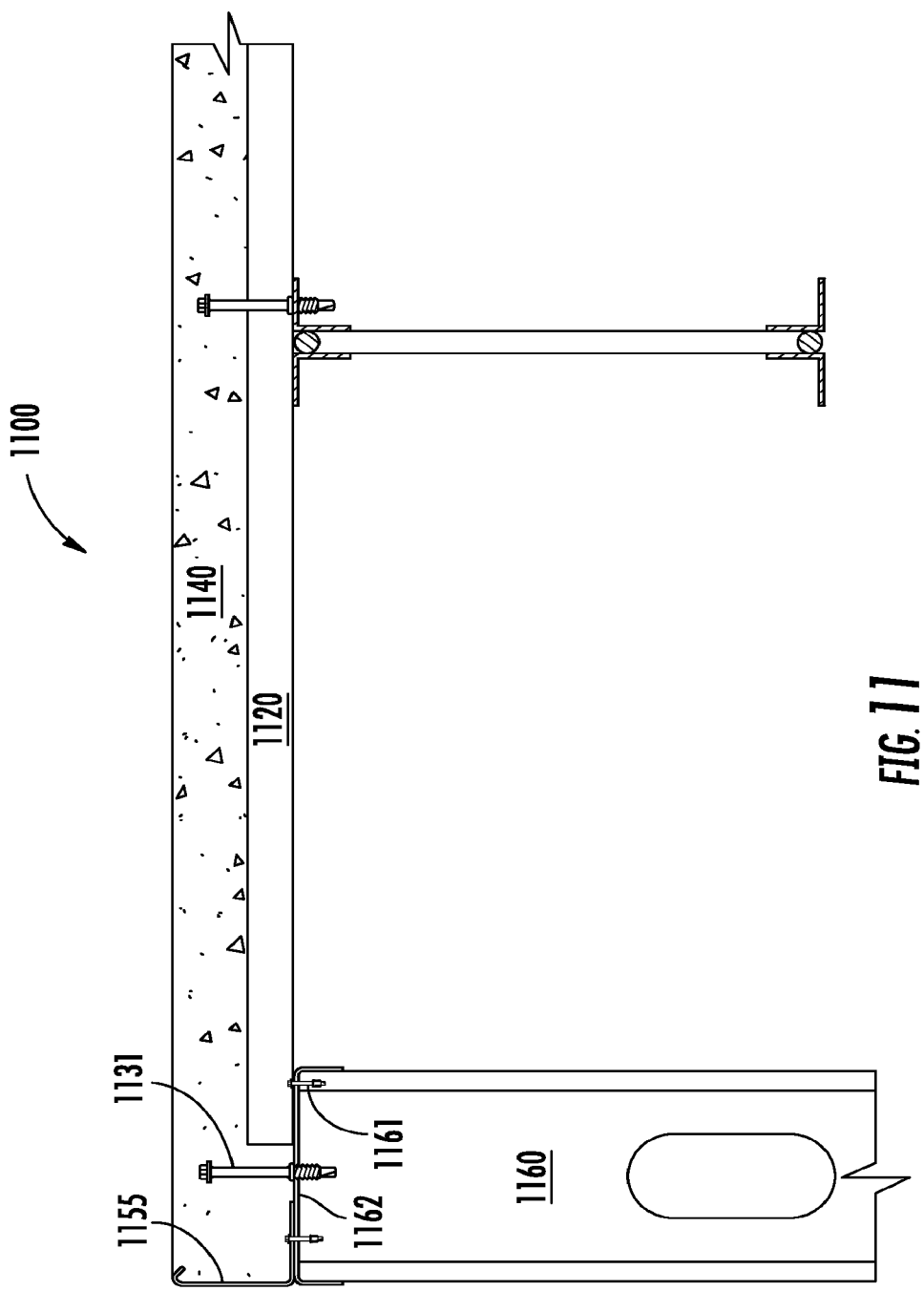

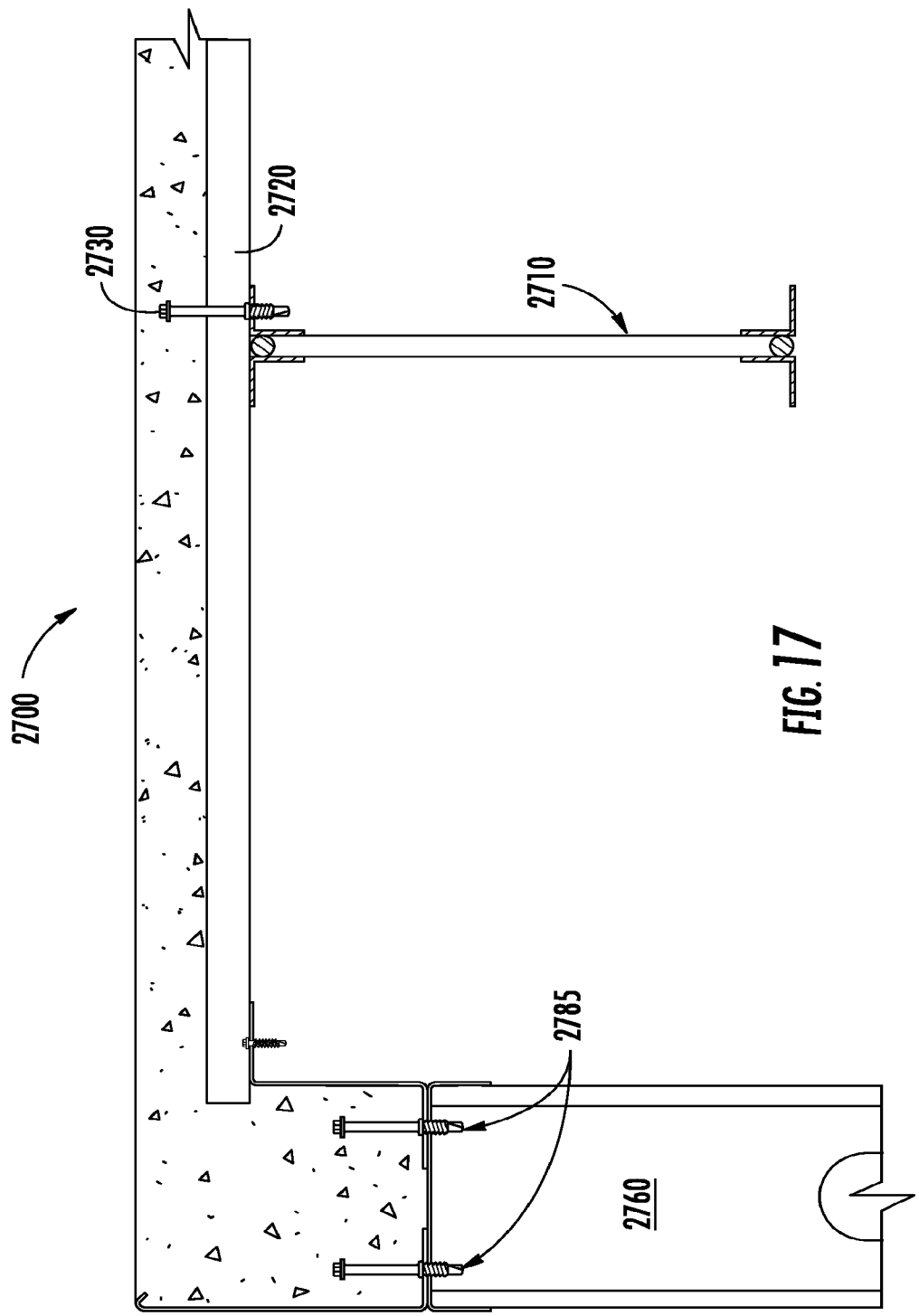

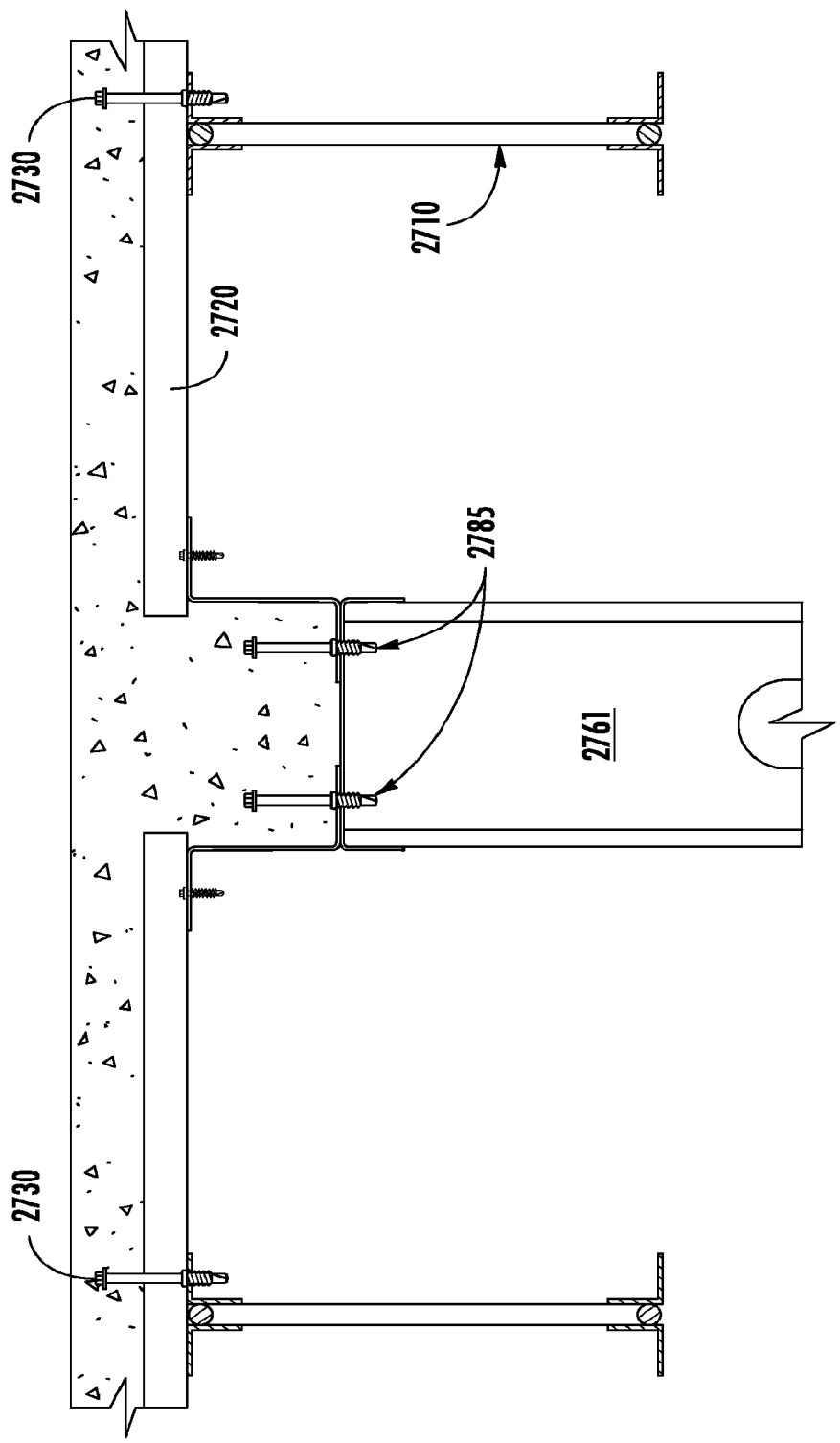

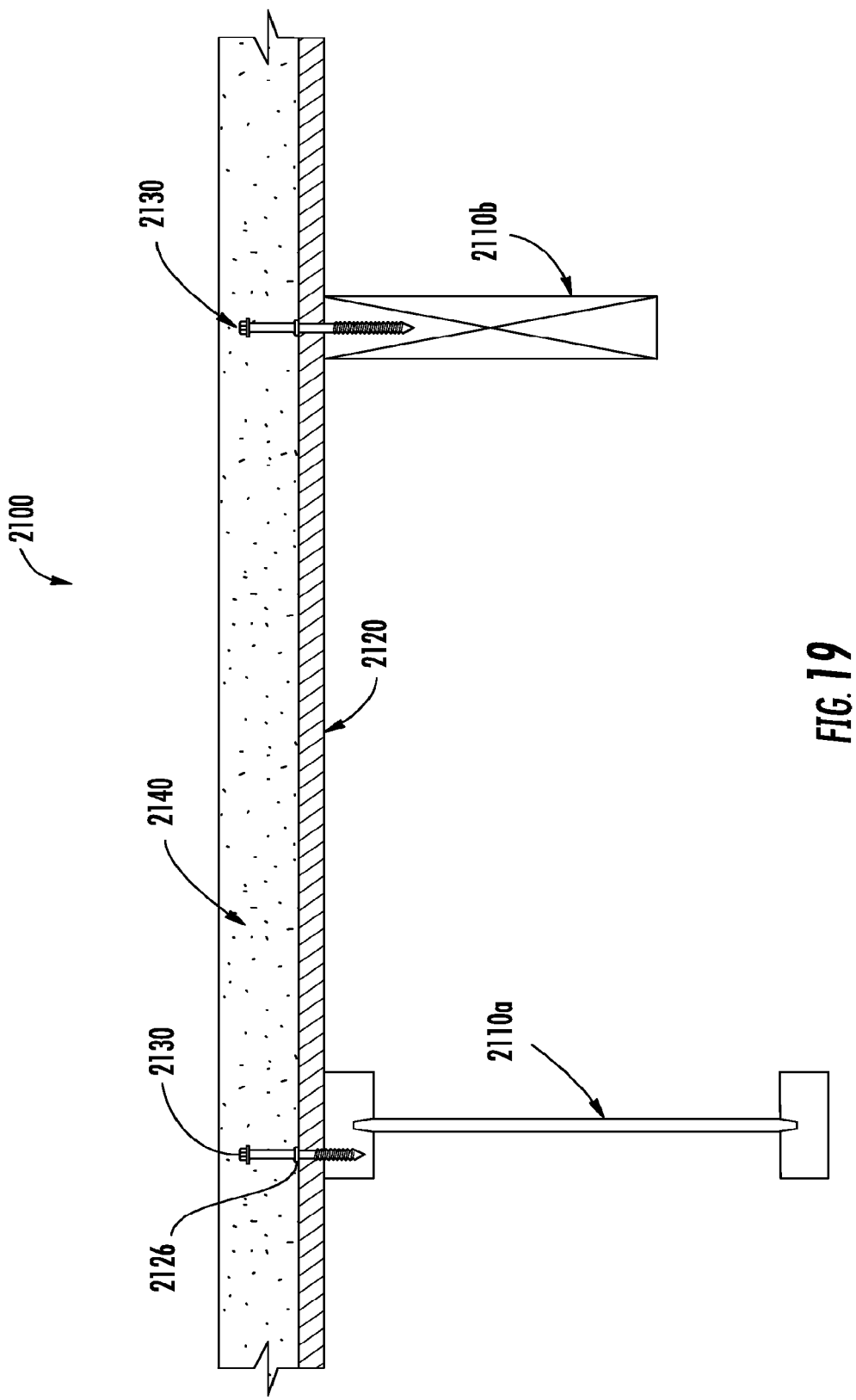

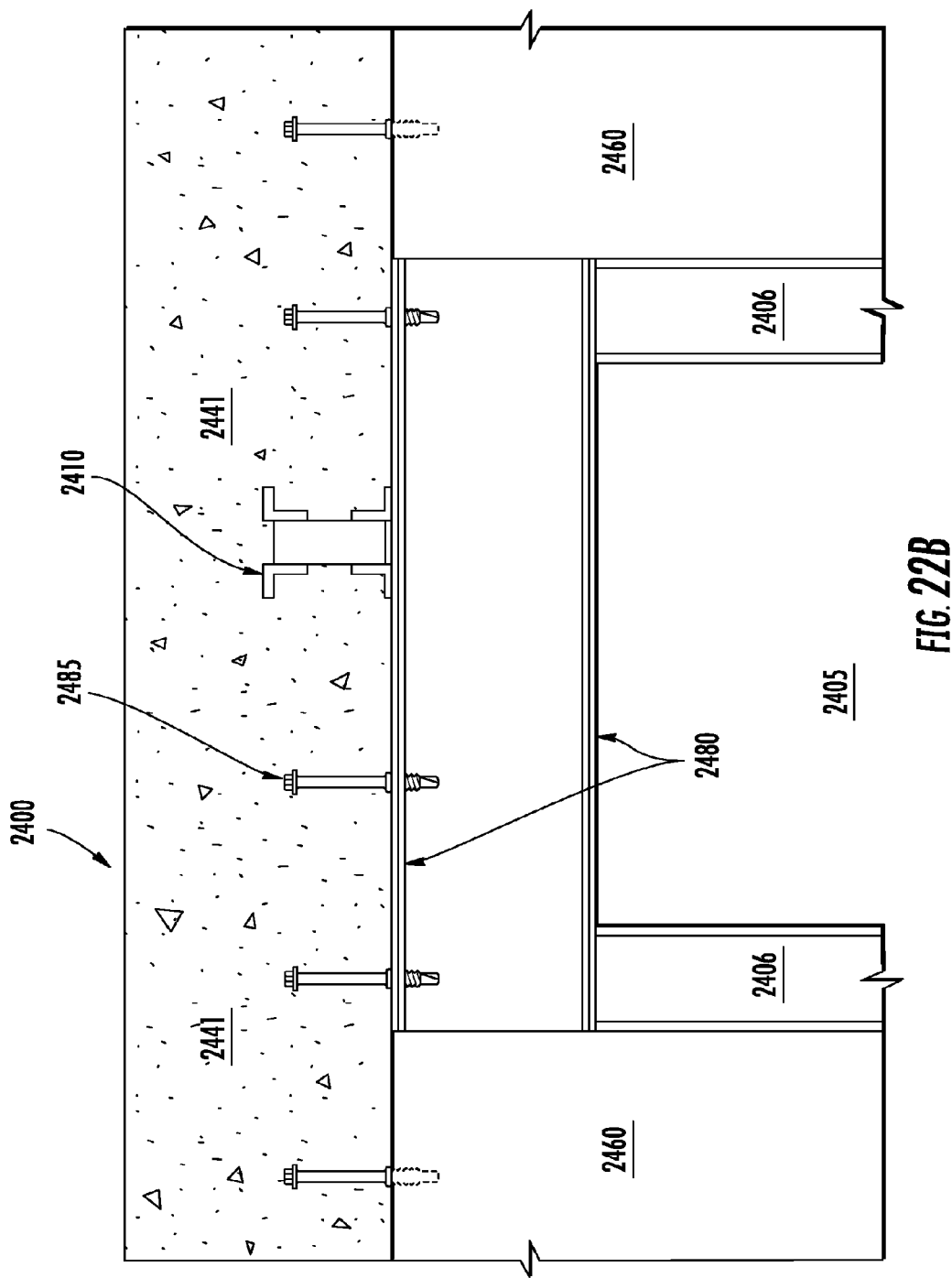

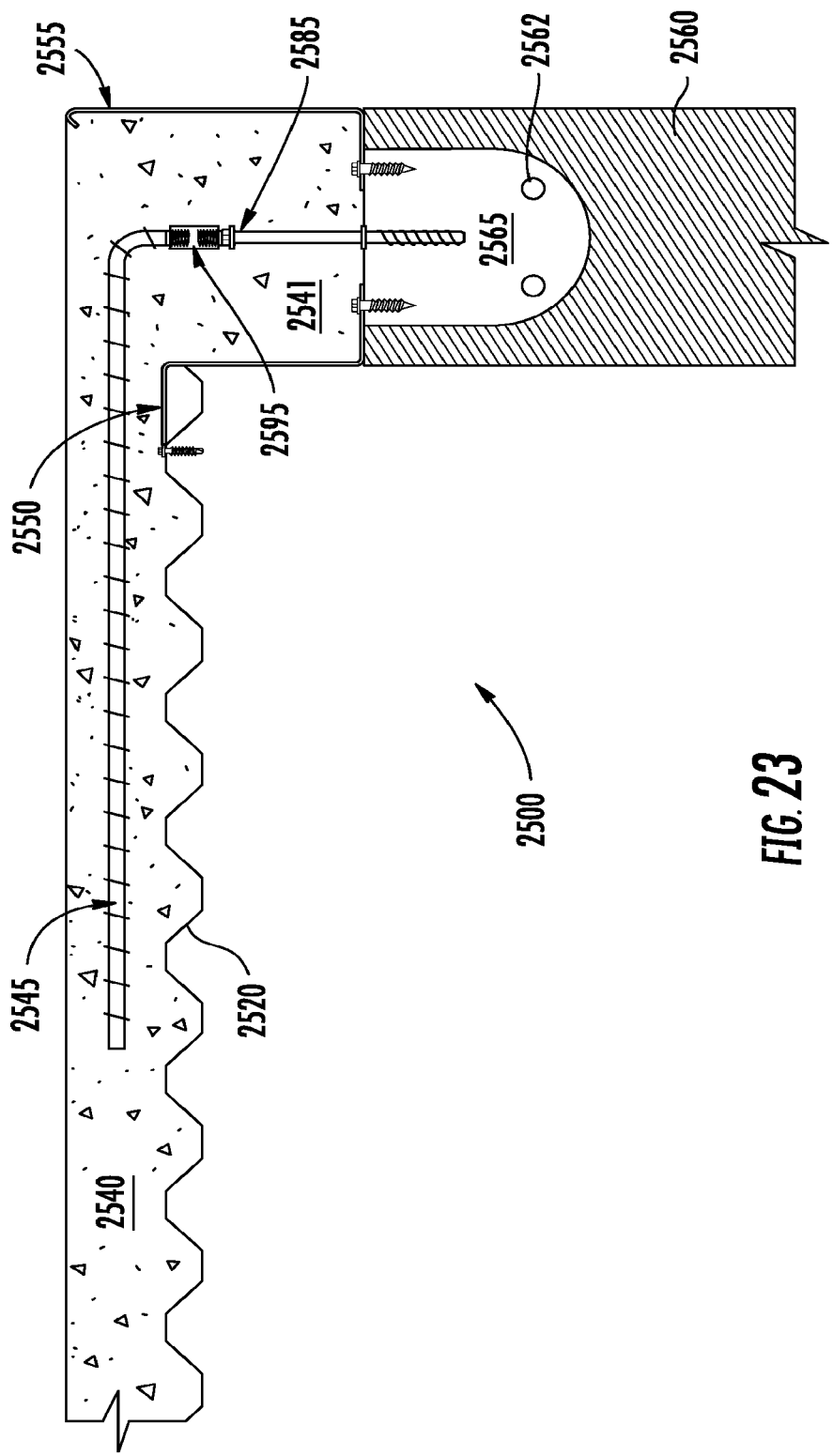

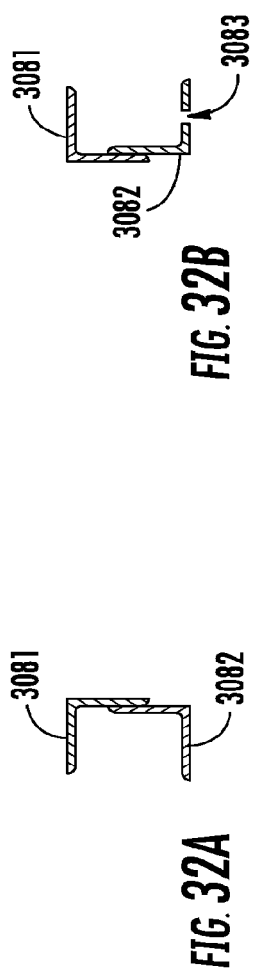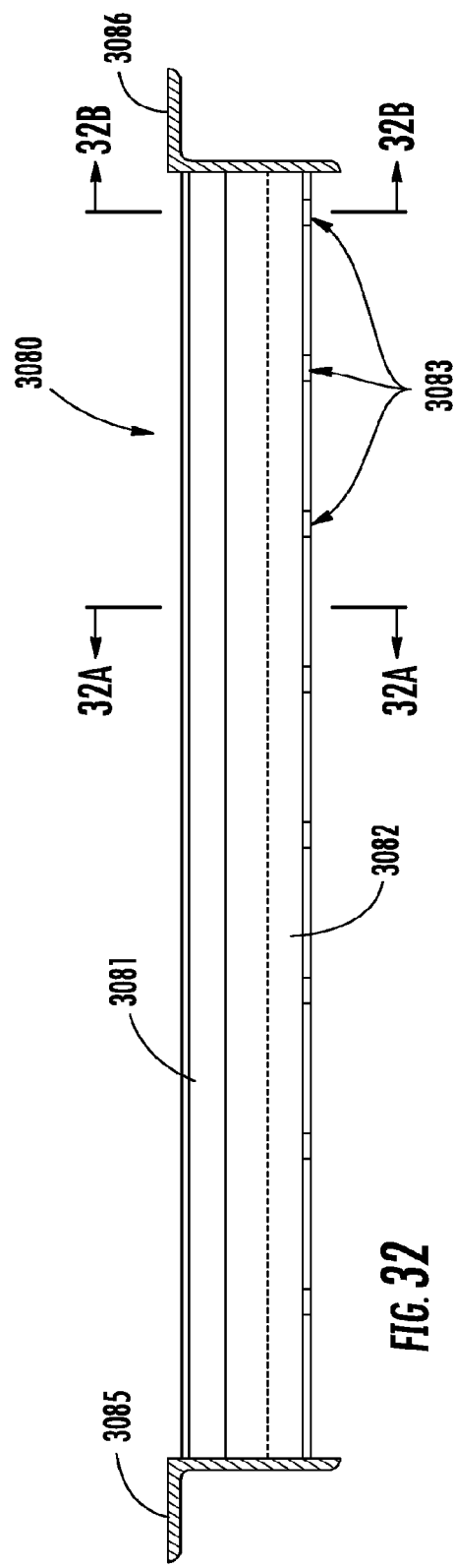

COMPOSITE JOIST FLOOR SYSTEM

CROSS REFERENCE TO RELATED APPLICATIONS

This application is a continuation of, and claims priority to, co-pending U.S. patent application Ser. No. 14/487,403, filed on Sep. 16, 2014 and entitled "COMPOSTE JOIST FLOOR SYSTEM," which is a continuation of U.S. patent application Ser. No. 13/862,073, filed on Apr. 12, 2013 and entitled "COMPOSTE JOIST FLOOR SYSTEM" which has issued into U.S. Pat. No. 8,950,143, which is a continuation of U.S. patent application Ser. No. 13/538,491, filed on Jun. 29, 2012 and entitled "COMPOSITE JOIST FLOOR SYSTEM," now abandoned, which is a continuation of U.S. patent application Ser. No. 12/019,329, filed on Jan. 24, 2008, and entitled "COMPOSITE JOIST FLOOR SYSTEM" which has issued into U.S. Pat. No. 8,230,657, the entire contents of each application and/or patent are incorporated by reference herein.

FIELD

This invention relates to the field of structural systems for buildings. More particularly, embodiments of the invention relate to improved composite joist floor systems.

BACKGROUND

Large scale, multi-story buildings are typically constructed of steel and concrete. Floors in such buildings may be constructed by spanning wide flange beams or steel joists between structural supports and installing metal decking across the tops of such beams or joists. The decking forms a horizontal surface onto which concrete is placed. Generally, the bottoms of the beams or joists form the framework from which ceilings are hung. The composite construction is typically achieved by using welded shear studs or partial extension of the joist top chord above the form or metal deck into the concrete slab. Flooring system designs must also be mindful of fire safety, acoustics, and vibration considerations.

While joist and deck floor systems have been designed in the past to address one or more of these issues individually, these prior designs are not optimized and integrated with the portions of the support structure of a building to provide an integrated design to address the above mentioned issues in a systematic manner.

BRIEF SUMMARY

Embodiments of the present invention address the above needs and/or achieve other advantages by providing an improved and integrated composite joist floor system. One aspect of the improved composite joist floor system includes joists having ends supported by varying supporting members. Corrugated steel decking is positioned over the joists such that the corrugations are substantially perpendicular to the joists. Self-drilling, self-tapping, stand-off screws are spaced along the length of the joist, aligned with the deck corrugations. These stand-off screws provide the required shear transfer between the joist and concrete slab to form a composite floor system. The placed concrete encapsulates the upper non-threaded shank portions of the self-drilling, self-tapping, stand-off screws and the end of the joists.

After the concrete has cured, the resultant system comprised of steel joists, steel decking, stand-off screws, and concrete, act together to form a composite system with greater load carrying capacity and less vertical deflection than a non-composite floor system. The self-drilling, self-tapping stand-off screws connect the joist upper chords to the concrete slab allowing the joist and concrete slab to act as a unit, by transferring shear between the two joined components. The concrete slab then effectively behaves as the upper chord of the composite system with a much larger load carrying capacity than the joist upper chord alone.

To provide additional continuity, fire protection, and stiffness at joist ends and at slab edge locations, a combination of z-shaped closures and/or pour stops provide forming for the concrete. A z-shaped closure is provided having a vertical face, an upper horizontal flange, and a lower horizontal flange. The upper horizontal flange extends over a portion of the corrugated steel decking and the lower horizontal flange is supported by the steel joist supporting member. The vertical face extends between the upper and lower horizontal flanges and has a cutout so that at least a portion of the joist end passes through the vertical face. At exterior conditions, break formed pour stops are supplied. Concrete is then placed over the corrugated steel decking and into a channel formed at least partially by the z-shaped closure and/or the pour stop.

In one embodiment, the stand-off screw comprises a first threaded portion having first and second ends and a first helical thread. The stand-off screw may also include a stand-off portion extending from the second end of the first threaded portion, the stand-off portion having a first end and a second end. The first end of the stand-off portion is proximate to the second end of the first threaded portion. The stand-off screw may further include a driving section located proximate to the second end of the stand-off portion. The driving section is configured to allow engagement between the stand-off screw and a tool for rotating the stand-off screw so that the first threaded portion of the stand-off screw can be drilled into a support member of the building structure. The stand-off screw may also include a second threaded portion comprising a second helical thread. The second threaded portion is generally located proximate to the second end of the stand-off portion and configured to be used to couple the stand-off screw to an extension member.

In general, the decking of the composite floor system comprises corrugated steel decking where the corrugations of the corrugated steel decking define a plurality of peaks and valleys. In some embodiments, the stand-off fasteners are located in the valleys of the corrugated steel decking, and adjacent stand-off fasteners along a joist are separated by at least one valley that does not have a stand-off fastener located therein on that joist. In other embodiments, at least two adjacent stand-off fasteners are located in the same valley of the corrugated steel decking on that joist.

In some embodiments of the composite floor system, the joist may include a wood member and the lower portion of each stand-off fastener may comprise a wood screw portion having a helical wood screw thread for drilling into the wood member. In some embodiments, the decking has pre-formed holes for installing the stand-off fasteners therethrough.

A welded wire fabric may also be located over the decking and encapsulated within the cementitious slab. In some embodiments, any 32-inch span of the corrugated steel decking over a joist has between three and nine stand-off fasteners located therein.

In some embodiments, the supporting member that supports the joist is comprised of a metal stud, a wood stud, a masonry wall, a concrete wall, a metal beam, or a metal truss that extends generally perpendicular to the joist. A self-drilling, self-tapping stand-off fastener may, in accordance with one embodiment of the present invention, be drilled into the end of the joist's upper chord above the supporting member and beyond the end of the corrugated steel decking.

The joist of the composite floor system may comprise an open web which may be comprised of one or more rods having a generally circular cross-section. For example, the web may include a rod bent into a generally zigzag or sinusoidal pattern such that the rod extends from one chord to the other chord and then back again.

In some instances, the composite floor system may include a self-tapping screw drilled through the generally horizontal upper flange of the z-shaped closure into a peak of the corrugated steel decking. The composite floor system may also include a self-tapping screw drilled through the generally horizontal lower flange of the z-shaped closure into the supporting member or a distribution track or other distribution member positioned between the lower flange and the supporting member.

In some embodiments, the joist's upper chord, lower chord, and shoe are each comprised of a pair of angles. For example, the upper chord, lower chord, and shoe may be each made up of a pair of angles spaced apart by rod-shaped members of the web and/or by a rod-shaped end diagonal member.

The composite floor system may further comprise a pour stop having a generally horizontal flange and a generally vertical face. The horizontal flange of the floor stop is generally positioned adjacent to the top of the supporting member and the vertical face generally extends vertically opposite the vertical face of the z-shaped closure. In this way, the pour stop forms at least a portion of the boundary of the cementitious channel formed over the supporting member. In some embodiments, the pour stop further comprises a lip extending from the top of the vertical face diagonally toward the corrugated steel decking, the lip being substantially encapsulated within the cementitious material.

The features, functions, and advantages that have been discussed may be achieved independently in various embodiments of the present invention or may be combined in yet other embodiments, further details of which can be seen with reference to the following description and drawings but are not limited to only these applications shown.

BRIEF DESCRIPTION OF THE SEVERAL VIEWS OF THE DRAWINGS

Figure 1:
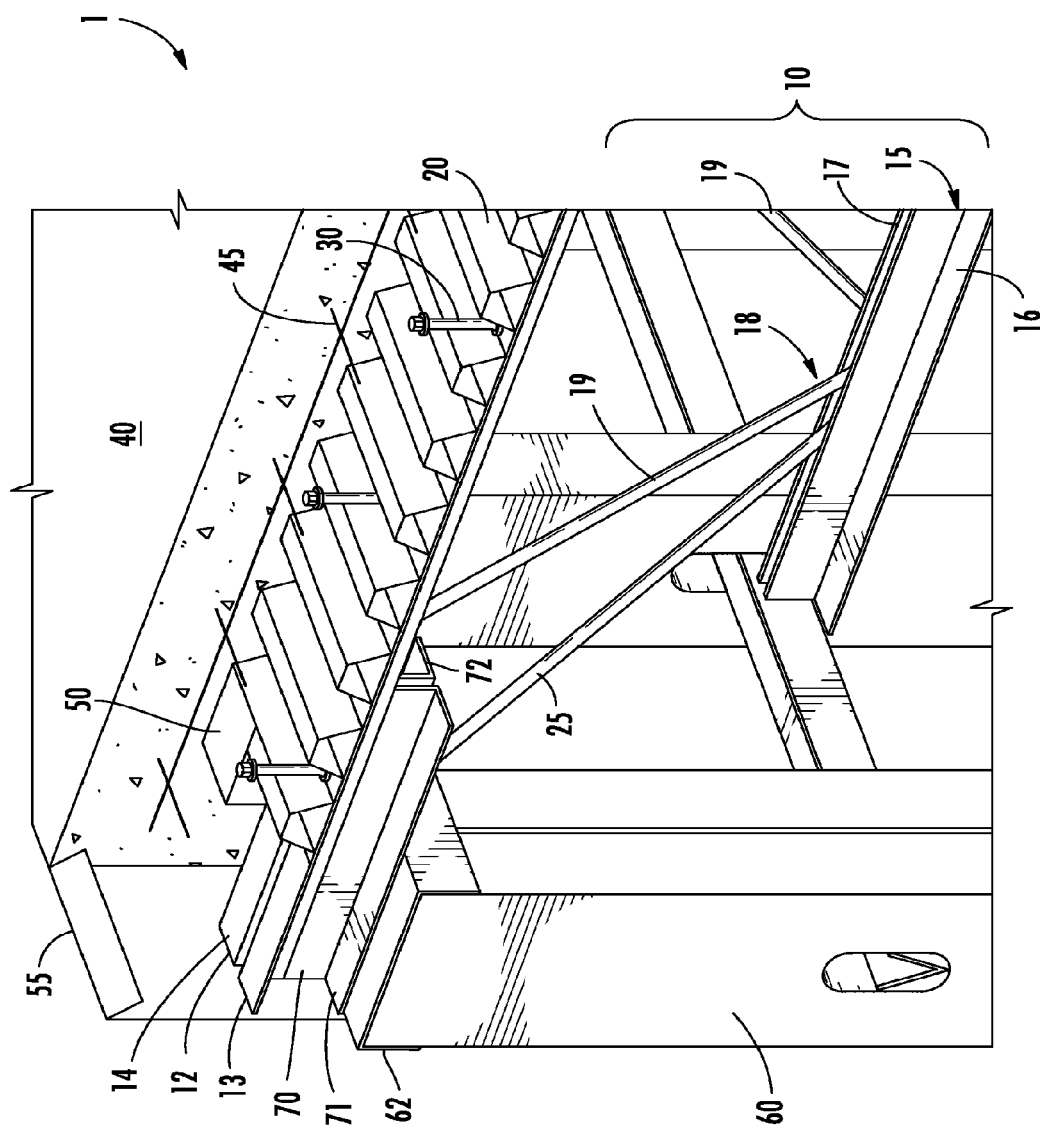
Figure 2A:
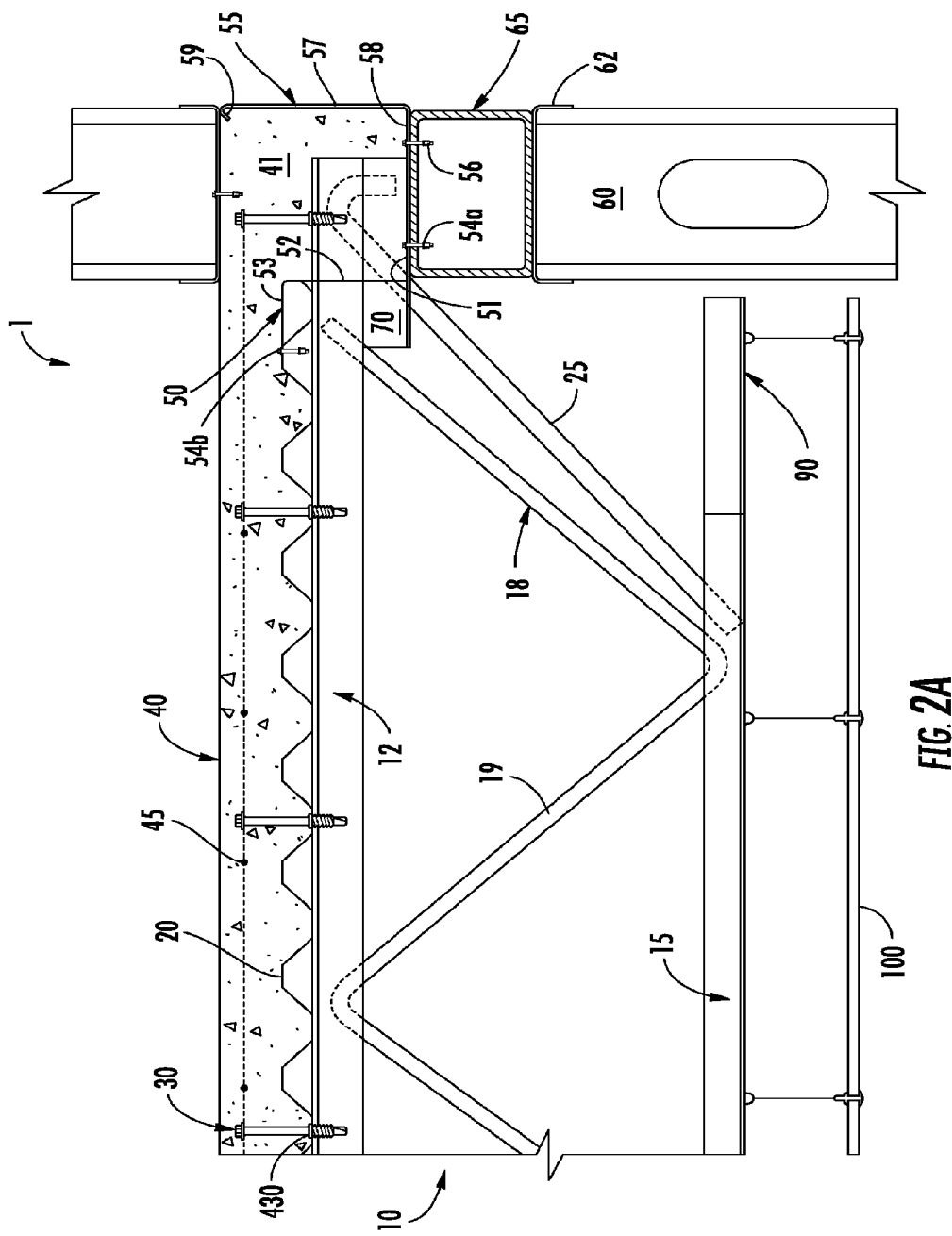
Figure 2B:
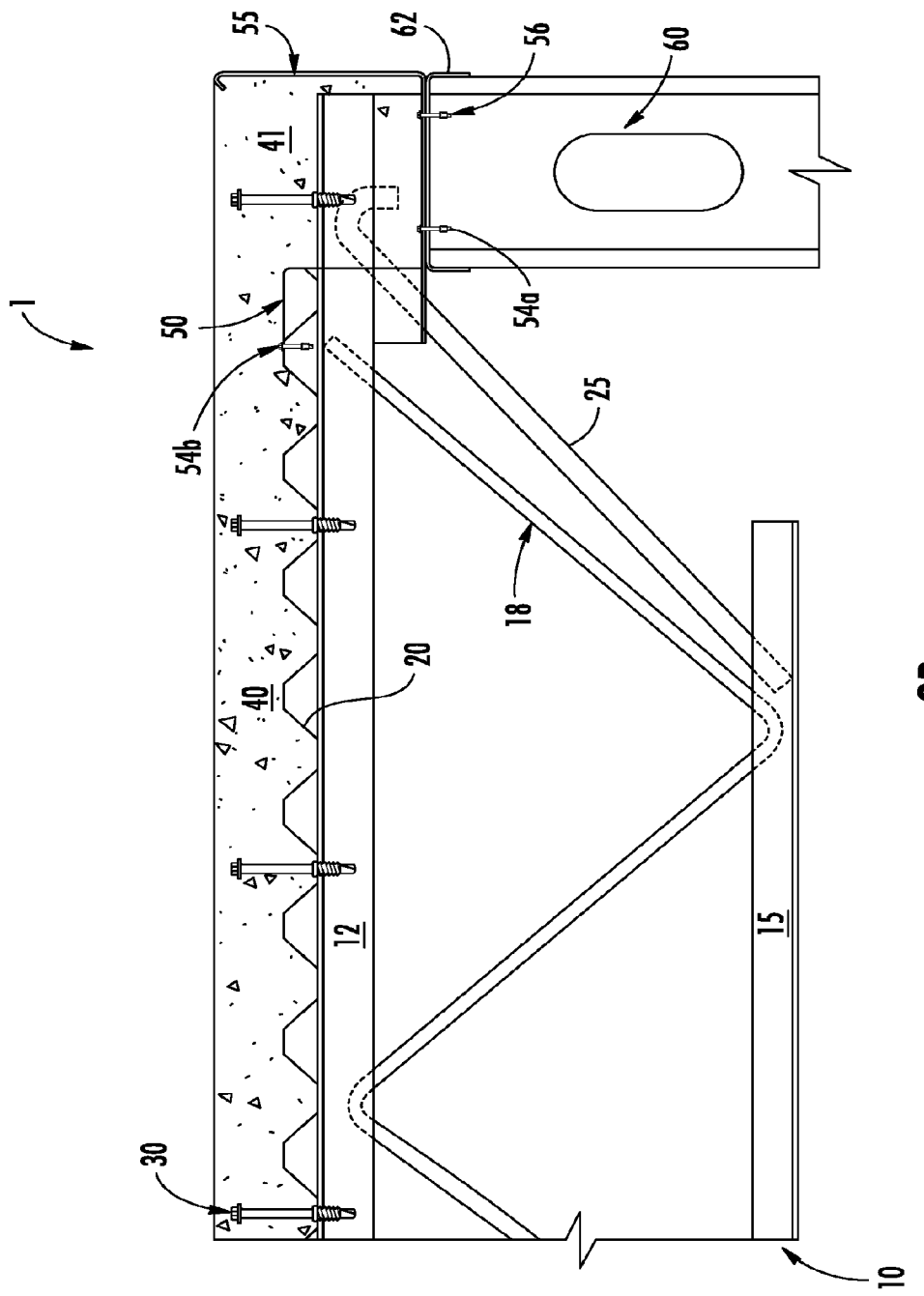
Figure 4A:
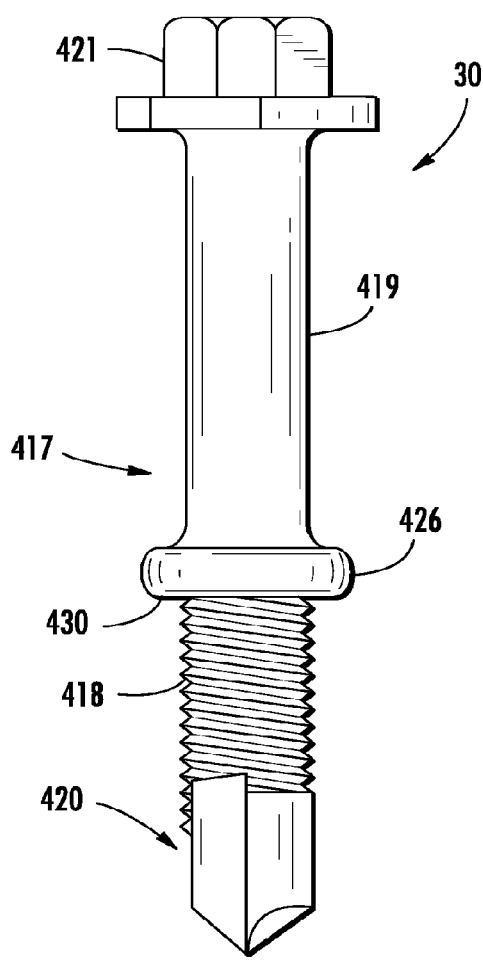
Figure 4B:
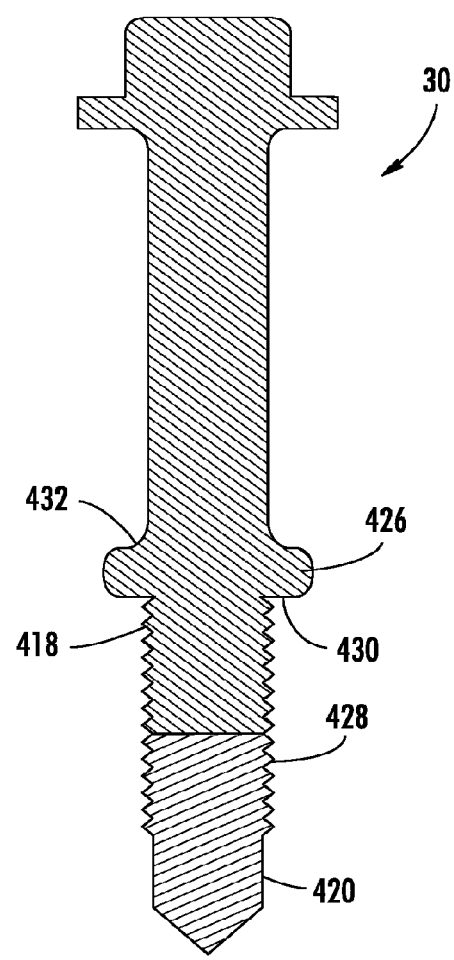
Figure 7:
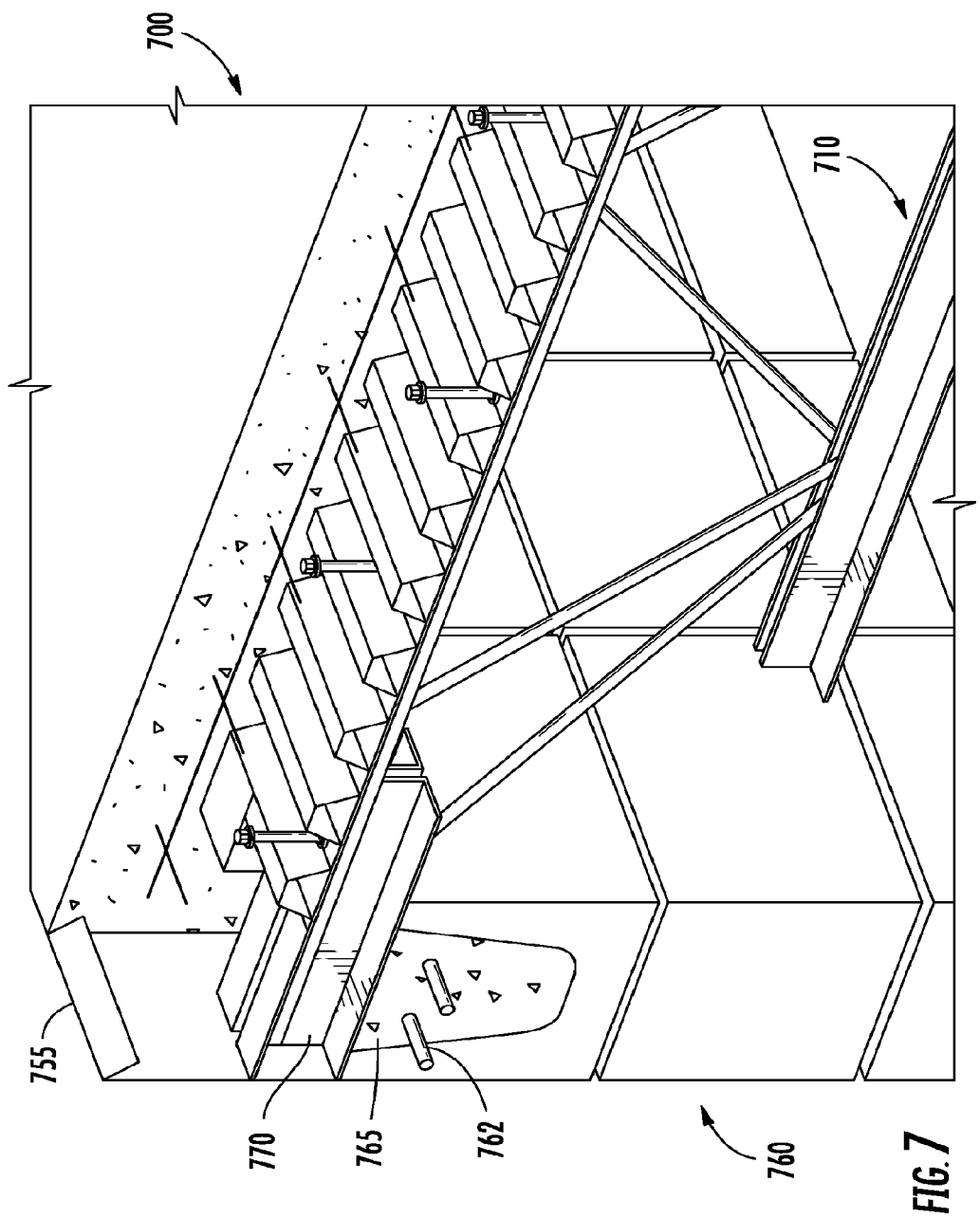
Figure 8:
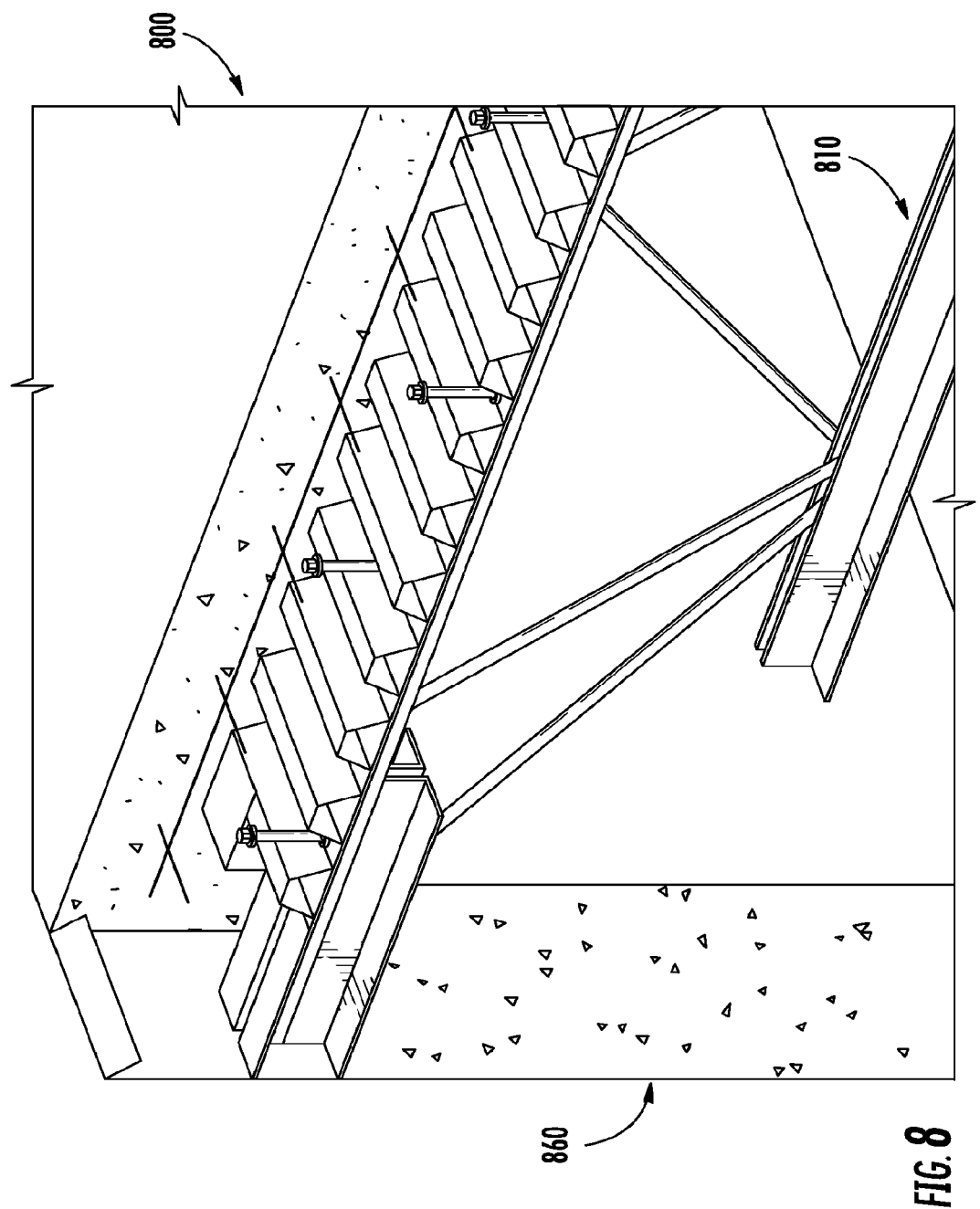
Figure 9:
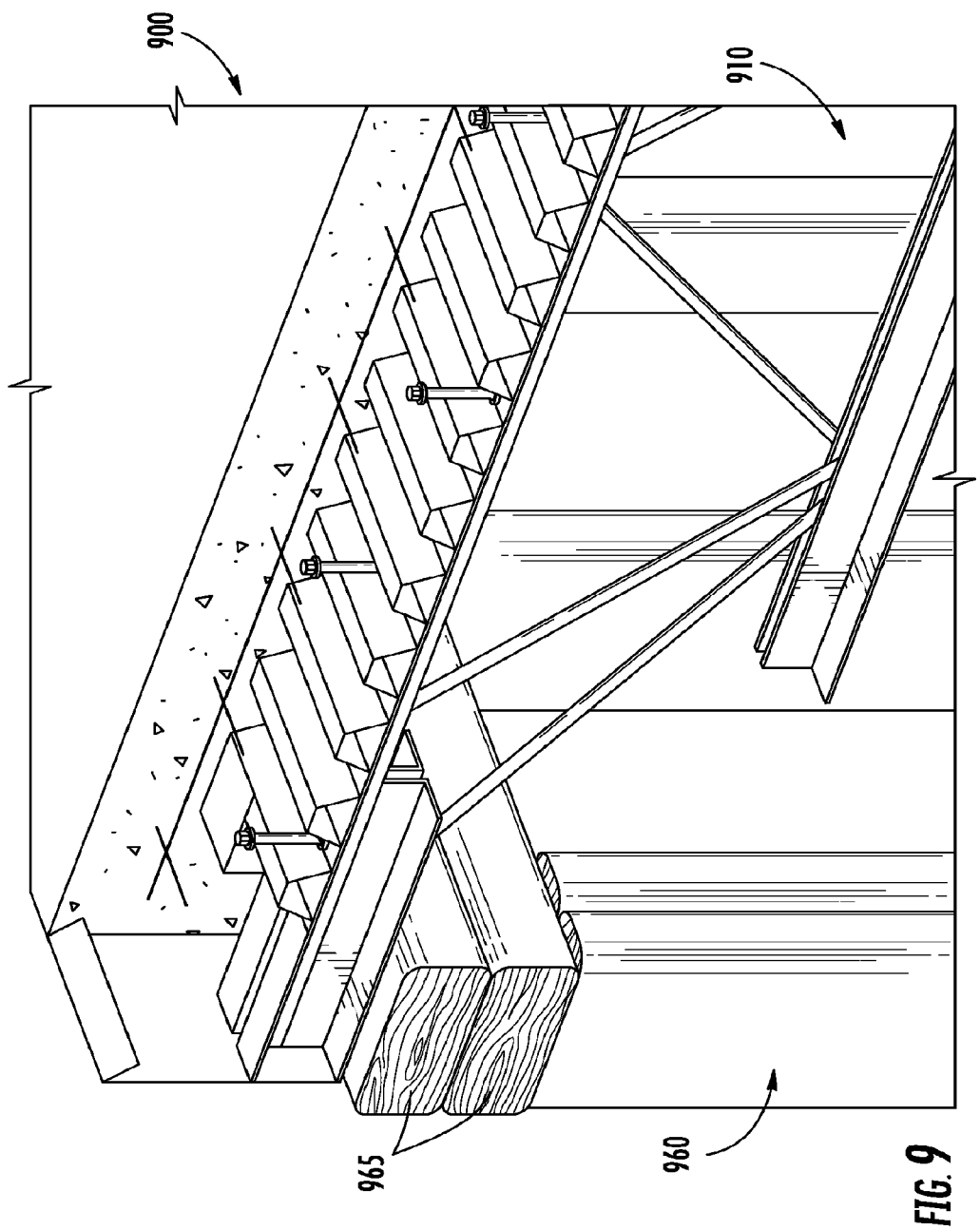
Figure 10:
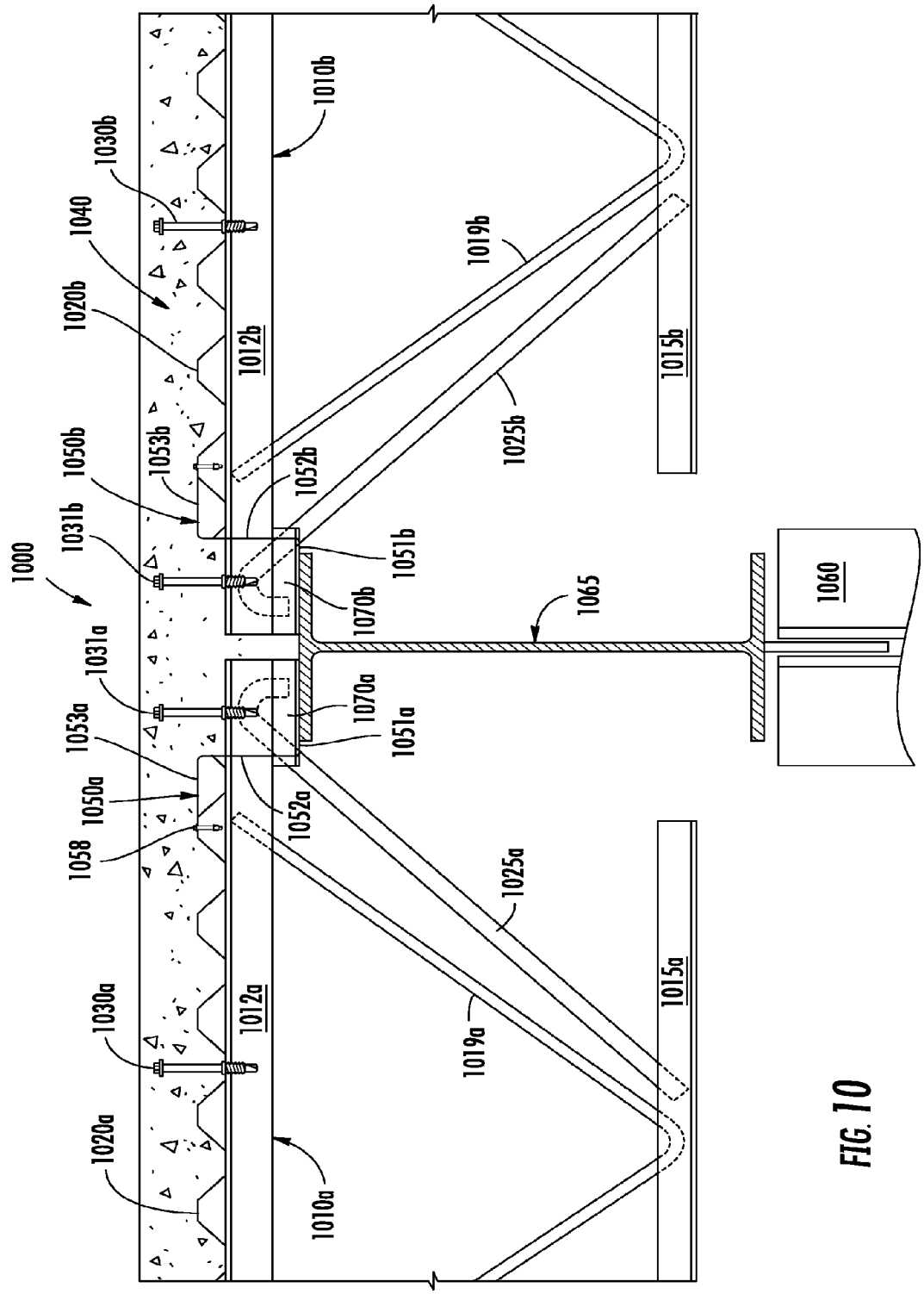
Figure 12A:
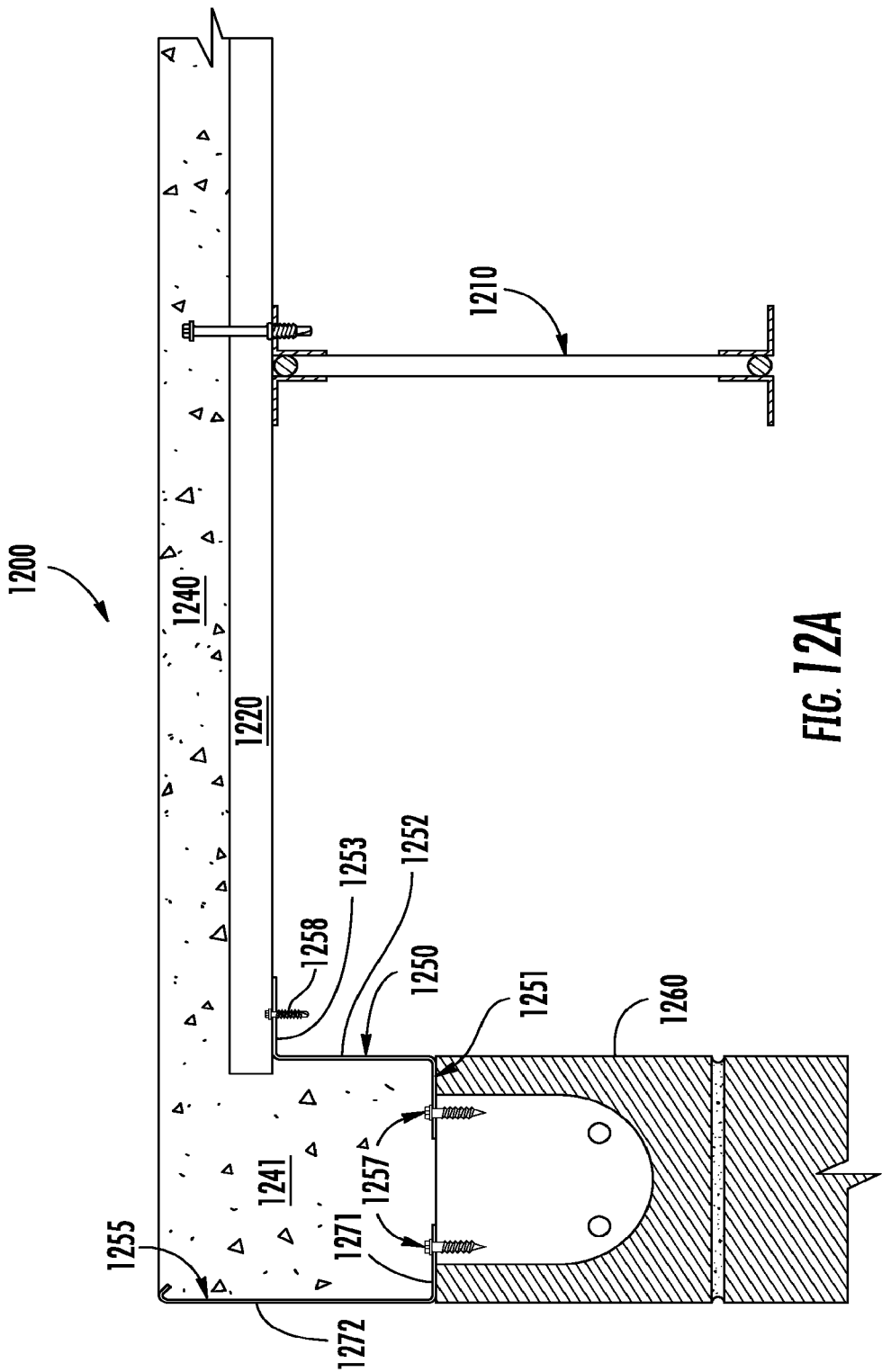
Figure 12B:
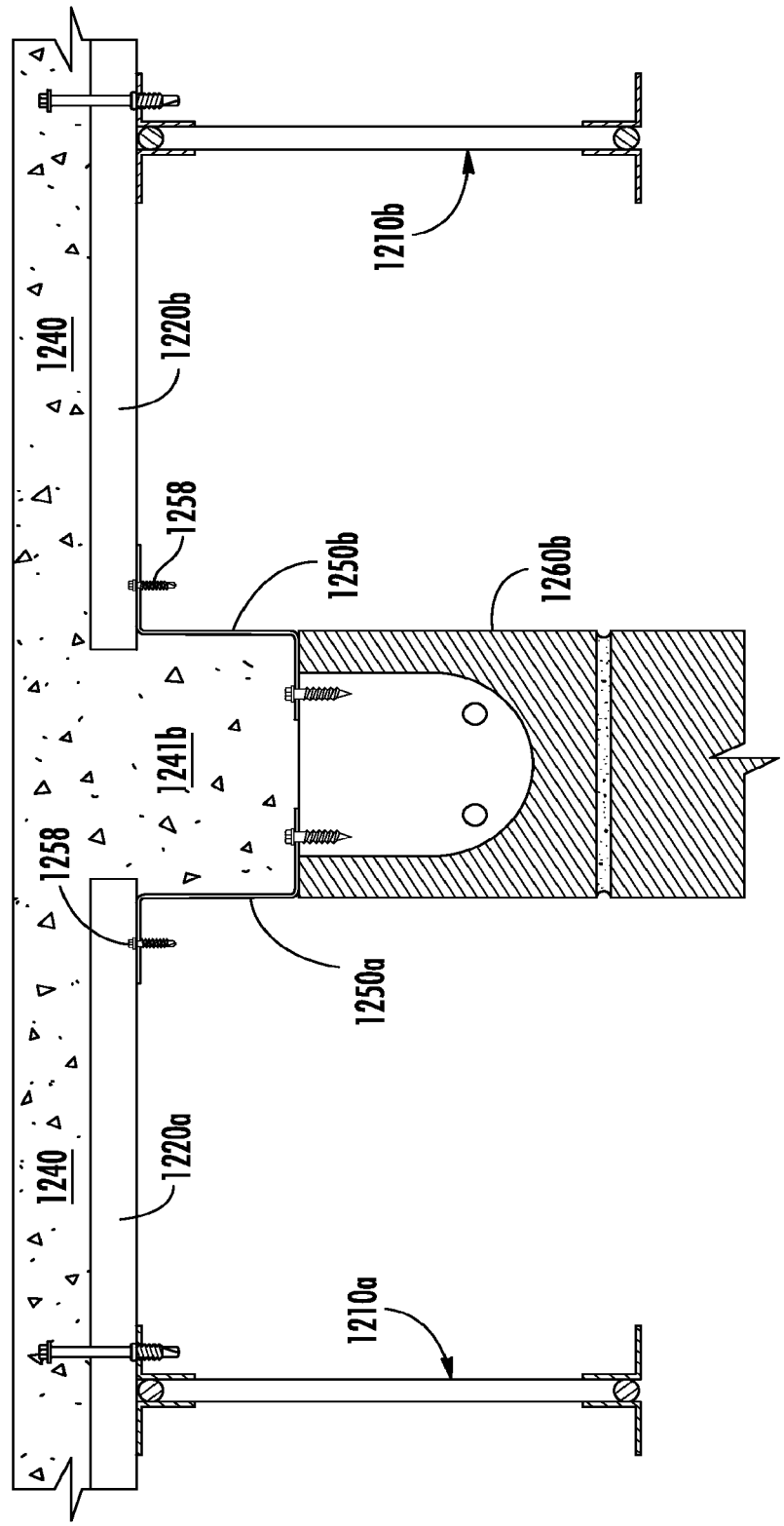
Figure 13:
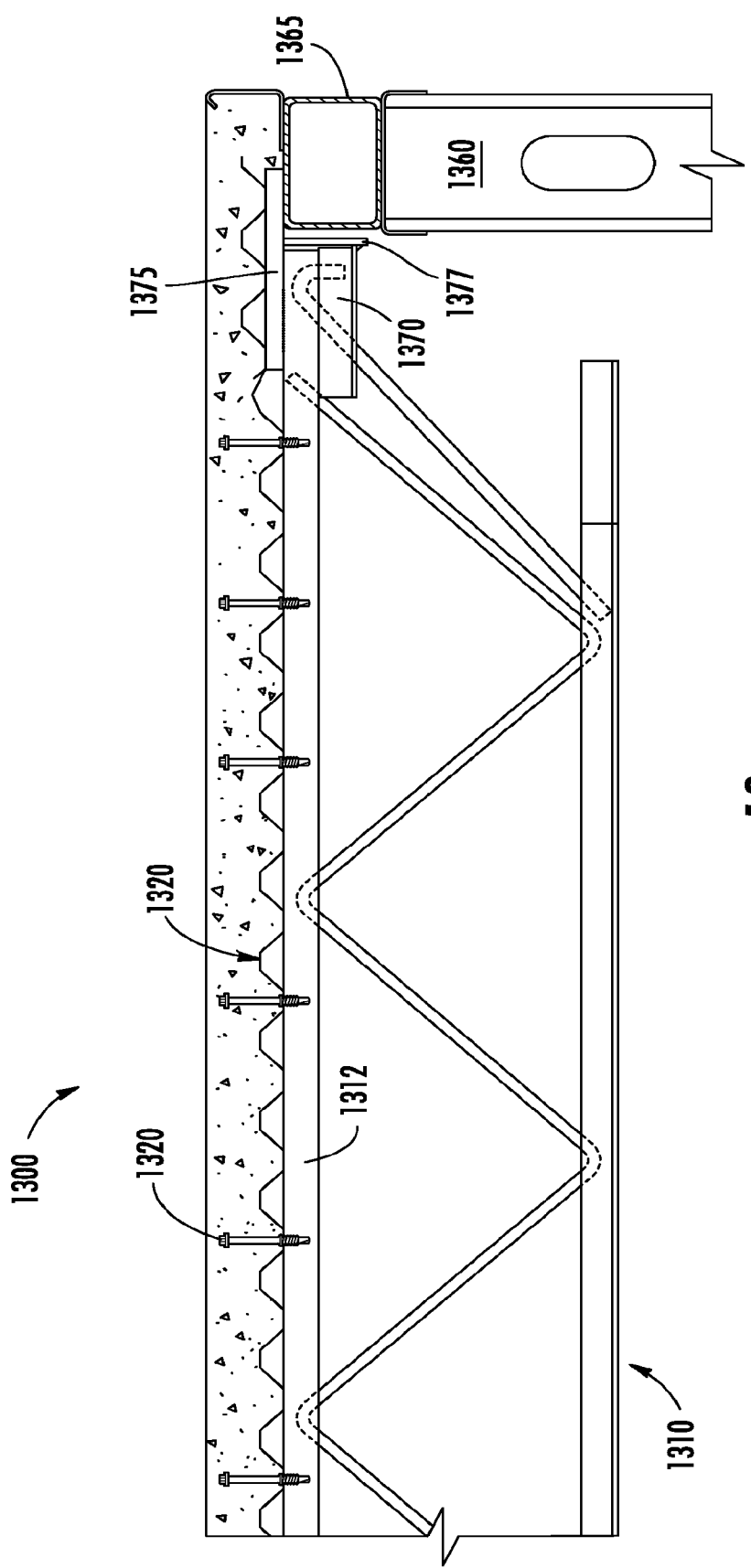
Figure 14:
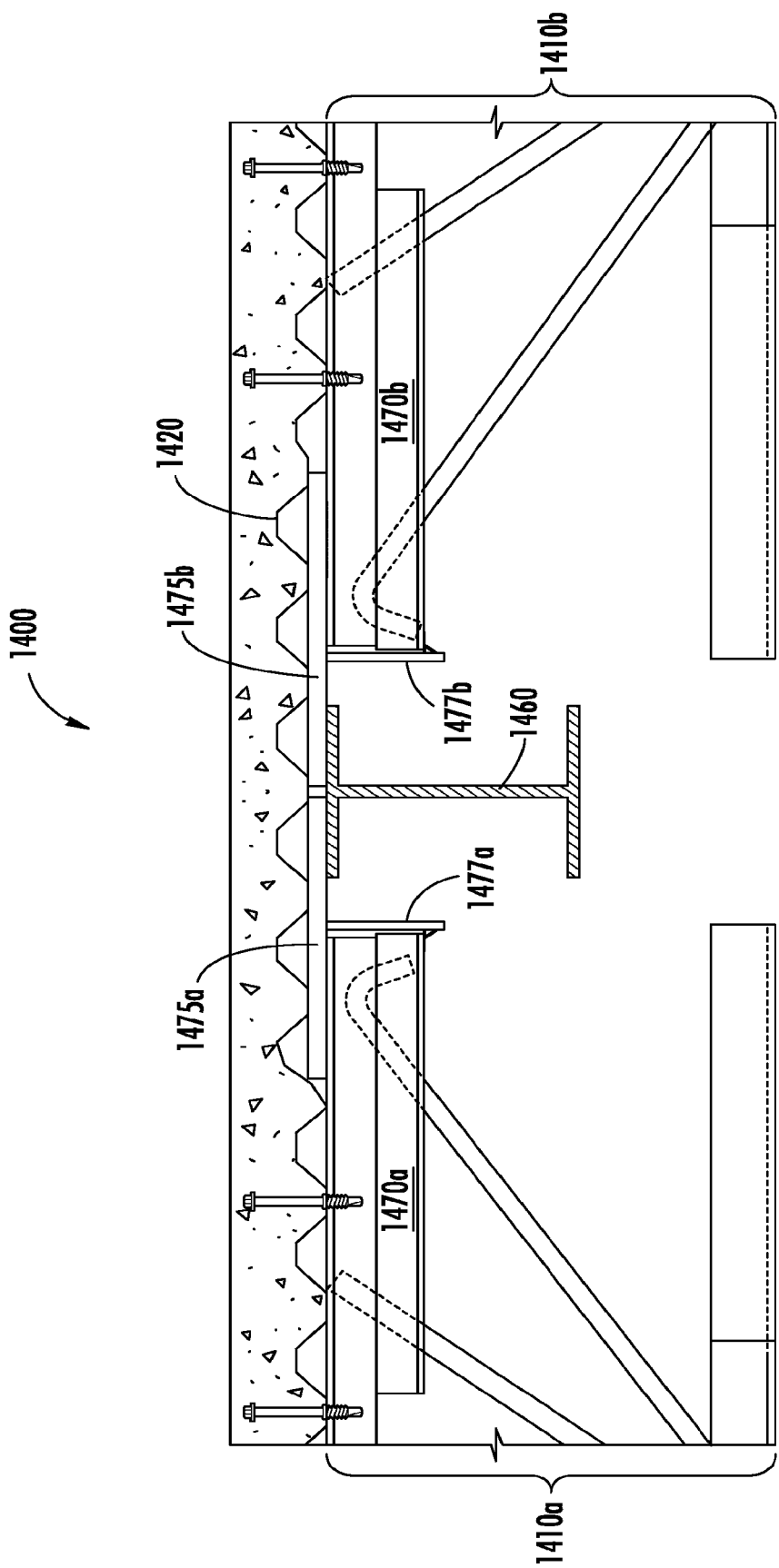
Figure 15:
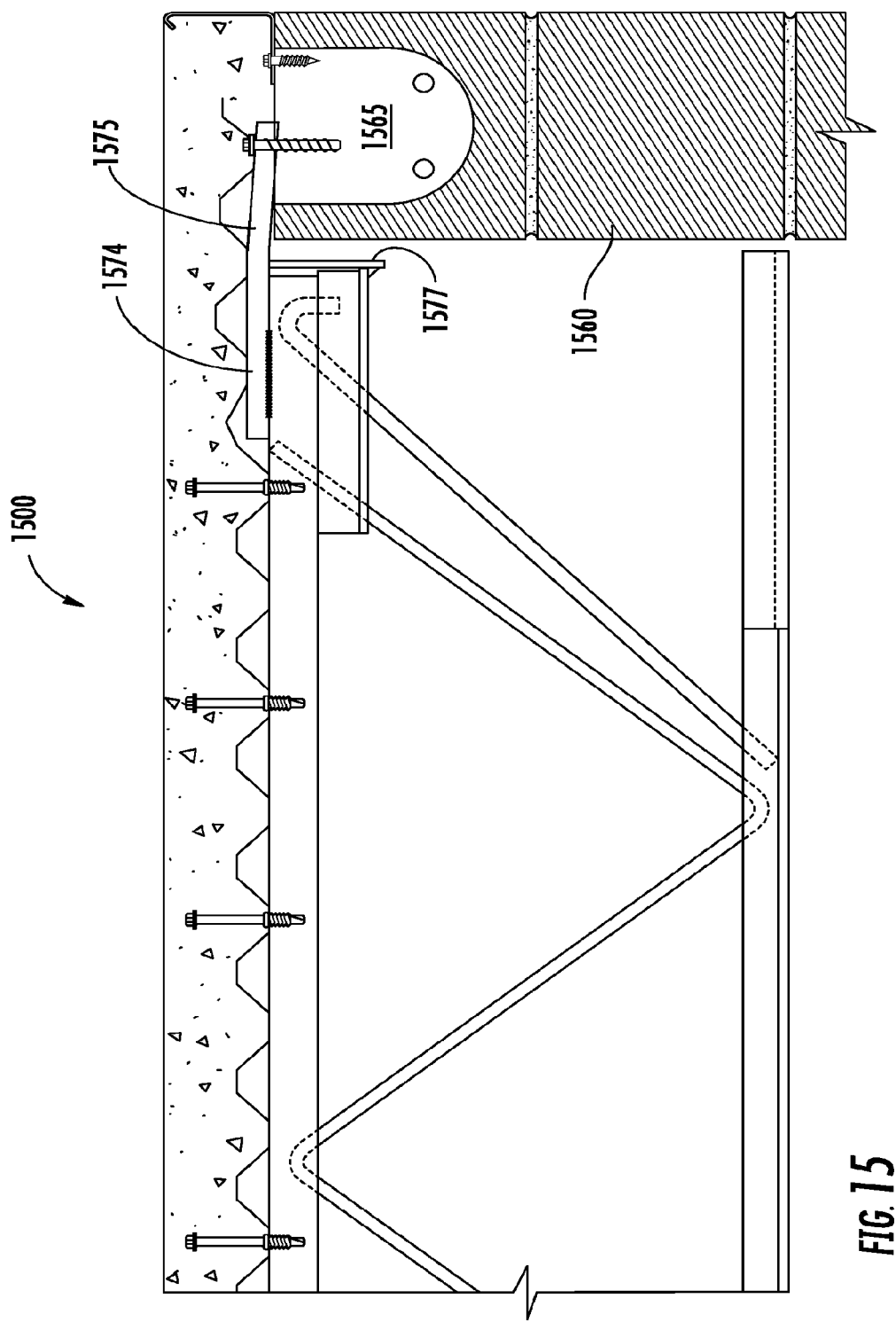
Figure 16A:
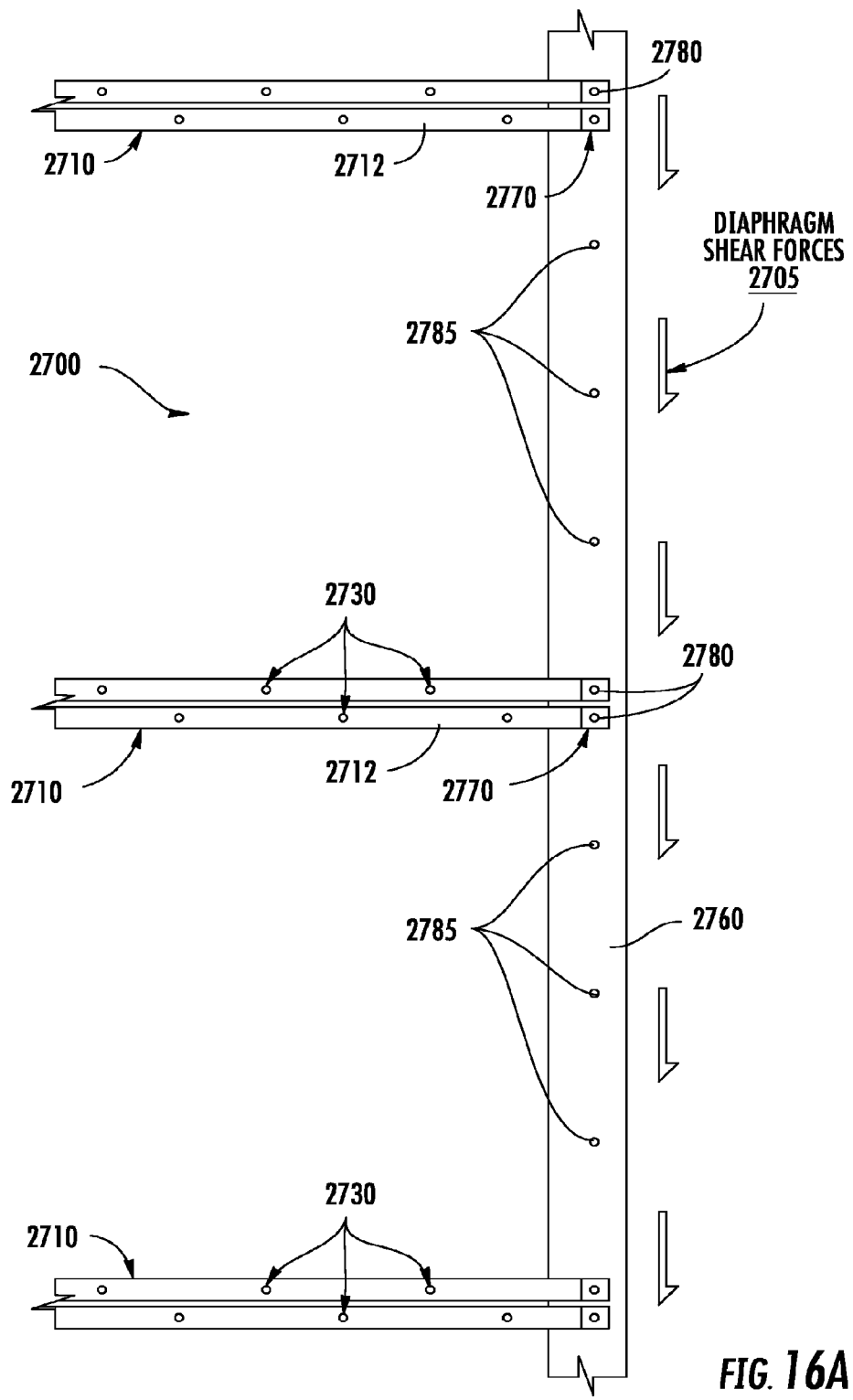
Figure 16B:
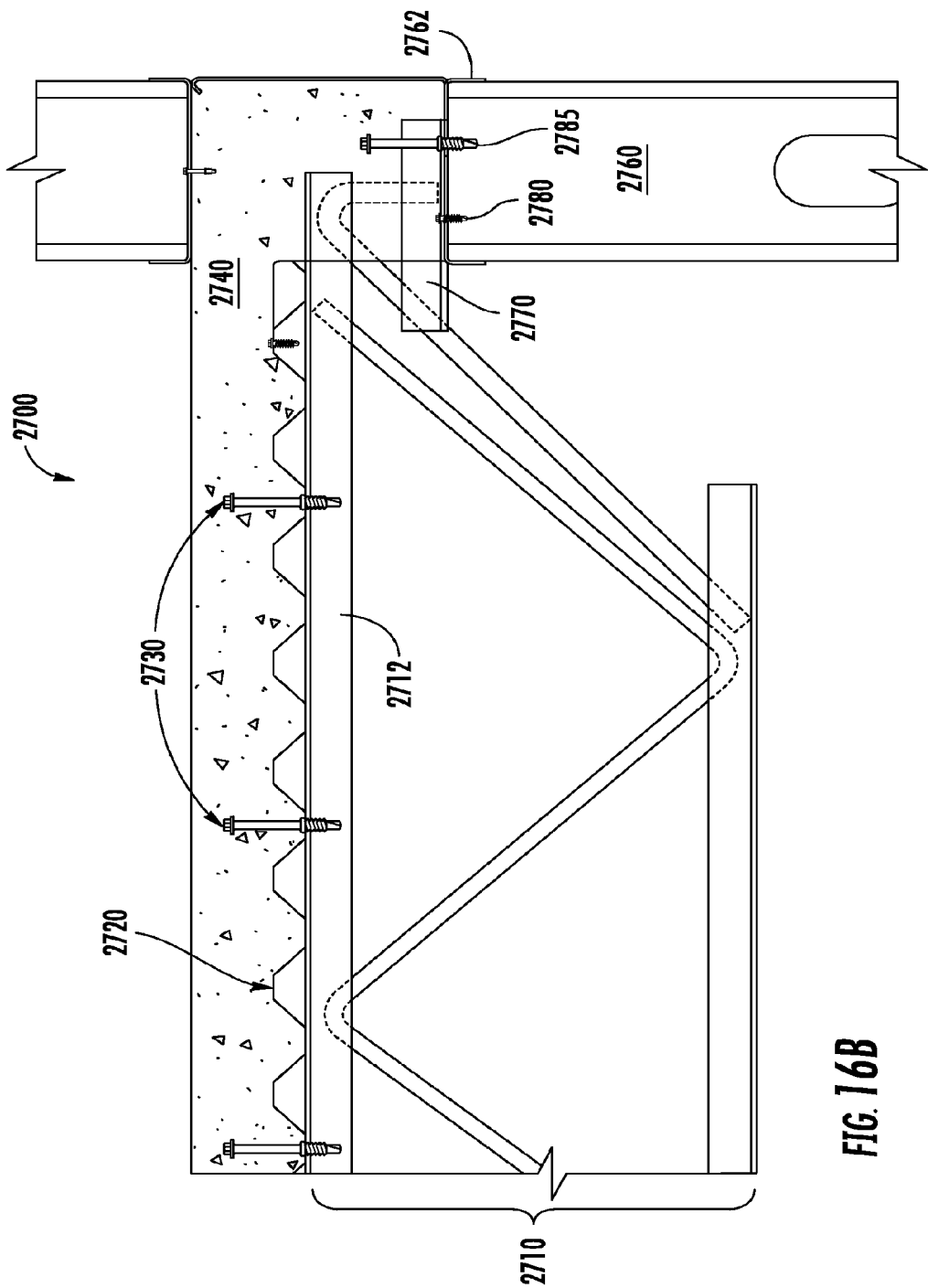
Figure 20:
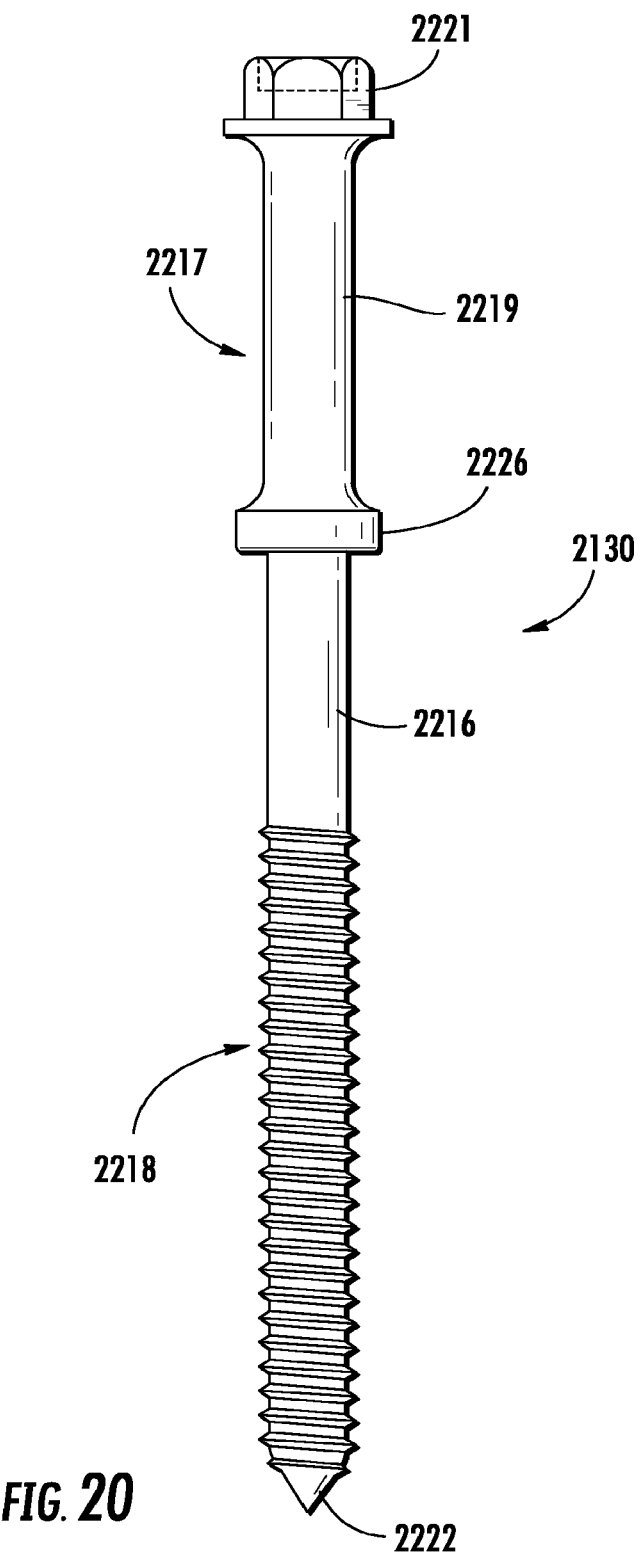
Figure 21:
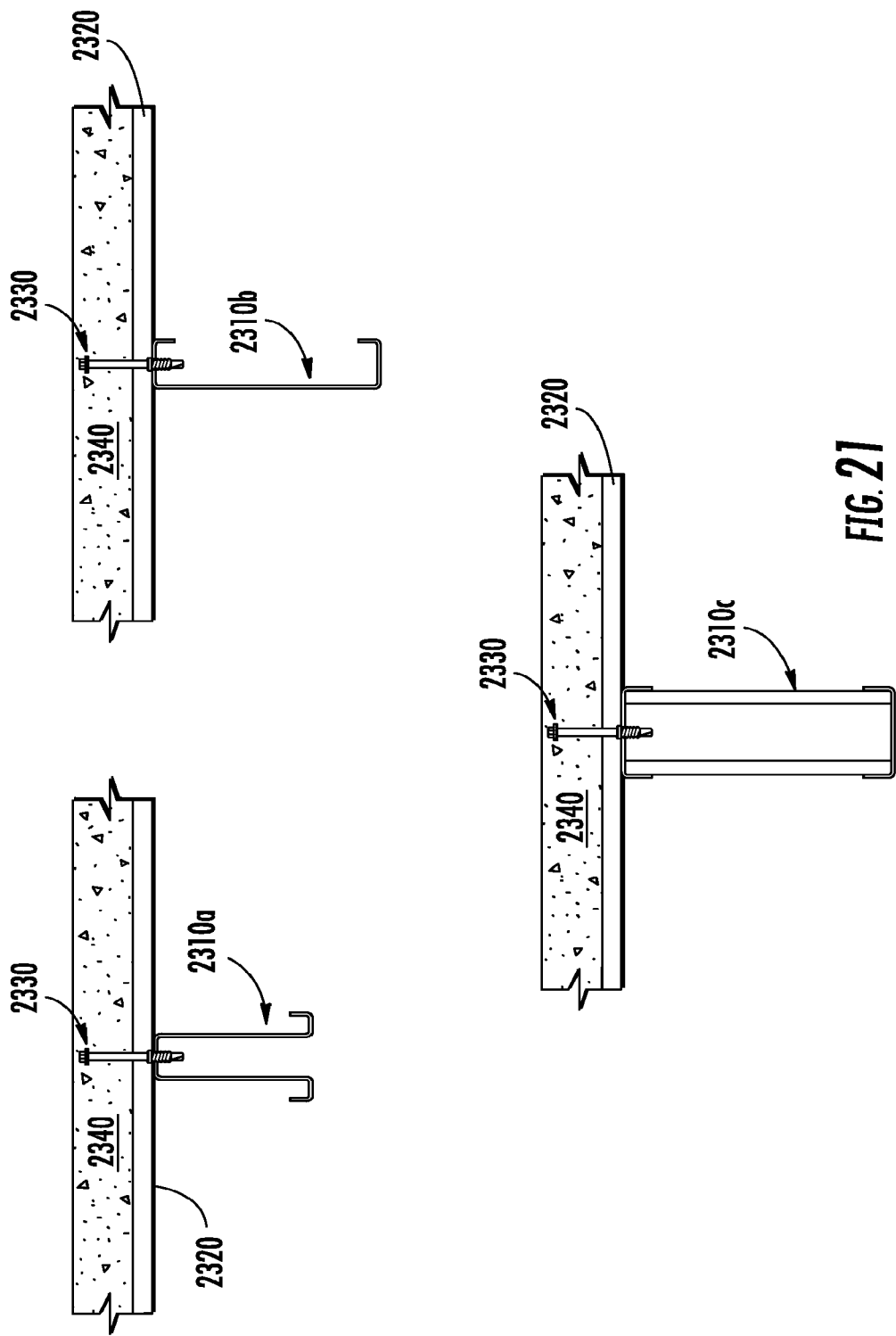
Figure 22A:
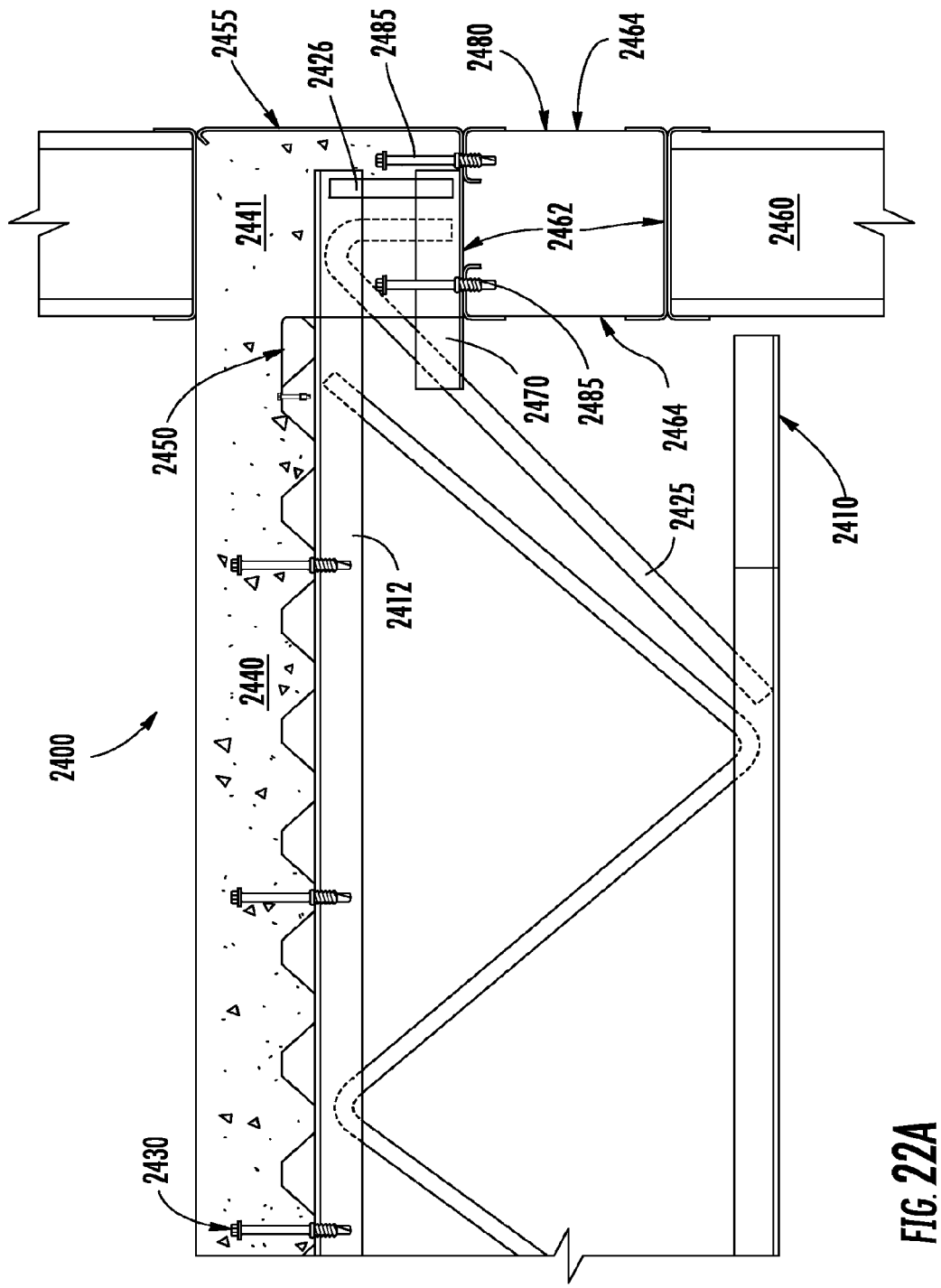
Figure 24:
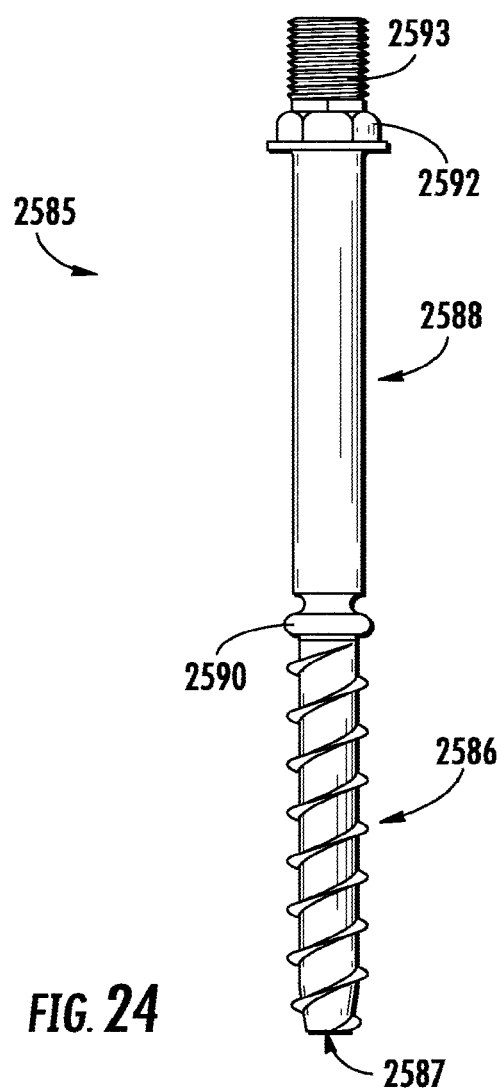
Figure 25:
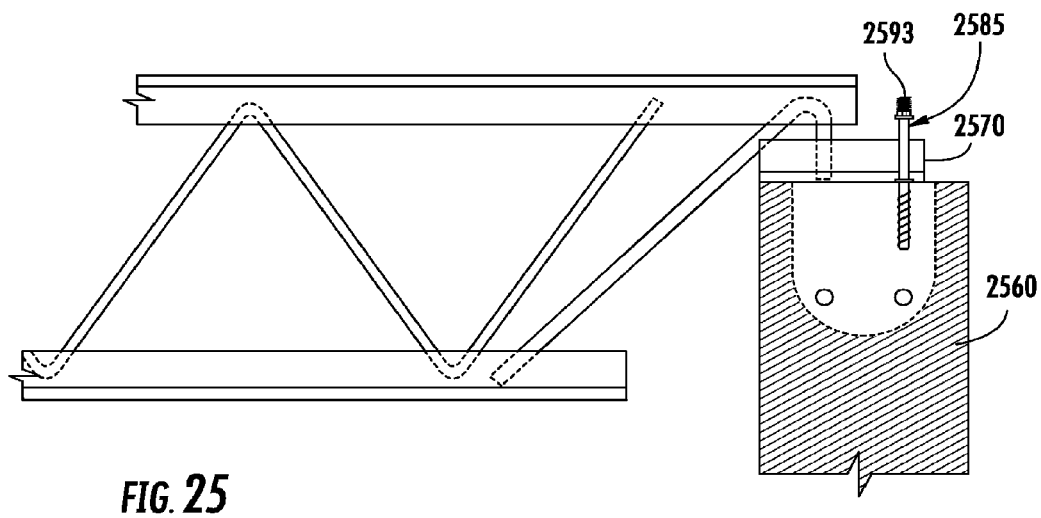
Figure 26:
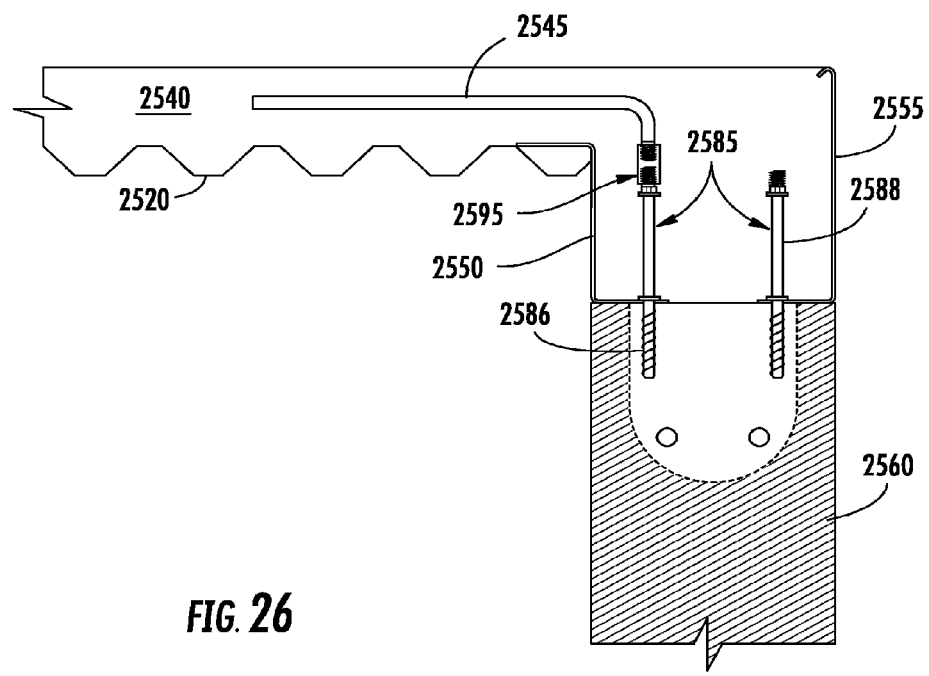
Figure 27A:
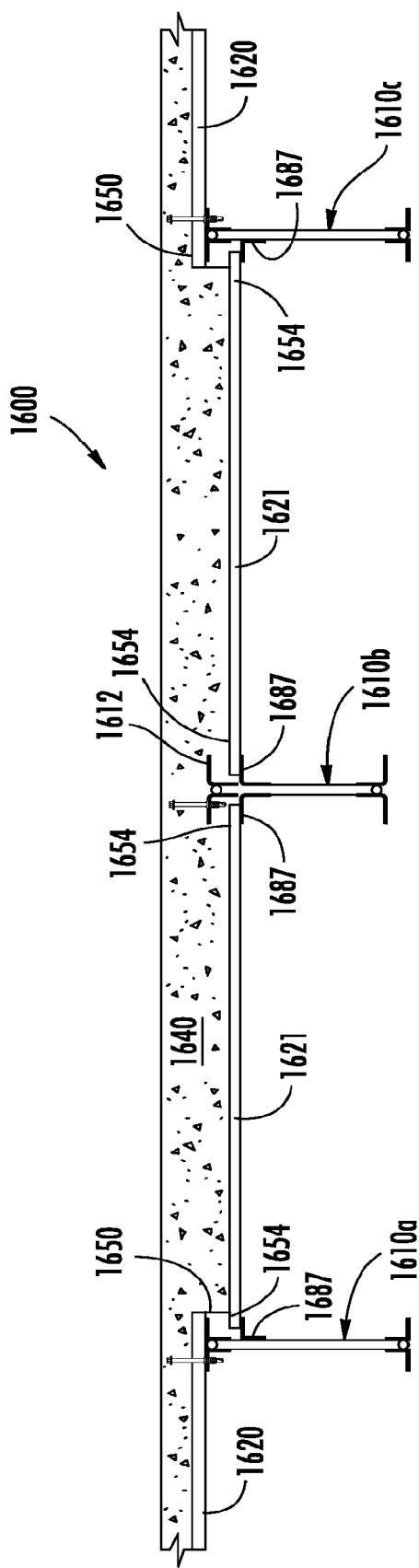
Figure 27B:
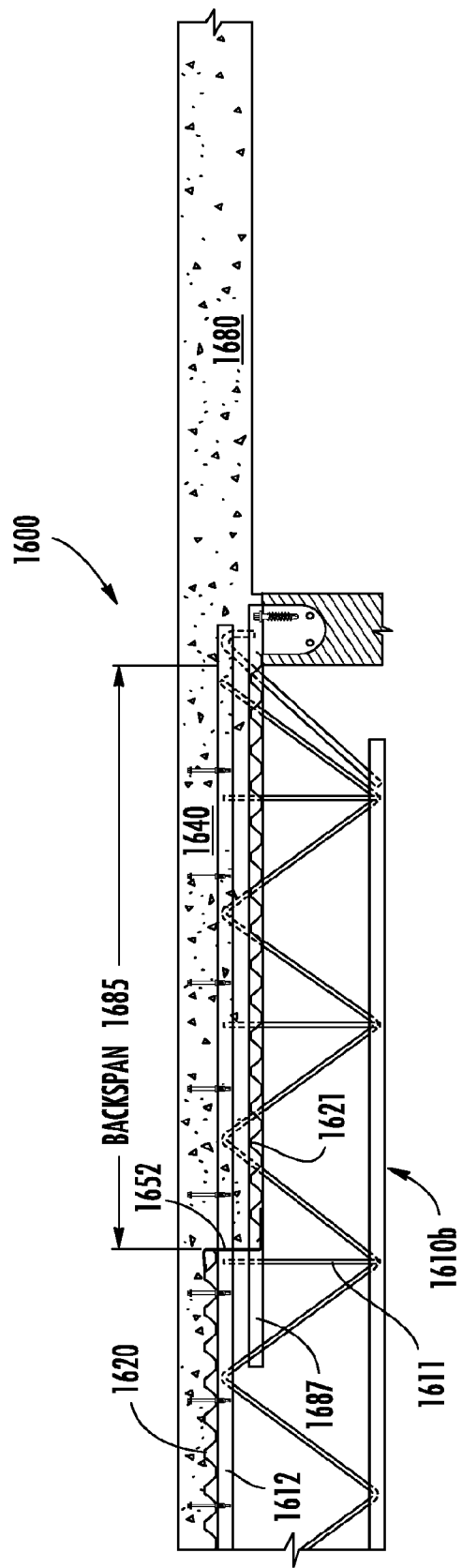
Figure 28A:
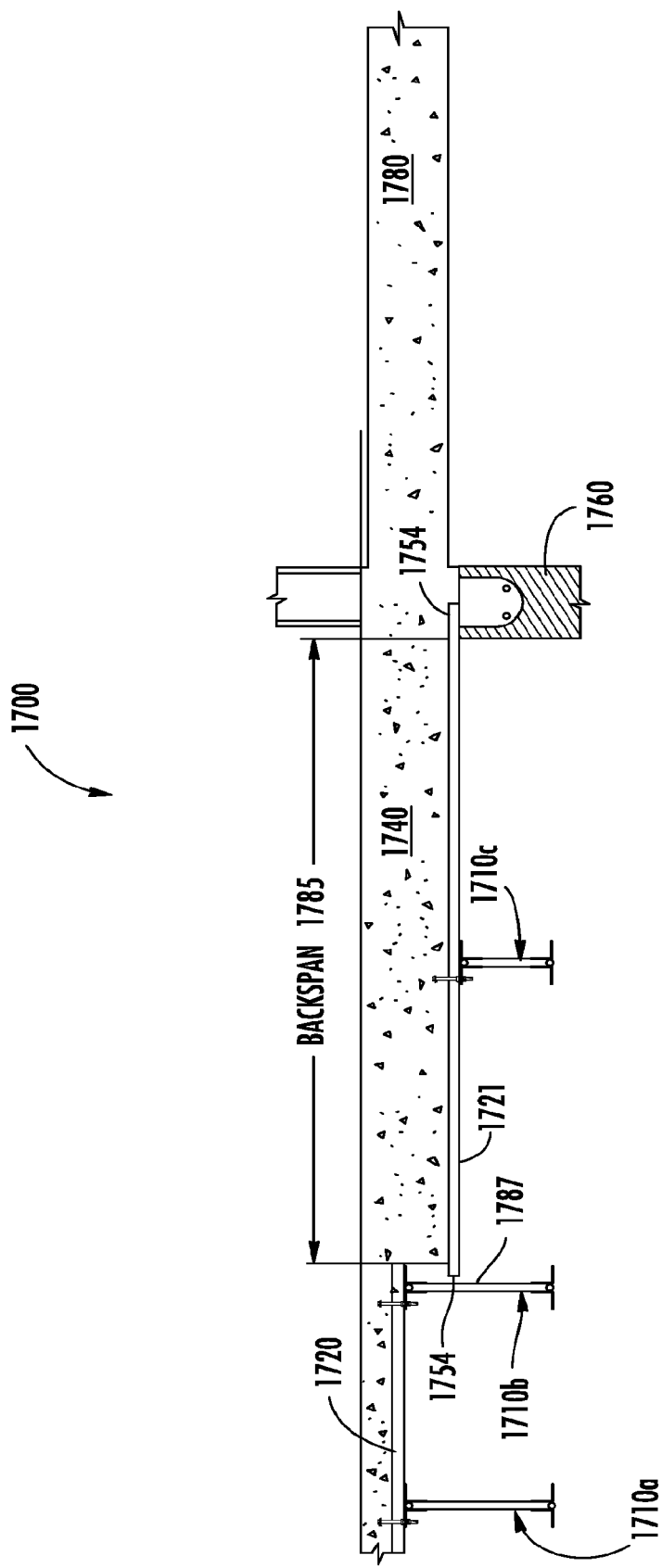
Figure 28B:
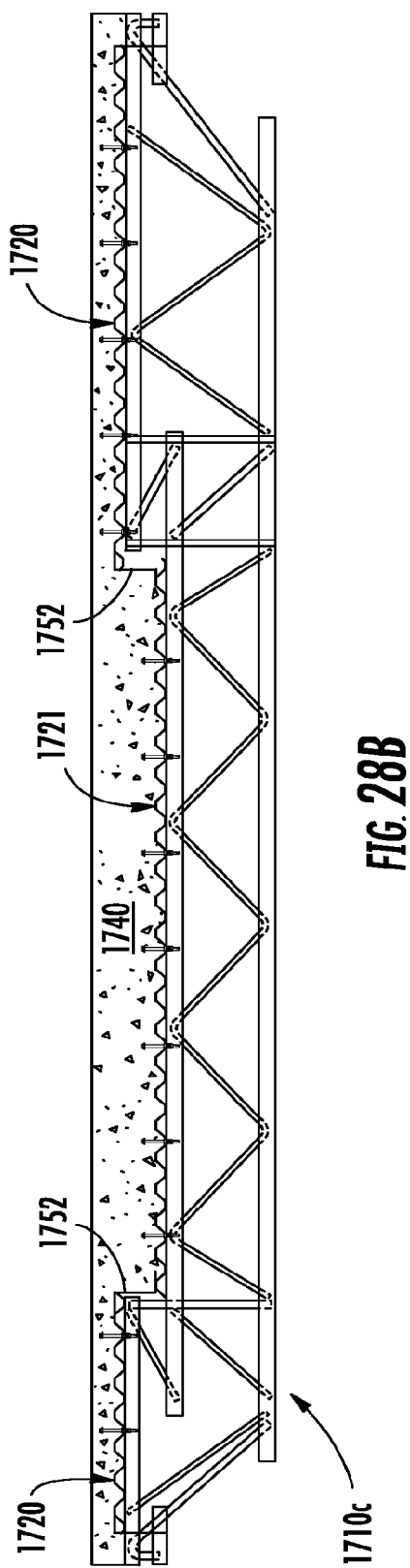
Figure 29:
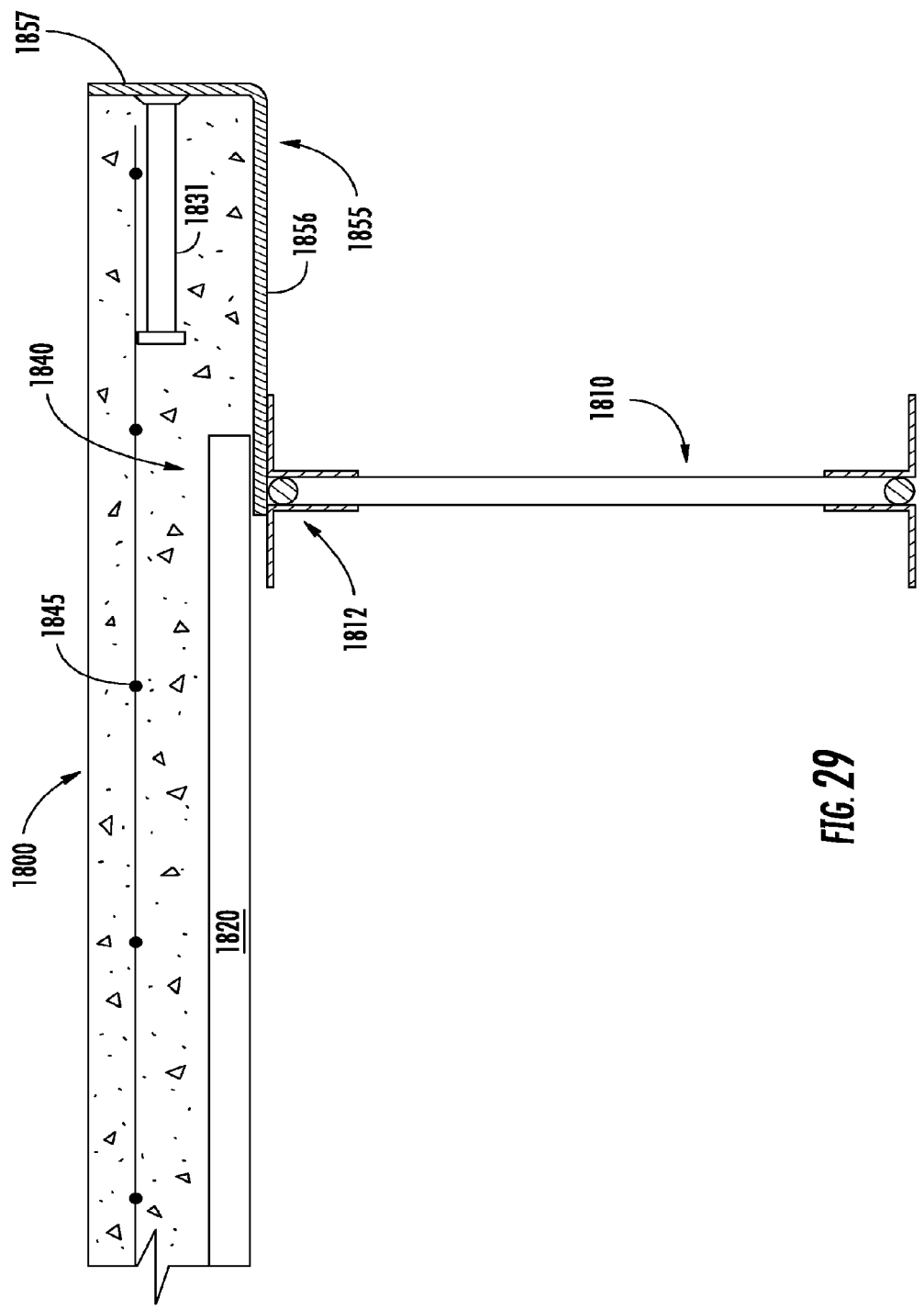
Figure 30:
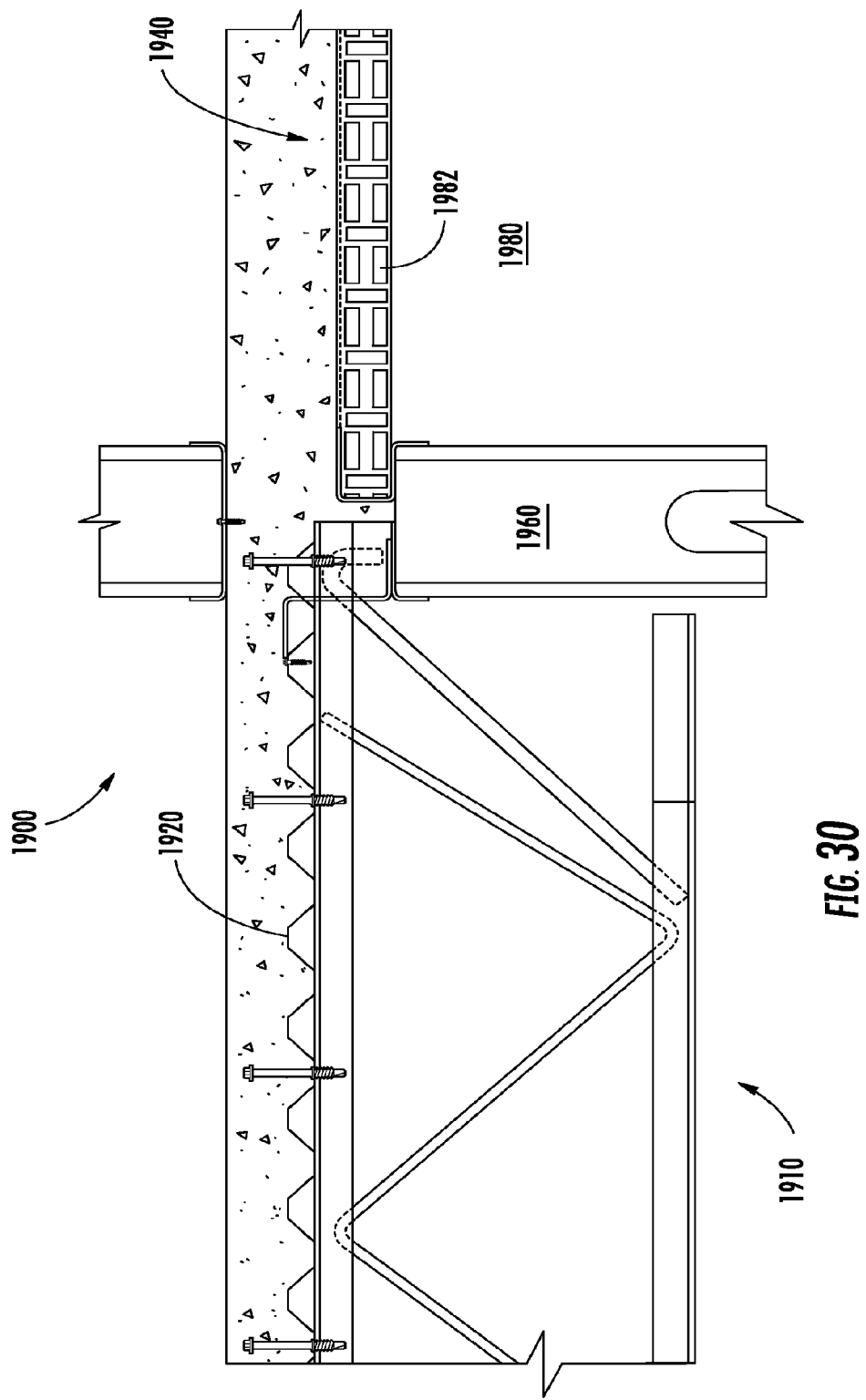
Figure 31:
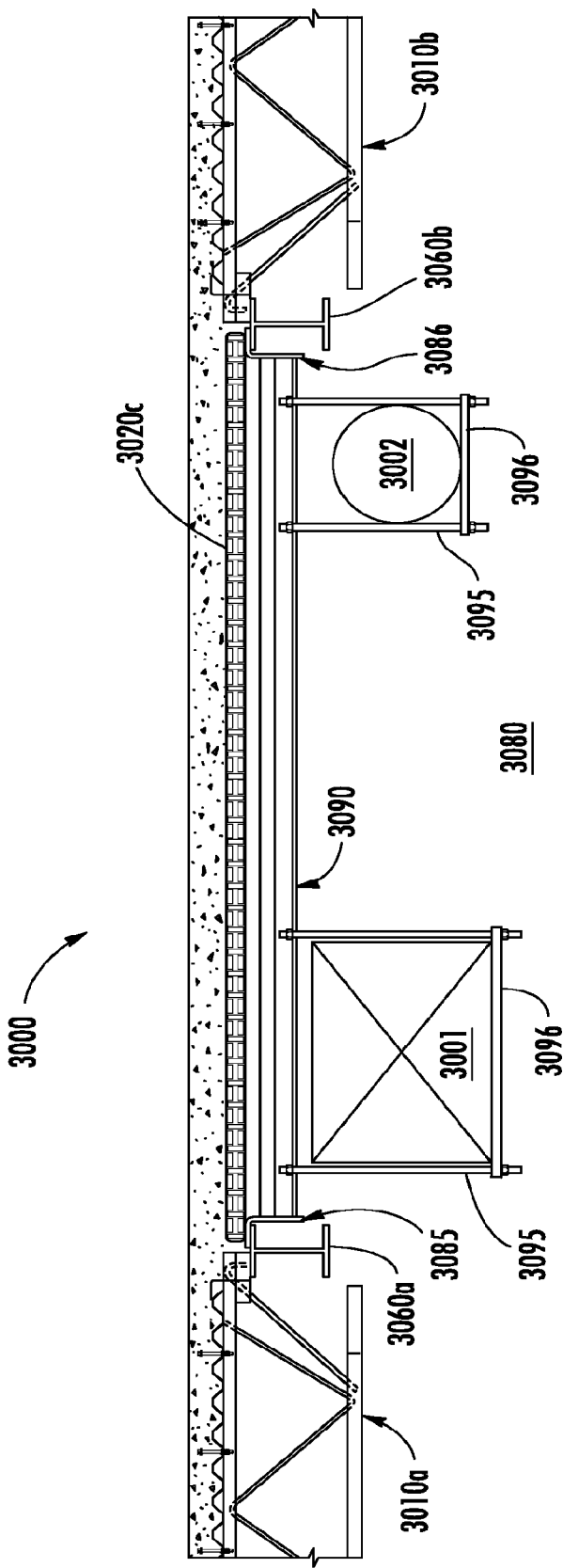

Having thus described embodiments of the invention in general terms, reference will now be made to the accompanying drawings, which are not necessarily drawn to scale, and wherein:

FIG. 1 illustrates a cross-sectional perspective view of a composite joist floor system in accordance with an embodiment of the present invention;

FIGS. 2a and 2b illustrate a cross-sectional side views of two composite joist floor systems similar to the floor system illustrated in FIG. 1, in accordance with embodiments of the present invention;

FIG. 3a-d illustrates at least a portion of the z-shaped closure illustrated in FIGS. 1 and 2 in accordance with an embodiment of the present invention;

FIG. 4a illustrates a side view of one of the self-drilling, self-tapping, stand-off screws illustrated in FIGS. 1 and 2 in accordance with an embodiment of the present invention;

FIG. 4b illustrates a cross-sectional side view of the self-drilling, self-tapping, stand-off screw illustrated in FIG. 4a, in accordance with an embodiment of the present invention;

FIG. 5a-d illustrates the exemplary standardized patterns of stand-off screw spacings that may be used in accordance with embodiments of the present invention;

FIG. 6 illustrates a cross-sectional perspective view of a composite joist floor system in accordance with an embodiment of the present invention where the member for supporting the end of the joists includes a structural steel beam;

FIG. 7 illustrates a cross-sectional perspective view of a composite joist floor system in accordance with an embodiment of the present invention where the member for supporting the end of the joists includes a masonry wall, such as a wall comprised of concrete masonry units or brick;

FIG. 8 illustrates a cross-sectional perspective view of a composite joist floor system in accordance with an embodiment of the present invention where the supporting member for supporting the end of the joists includes a concrete wall;

FIG. 9 illustrates a cross-sectional perspective view of a composite joist floor system in accordance with an embodiment of the present invention where the supporting member for supporting the end of the joists includes a wood stud;

FIG. 10 illustrates a cross-sectional side view of a composite joist floor system showing how a beam running substantially perpendicular to the joists may support the ends of two joists on opposite sides of the beam in accordance with an embodiment of the present invention;

FIG. 11 illustrates a cross-sectional side view of a composite joist floor system showing how the corrugated steel decking may be supported at its edge by a wall that runs substantially parallel to the joists and generally perpendicular to the corrugations in the decking, in accordance with an embodiment of the present invention;

FIG. 12a illustrates a cross-sectional side view of a composite joist floor system where an exterior wall that is substantially parallel to the joists supports the edges of a corrugated steel decking sheet using a z-shaped closure, in accordance with an embodiment of the present invention;

FIG. 12b illustrates a cross-sectional side view of a composite joist floor system where an interior demising wall that is substantially parallel to the joists supports the edges of two corrugated steel decking sheets using z-shaped closures, in accordance with an embodiment of the present invention;

FIG. 13 illustrates a cross-sectional view of a composite joist floor system where the joist has a flush bearing seat and where the flush bearing seat is supported by a wall running substantially perpendicular to the joist, in accordance with an embodiment of the present invention;

FIG. 14 illustrates another embodiment of a flush bearing seat configuration where two opposing joists are supported by the same steel beam in accordance with an embodiment of the present invention;

FIG. 15 illustrates a flush bearing configuration where the flush bearing seat is configured specifically for a masonry-type support member in accordance with an embodiment of the present invention;

FIGS. 16a and 16b illustrate how the composite floor system may be configured to transfer horizontal diaphragm shear forces from the concrete slab to the primary support structures, such as a cold-formed steel shear-wall, in accordance with an embodiment of the present invention;

FIG. 17 illustrates a side section view of a portion of the floor system at an external wall that is substantially parallel to the floor joists where stand-off screws have been installed into the top of the wall to transfer diaphragm forces, in accordance with an embodiment of the present invention;

FIG. 18 illustrates an interior support wall in which stand-off screws have been installed into the top of the wall to transfer diaphragm forces from the concrete slab to the wall in accordance with an embodiment of the present invention;

FIG. 19 illustrates a composite joist floor system where the joists are made of wood in accordance with an embodiment of the present invention;

FIG. 20 illustrates a side view of the stand-off wood screw illustrated in FIG. 19, in accordance with an embodiment of the present invention;

FIG. 21 illustrates three different exemplary composite joist floor systems comprising three different cold-formed steel floor joists, in accordance with embodiments of the present invention;

FIGS. 22a and 22b illustrate a composite floor system supported by cold-formed wall studs, the floor system having a composite header configuration in accordance with an embodiment of the present invention;

FIG. 23 illustrates an embodiment of the present invention where rebar in the concrete slab is coupled to a stand-off screw installed into the top of a supporting wall;

FIG. 24 illustrates a stand-off screw configured to attach to a rebar member or some other extension member at the end of the screw opposite the screw's tip, in accordance with an embodiment of the present invention;

FIG. 25 illustrates a stand-off screw used to attach a joist shoe to the supporting wall in accordance with an embodiment of the present invention;

FIG. 26 illustrates how stand-off screws may be used to attach a z-shaped closure and a pour stop to a wall, while also functioning to couple rebar to the wall and/or to transfer horizontal diaphragm forces from the slab to the wall, in accordance with an embodiment of the present invention;

FIGS. 27a and 27b illustrate a composite joist floor system configured to provide for a balcony that extends from the structure parallel to the floor joists in accordance with an embodiment of the present invention;

FIGS. 28a and 28b illustrate a composite joist floor system configured to provide for a balcony that extends from the structure perpendicular to the floor joists in accordance with an embodiment of the present invention;

FIG. 29 illustrates an exterior slab edge condition within a composite joist floor system where the concrete floor ends at a joist in accordance with an embodiment of the present invention;

FIG. 30 illustrates a composite joist floor system where the floor system transitions from a deck system, such as that used in a corridor, to a composite joist and deck system in accordance with an embodiment of the present invention;

FIG. 31 illustrates a composite joist floor system having a corridor running perpendicular to the joists and having a mechanical header, in accordance with an embodiment of the present invention; and FIG. 32-32b provides a more detailed illustration of the mechanical header illustrated in FIG. 31, in accordance with an exemplary embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Composite Joist Floor Systems

The composite joist floor systems described herein are generally constructed at the building site and make-up the floors and provide structural support for the ceilings of the building. In general, a plurality of joists are provided and each joist is supported at either end by the building's primary support structures, which may include but are not limited to: beams, joist girders, masonry walls, concrete walls, cold-formed wall studs, and/or wood load bearing wall studs. In this way, the joists span the open areas within the building's main structure to provide support for the floors and/or ceilings. Importantly, the present invention provides a plurality of varying flooring system designs and design methodologies. These various designs and design methodologies use a combination of joist depth, chord size, joist spacing, flexible self-tapping stand-off screw size and spacing, and various corrugated steel deck profiles to create flooring systems that are light in weight, have generally decreased material cost and construction costs, and offer improved strength.

Typical steel joists of the composite joist systems described herein have spans ranging from eight (8) to fifty (50) feet and depths ranging from eight (8) to fifty (50) inches. In addition to variations in the size and spacing of the joist, the number and pattern of the flexible self-drilling, self-tapping stand-off screws, the configuration of the corrugated steel decking, the connections between the flooring system and the support beam, as well as other design elements contribute to lighter weight and added strength of the flooring systems.

Referring to the drawings, FIGS. 1 and 2 illustrate a cross-sectional perspective view and a cross-sectional side view, respectively, of a composite joist floor system 1 in accordance with an embodiment of the present invention. As illustrated in FIGS. 1 and 2, and as described above, the composite joist floor system 1 generally includes at least one joist 10 supported on its ends by a stud or beam, such as a steel wall stud 60. The joist 10, in combination with other joists, walls, or beams (not shown), supports a layer of corrugated steel decking 20. The corrugated steel decking 20 is positioned such that the corrugations run perpendicular to the joist 10. Importantly, a plurality of self-drilling, self-tapping stand-off screws 30 are drilled through the corrugated steel decking 20 into the joist 10. Each self-drilling, self-tapping stand-off screw 30 not only connects the corrugated decking 20 to the joist 10, but also extends some distance above the corrugated decking 20. In this way, when concrete 40 is placed over the corrugated steel decking 20, the self-drilling, self-tapping stand-off screws 30 are encapsulated within the concrete to form a composite joist floor system once the concrete is cured. As will be described in greater detail below, this composite joist floor system allows for structures to be stronger, lighter, and/or more economical. Although the term "concrete" is often used herein when describing embodiments of the present invention, other embodiments of the present invention may use other cementitious materials or materials with properties similar to cementitious materials.

As illustrated in FIGS. 1 and 2, in an exemplary embodiment, the joist 10 comprises an upper chord 12 and a lower chord 15. The upper chord 12 and the lower chord 15 are joined together by a web 18 extending therebetween. In the illustrated embodiment, the web 18 has an open web configuration comprised of one or more of rod, angle, or cold-formed "C" shaped members 19 that extend between and are coupled to the upper chord 12 and the lower chord 15. In the illustrated embodiment of the invention, the web 18 is made primarily from a single round solid rod 19 bent into a zigzag or sinusoidal-like pattern having one or more peaks alternating with one more valleys. In such an embodiment, the upper chord 12 is welded (or otherwise coupled) to the peaks in the bent rod 19 and the lower chord 15 is welded (or otherwise coupled) to the valleys in the bent rod 19.

In the illustrated embodiment, the upper and lower chords 12 and 15 are each formed from two metal angles (also sometimes referred to as "angle irons," although the angles described herein need not be iron). FIG. 1 illustrates an embodiment where two angles 16 and 17 are placed on either side of the bent rod 19 and joined to the valleys in the bent rod 19 to form the lower chord 15. Similarly, two angles 13 and 14 are placed on either side of the bent rod 19 and joined to the peaks in the bent rod 19 to form the upper chord 12. So that the composite joist floor system 1 is relatively light in weight, the upper chord 12 and the lower chord 15 typically have relatively thin cross sections.

As further illustrated in FIGS. 1 and 2, the joist 10 includes a rod-shaped "end diagonal" 25 at each end of the joist for transferring forces between the joist 10 and the wall stud 60. The "end diagonal" 25 may also potentially consist of angles or cold-formed "C"-shaped sections for heavier floor loadings. One end of the end diagonal 25 is joined to the lower chord 15 proximate to the first web joint and the other end of the end diagonal 25 is joined to the upper chord 12 proximate to the seat or joist shoe 70. In some embodiments, the lower chord 15 of the joist 10 may include a ceiling extension 90 that extends the lower chord 15 such that the lower chord 15 ends proximate to the supporting wall 60 or beam, as the case may be. Such an extension may be desired so that a ceiling 100 may be hung from the lower chord 15 of the joist.

As described above, corrugated steel decking 20 is positioned over the joist 10 and generally spans two or more adjacent joists. The corrugated steel decking 20 may be painted or galvanized. Standard corrugated steel decking generally comes in the form of sheets having for example, coverage widths of 32, 33, or 36 inches. Besides coming in a variety of widths, standardized corrugated steel decking also comes in many different profiles, depending on the application. The type of corrugated steel decking primarily illustrated herein is 1.0 deep steel decking, although other types of decking may be used depending upon the application. In one embodiment, the steel used in the decking is made from approximately 70% recycled materials and the steel used in the joists is made from approximately 99% recycled materials.

As illustrated in FIGS. 1 and 2, the corrugated steel decking 20 is generally positioned such that the corrugations run at right angles to the joist 10. As described above, self-drilling, self-tapping stand-off screws 30 are drilled through the corrugated decking 20 and the flanges of the upper chord 12. In this way, the self-drilling, self-tapping stand-off screws 30 transfer compressive forces from the joist top chord into the concrete slab 40 of the joist 10. The concrete floor slab 40 is designed with sufficient compressive strength to resist these compressive forces.

In some embodiments, the concrete is strengthened by placing welded wire fabric 45 or other types of rebar over the corrugated steel decking 20. When the concrete 40 is then placed over the welded wire fabric 45 and the corrugated steel decking 20, the welded wire fabric 45 and the upper portion of the self-drilling, self-tapping stand-off screws 30 are encapsulated within the concrete 40. The concrete is then smoothed so as to form a floor of the building. In some embodiments, chairs are used to hold the welded wire fabric 45 in the specified location above the corrugated steel decking 20 as the concrete 40 is placed.

It should be appreciated that the composite joist floor system 1 described above provides many advantages over the traditional non-composite floor systems. In a traditional non-composite floor design, the concrete slab rests on the joist and the concrete slab and the joist act independently to resist the loads on the floor. Specifically, in a non-composite joist floor design, the joist and the concrete share the loads based on the relative stiffness of each component. Since the concrete slab is relatively thin compared to its span (i.e., the length of the joist), the concrete has very low stiffness relative to the joist. As such, in a non-composite joist floor design, the joist must carry substantially the entire load on the floor. In contrast, in the composite joist floor system described above, the concrete slab 40 and the joist 10 act more like a single unit due to the fact that the concrete slab 40 and the joist 10 are coupled together by the stand-off screws 30. In general, the concrete 40 carries compression and the lower chord 15 of the joist 10 carries tension. As such, the design moment is based on the concrete strength, the steel strength, and the shear transfer between the two. The self-drilling, self-tapping stand-off screws 30 function as a shear transfer mechanism. Since the concrete 40 carries much of the compressive stresses that would otherwise have to be carried by the upper chord of the joist in a non-composite joist floor system, a composite joist floor system allows the upper chord 12 to be reduced in size and weight. In this way, the material used in the structure can be reduced to reduce weight and costs. Alternatively, the material that would otherwise have been used in the upper chord 12 can be transitioned to increase the size and strength of the lower chord 15 to achieve significant increases in load capacity without an increase in material. Therefore, in some embodiments of the present invention, the upper chord 12 of the joist 10 is smaller than the lower chord 15 or is formed from of lower strength material compared to the material used to form the lower chord 15.

Returning to FIGS. 1 and 2, as described above the end of the joist 10 is supported by a beam, wall, stud, or other structural member. In the illustrated example, the end of the joist 10 is supported by a steel wall stud 60. The end of the upper chord 12 has a shoe 70 for transferring forces from the joist 10 to the wall stud 60. In the illustrated embodiment, the shoe 70 is made up of a pair of metal angles welded to the bottoms of the upper chord's angles 13 and 14. Configured as such, the angles 13 and 14 that make up the upper chord 12 and the angles 71 and 72 that make up the joist shoe 70 combine to form an I-beam like bearing connection. The end of the end diagonal 25 is positioned between the shoe angles 71 and 72 and serves as a spacer between the shoe angles. In this regard, the shoe angles 71 and 72 are welded to the end diagonal 25 in addition to being welded to the upper chord angles 13 and 14.

The bottom surface of the joist shoe 70 rests upon the top surface of the wall 60. As illustrated in FIG. 2a, a distribution member 65 or header and/or a distribution track 62 or plate may be positioned between the top of the wall studs and the bottom of the joist shoe 70 to distribute force along the length of the wall 60. In other embodiments, as illustrated in FIGS. 1 and 2b, only a distribution plate 62 is used.

As further illustrated in FIGS. 1 and 2, in some embodiments of the composite joist floor system 1, the corrugated steel decking 20 does not extend significantly over the wall stud 60 or other supporting member. In this way, when the concrete 40 is placed over the steel decking 20, the concrete 40 may flow or be placed into the region 41 above the supporting wall 60. The concrete 40 in this region 41 encapsulates the ends of the upper chords 12 of each joist 10 and the ends of each joist shoe 70 and functions to help hold the joist shoes 70 in place at the top of the wall 60. The concrete 40 in the region 41 also forms a concrete beam extending over the wall 60 perpendicular to the joists 10. This concrete beam helps to collect and distribute forces being transferred between the walls and the floor. As illustrated in FIGS. 1 and 2, a z-shaped closure 50 and a pour stop 55 are used to contain the concrete 40 within the region 41 over the upper end of the wall 60. In addition to the structural benefits of a floor system having such a concrete beam, floor systems that allow the concrete 40 to contact the upper end of the wall 60, such as the floor systems illustrated in FIGS. 1 and 2, typically lead to improved fire-safety ratings and improved acoustic attenuation.

In the embodiment illustrated in FIG. 2a, a pour stop 55 is used to prevent the concrete 40 from flowing beyond the plane of the supporting wall 60 as the concrete 40 is curing. The pour stop 55 has a lower horizontal flange 58 and a vertical face 57. The horizontal flange 58 rests atop the distribution member 65 and may be coupled to the distribution member 65 by, for example, a self-tapping screw 56. The pour stop 55 is positioned such that the vertical face 57 is substantially within the same plane of the backside of the wall 60 so that the vertical face 57 of the pour stop 55 prevents the concrete from flowing beyond this plane. In a preferred embodiment, the pour stop 55 has a lip 59 at the top of the vertical face 57 that curves or is otherwise bent inward and downward toward the joist 10. The lip 59 prevents the vertical face 57 of the pour stop 55 from becoming separated from the concrete slab 40 and, therefore, prevents moisture from entering between the pour stop's vertical face 57 and the concrete 40. In other embodiments, the pour stop 55 may not include the lip 59. In one exemplary embodiment, the height of the pour stop 55 is sized such that a 2.5 to 3-inch deep 3000 pounds per square inch minimum compressive strength cast-in place concrete slab is created over the top of the corrugated steel decking 20.

Opposite the pour stop 55, a z-shaped closure 50 is provided. In combination with the joist 10 and the corrugated steel decking 20, the z-shaped closure 50 functions to contain the concrete 40 within the region 41 above the wall 60. FIG. 3 illustrates a portion of a z-shaped closure 50 in accordance with an embodiment of the present invention. As illustrated in FIG. 3, the z-shaped closure 50 has a generally vertical face 53, a generally horizontal upper flange 52 extending away from the wall 60, and a generally horizontal lower flange 51 extending in a direction opposite from the upper generally horizontal flange 52. In the illustrated embodiment, the vertical face 53 has a cutout 110 at one end. The cutout 110 has the shape of approximately one-half of an I-beam. This cutout 110 is configured to fit around at least one side of the I-beam formed by the combination of the upper chord 12 and the joist shoe 70, as illustrated in FIGS. 1 and 2. As also illustrated in FIGS. 1 and 2, the vertical face 53 of the z-shaped closure extends upwards further than the top of the upper chord 12 so that the generally horizontal upper flange 52 extends above at least one peak in the corrugated steel decking 20. Self-tapping screws 54a and 54b, welds, pneumatic pins, or a variety of other fasteners may be used to couple the generally horizontal lower flange 51 to the distribution member 65 and the generally horizontal upper flange 52 to a peak in the corrugated steel decking 20, respectively.

As illustrated in FIG. 3c, in some embodiments of the invention, the generally horizontal lower flange 51 is configured such that, before the z-shaped closure 50 is installed in the floor system 1, it forms an angle with the generally vertical face 53 that is greater than 90 degrees. For example, the z-shaped closure illustrated in FIG. 3c forms a 100-degree angle between the generally vertical face 53 and the generally horizontal lower flange 51. When such a z-shaped closure 50 is installed in the floor system 1, the z-shaped closure 50 may be pressed into position such that the angle between the generally vertical face 53 and the generally horizontal lower flange 51 is reduced to an angle closer to 90 degrees. When the z-shaped closure 50 is installed in this manner, the resilient bias of the z-shaped closure 50 will press the horizontal lower flange 51 against the top of the wall 60 and, thereby, create a better seal between the wall 60 and the z-shaped closure 50 than would have otherwise been formed using a z-shaped closure manufactured to have a 90-degree angle between the generally vertical face 53 and the generally horizontal lower flange 51.

As described above and as illustrated in FIGS. 1 and 2, the composite joist flooring system 1 includes a plurality of self-drilling, self-tapping stand-off screws 30 screwed through at least some of the valleys in the corrugated steel decking 20 and through a horizontal flange of the upper chord 12. As further illustrated, a portion of each self-drilling, self-tapping stand-off screw 30 continues to extend upwards above the corrugated steel decking 20 after the self-drilling, self-tapping stand-off screw 30 is fully installed through the decking 20 and the upper chord 12. The stand-off screw 30 has a lower collar 430 that functions to secure the corrugated steel decking 20 to the upper chord 12. The upper portion of the self-drilling, self-tapping stand-off screw that extends above the steel decking 20 becomes encapsulated within the concrete 40. In this way, the self-drilling, self-tapping stand-off screws 30 connect the joist's upper chord 12 to the concrete slab 40 allowing the joist 10 and concrete slab 40 to act as a unit, by transferring shear between the two joined components. In other words, the stand-off screws 30 cause the concrete slab 40 to function as the upper chord of the composite joist system with a much larger load carrying capacity than the joist's upper chord 12 alone. Specifically, tensile forces in the joist lower chord 15 are transferred to horizontal compressive forces in the concrete slab 40. The high compressive capacity of the concrete efficiently carries this compressive force.

In order for the self-drilling, self-tapping stand-off screws 30 to more uniformly transfer the horizontal shear loads along the length of the composite steel joist, the stand-off screws 30 are designed so that they are at least somewhat ductile. As the shank of the stand-off screws bends, shear load is shared with stand-off screws located more toward the middle of the joist span. However, in addition to being ductile enough to share the shear loads without breaking, the self-drilling, self-tapping stand-off screw 30 must also have sufficient hardness to allow it to drill through the corrugated steel decking 20 and the upper chord 12 of the joist 10. To accommodate both design requirements, the self-drilling, self-tapping stand-off screw 30 is specially heat treated so that the lower screw portion of the stand-off screw 30 has sufficient hardness for drilling while the upper portion remains sufficiently ductile.

FIG. 4a illustrates a side view of one of the self-drilling, self-tapping stand-off screws 30 illustrated in FIGS. 1 and 2 in accordance with an embodiment of the present invention. Each self-drilling, self-tapping stand-off screw 30 has an elongated shank 417 with an unthreaded shank portion 419 and integral threaded screw portion 418 having helical threads. The unthreaded shank portion 419 generally ranges from about two (2) inches to about four-and-a-half (4.5) inches in length depending on the application and the thickness of the concrete slab 40. The self-drilling, self-tapping stand-off screw 30 has a fluted drill tip 420 projecting from the lower end of the threaded screw portion 418. Located at the end of the stand-off screw 30 opposite the drill tip 420 is a driving head 421 configured to engage a driving tool capable of rotating the stand-off screw 30. An integral flange 426 is located between the threaded and unthreaded portions 418 and 419 of the stand-off screw 30 forming a lower collar 430 that is used to draw down the decking 20 during installation and hold the decking 20 firmly against the joist 10.

FIG. 4b illustrates a cross-sectional side view of the self-drilling, self-tapping stand-off screw 30 illustrated in FIG. 4a. The cross hatch pattern in FIG. 4b represents an area of the stand-off screw that is heat treated to a higher degree of hardness relative to the remainder of the stand-off screw, in accordance with an embodiment of the present invention. As illustrated in FIG. 4b, a lower portion of the self-drilling, self-tapping stand-off screw 30, including the drill tip 420 and at least some of the threads 428, is heat treated to a degree of hardness that enables the stand-off screw 30 to effectively drill and tap into the steel decking 20 and the joist's steel upper chord 12. In one embodiment, the self-drilling, self-tapping stand-off screws are comprised of stand-off screws described in U.S. Pat. No. 5,605,423 to Michael Janusz, which is incorporated herein by reference.

In one embodiment, the self-drilling, self-tapping stand-off screws are installed in every valley of the corrugated steel decking 20 along the length of the joist 10 as described, for example, in U.S. Pat. No. 5,605,423. However, in a preferred embodiment of the present invention, the self-drilling, self-tapping stand-off screws 30 are only installed as necessary for the particular composite joist floor system and its application. By providing increased spacing between at least some of the stand-off screws 30, such as by installing stand-off screws only in every other valley of the corrugated steel decking 20, the construction times and costs can be significantly reduced. Furthermore, the attachment patterns may be standardized for particular design scenarios in order to simplify installation of the self-drilling, self-tapping stand-off screws 30. For example, FIG. 5 illustrates an exemplary set of screw spacing standards that may be used in embodiments of the present invention.

Specifically, FIGS. 5a through 5d illustrate 1.0C-type steel decking having 32-inch wide coverage. FIG. 5a illustrates 32/3 spacing where each 32-inch width of corrugated steel decking 20 contains three self-drilling, self-tapping stand-off screws 30. FIG. 5b illustrates 32/4 spacing where each 32-inch width of corrugated steel decking 20 contains four self-drilling, self-tapping stand-off screws 30. FIG. 5c illustrates 32/5 spacing where each 32-inch width of corrugated steel decking 20 contains five self-drilling, self-tapping stand-off screws 30. FIG. 5d illustrates 32/6 spacing where each 32-inch width of corrugated steel decking 20 contains six self-drilling, self-tapping stand-off screws 30.

As illustrated in FIG. 1, it is generally preferable to drill adjacent self-drilling, self-tapping stand-off screws through the upper chord 12 on alternating sides of the web 18. For increased floor capacities, the quantity of self-drilling, self-tapping, stand-off screws may be increased as shown from FIG. 5a through FIG. 5d.

FIGS. 6-9 illustrate variations of the embodiment of the composite joist floor system described above in FIGS. 1-5. More particularly, FIG. 6 illustrates a composite joist floor system 600 in accordance with an embodiment of the present invention where the supporting member for supporting the end of the joist 610 includes a structural steel beam 660.

FIG. 7 illustrates a composite joist floor system 700 in accordance with an embodiment of the present invention where the supporting member for supporting the end of the joist 710 includes a masonry wall 760, such as a concrete block or a brick wall. In such an embodiment, the wall 760 may include a concrete-filled channel 765 running through the uppermost blocks or bricks in the wall 760 so that masonry screws may be inserted into the concrete to hold, for example, the pour stop 755 or the joist shoe 770 in place and so that the forces from the concrete floor slab are more evenly distributed throughout the wall 760. As also illustrated in FIG. 7, the concrete-filled channel 765 may have rebar 762 provided therein for reinforcing the concrete in the channel.

FIG. 8 illustrates a composite joist floor system 800 in accordance with an embodiment of the present invention where the supporting member for supporting the end of the joist 810 includes a concrete wall 860. FIG. 9 illustrates a composite joist floor system 900 in accordance with an embodiment of the present invention where the supporting member for supporting the end of the joist 910 includes a wood stud 960. In such an embodiment, two or more wood supporting members 965 may be used to distribute the force from the concrete slab throughout the wall. As illustrated, all of the floor systems shown in FIGS. 6-9 utilize many of the same structures and configurations describe above with reference to FIGS. 1-5.

FIG. 10 illustrates a sectional side view of composite joist floor system 1000 showing how a beam 1065 running substantially perpendicular to the joists may support the ends of two joists 1010a and 1010b on opposite sides of the beam 1065 in accordance with an embodiment of the present invention. Similar to the joist described above with respect to FIGS. 1 and 2, each joist 1010a and 1010b illustrated in FIG. 10 may include an upper chord 1012a and 1012b and a lower chord 1015a and 1015b separated by an open web formed from one or more rod-like members 1019a and 1019b. At the end of each joist 1010a and 1010b, a diagonal end member 1025a and 1025b extends from the lower chord 1015a and 1015b proximate the first web connection to the end of the upper chord 1012a and 1012b proximate the joist shoe 1070a and 1070b. Shoes 1070a and 1070b are attached to the ends of the upper chords 1012a and 1012b to form an I-beam configuration at the end of each joist 1010a and 1010b. The bottom surface of each shoe 1070a and 1070b is supported by the top surface of the beam 1065.

In the illustrated embodiment, the ends of the joists are configured such that they extend less than halfway across the beam 1065, thereby, creating a gap between the ends of the opposing joists. In the illustrated embodiment, the ends of the opposing joists 1010a and 1010b are seated on the beam 1065 at approximately the same location along the beams longitudinal axis. In other embodiments, however, the opposing joists 1010a and 1010b may be staggered along the longitudinal axis of the beam 1065.

As further illustrated by FIG. 10, each joist 1010a and 1010b supports corrugated steel decking 1020a and 1020b. The corrugated steel decking 1020a and 1020b is positioned such that the corrugations run perpendicular to the joists 1010a and 1010b. The corrugated steel decking 1020a and 1020b is also positioned such that the corrugated steel decking 1020a and 1020b on either side of the beam 1065 ends at or before the beam 1065. By ending the corrugated steel decking 1020a and 1020b at or before the beam 1065, an opening is created above the beam 1065 that exposes the top of the beam, the ends of the upper chords, and the ends of the joist shoes. When concrete is placed over the corrugated steel decking to form the concrete slab, concrete is permitted to flow or is placed into the opening above the beam 1065 to create a concrete distribution/collector beam that extends above the steel beam 1065 and encapsulates the ends of the upper chords and the joist shoes in the concrete 1040. Z-shaped closures 1050a and 1050b are positioned on either side of the beam 1065 to form the walls of a channel that the concrete is placed into and, thus, form the walls of the concrete distribution/collector beam.

More specifically, each z-shaped closure has a generally horizontal lower flange 1051a and 1051b that rests atop the steel beam 1065. A screw, weld, powder actuated fastener, pneumatic pin, or a variety of other fasteners may be used to couple each horizontal lower flange to the steel beam 1065. The generally horizontal upper flanges 1053a and 1053b of the z-shaped closures extend away from the beam 1065 and at least a portion of each horizontal upper flange 1053a and 1053b rests atop a peak in the corrugated steel decking 1020a and 1020b. A screw 1058 may be used to couple each horizontal upper flange 1053a and 1053b to a respective peak in the corrugated steel decking 1020a and 1020b. Each z-shaped closure 1050a and 1050b further includes a vertical face 1052a and 1052b extending between the upper and lower flanges to form the vertical walls of the channel. As described above with respect to FIG. 3, the vertical faces 1052a and 1052b have cutouts that allow the closures 1050a and 1050b to fit around the contours of the I-beam created by the ends of the upper chords and the joist seats.

As described above with respect to the FIGS. 1 and 2, self-drilling, self-tapping stand-off screws 1030a and 1030b are positioned through the corrugated steel decking and the upper chords of the joist in at least some of the valleys of the corrugated steel decking. In some embodiments, self-drilling, self-tapping stand-off screws 1031a and 1031b are also positioned in the flanges of the upper chords 1012a and 1012b proximate the ends of the upper chords in the region above the steel beam 1065.

FIG. 11 illustrates a sectional side view of a composite joist floor system 1100 showing where the corrugated steel decking 1120 is supported at its edge by a wall 1160 that runs substantially parallel to the joists 1110. The wall 1160 may be, for example, comprised of a plurality of steel studs. A cold-formed wall track 1162 may be positioned over the ends of the studs and may run along the top of the wall to distribute forces from the composite joist floor to the load bearing wall studs. A self-tapping screw 1161 may be drilled through a valley in the corrugated decking 1120 and into the cold-formed wall track 1162 to couple the edge of the concrete floor slab 1140 to the wall 1160. In some embodiments, the self-tapping screw 1161 may be a self-tapping, self-drilling stand-off screw, such as the one's described above with respect to FIG. 4.

As further illustrated in FIG. 11, the corrugated steel decking 1120 may, in some embodiments, only extend over a portion of the supporting wall 1160 so that the un-cured concrete 1140 can flow or be placed over the edge of the corrugated steel decking 1120 and onto the top of the cold-formed wall track 1162. If the floor is to end at the edge of the wall 1160, a pour stop 1155, such as the pour stop described above with respect to FIGS. 1 and 2, may be used to contain the un-cured concrete 1140 during concrete placement and curing.

As further illustrated, one or more self-drilling, self-tapping stand-off screws 1131 may be drilled through the cold-formed wall track 1162 in the region over the wall 1160 beyond the edge of the corrugated steel decking 1120. As will be described in greater detail below, using self-drilling, self-tapping stand-off screws 1131 in this manner at the tops of the walls or other supporting members can provide significant structural advantages. For example, in some embodiments, the cold-formed wall track 1162 is a cold-formed steel section that rests atop a plurality of the cold-formed steel wall studs. The stand-off screws 1131 installed along the top of the wall in the cold-formed steel wall track 1162 transfer forces between the cold-formed steel wall track 1162 and the concrete 1140 allowing the two structures to act more like a single unit. As such, the structure may be significantly stronger and/or material may be reduced in the cold-formed wall track 1162 used in the floor system. Furthermore, as will also be described in greater detail below, stand-off screws 1131 installed at the tops of shear walls may also have significant structural advantages with regard to transferring horizontal diaphragm forces from the floor to the shear wall.

In FIG. 11, the wall 1160 is the proper height to directly support the edge of the corrugated steel decking 1120. In other embodiments, however, z-shaped closures may be used at the inside edge of the wall to support the corrugated steel decking 1120. In this way, a larger concrete distribution/collector beam can be created over the top of the wall that can provide various structural advantages and improve the structures fire safety rating. For example, FIG. 12 illustrates a cross-sectional view of a composite joist floor system 1200 where an external masonry wall 1260 that is substantially parallel to the floor joist 1210 supports the edge of the corrugated steel decking 1220 using a z-shaped closures 1250 to support the edge of the corrugated steel decking 1220, in accordance with an embodiment of the present invention.

More particularly, the z-shaped closure 1250 comprises a generally horizontal lower flange 1251 that is coupled to the top of the wall 1260 by, for example, a masonry screw 1257. The z-shaped closure 1250 further comprises a generally horizontal upper flange 1253 that abuts and supports the lower side of the edge of the corrugated steel decking 1220. Self-tapping screws 1258 may be used to couple the valleys in the corrugated steel decking to the upper flanges of the z-shaped closure 1250. A vertical face 1252 extends between the upper and lower flanges 1253, 1251 and forms the walls of the concrete beam 1241.

Since the wall 1260 is an external wall, a pour stop 1255 is used to form the exterior wall of the concrete slab 1240 and beam 1241. The pour stop 1255 comprises a generally horizontal lower flange 1271 and a generally vertical face 1272. The generally horizontal lower flange 1271 may be coupled to the top of the wall 1260 by, for example, a masonry screw 1257. It should be appreciated that the length of the vertical faces of the pour stop 1255 and the z-shaped closure 1250 determine the size of the concrete distribution/ collector beam 1241 over the wall 1260 and the distance that this beam 1241 extends below the bottom of the decking 1220. Therefore, the pour stops 1255 and z-shaped closures 1250 can be varied to change the structural characteristics of the floor system depending on the design requirements. The pour stops 1255 and z-shaped closures 1250 can also be used to alter the noise attenuating and fire containing properties of the structure. Furthermore, when the supporting structure is a masonry wall such as in FIG. 12a, the height of the pour stop 1255 and z-shaped closure 1250 can be selected so that the height of the resulting concrete beam 1241 matches the masonry course height or some desired multiple thereof.

FIG. 12b illustrates an interior demising wall 1260b that is parallel to the floor joists 1210a, 1210b. Since the demising wall 1260b supports corrugated decking 1220a and 1220b on each side of the wall 1260b, two z-shaped closures 1250a and 1250b are used to support the decking 1220a and 1220b, respectively, and to create the walls of the channel that forms the concrete distribution/collector beam 1241b above the wall 1260b. Typically fire caulking is required at the top of a demising wall or some other fire stop must be installed in the corrugations of the metal decking 1220a and 1220b between the decking and demising wall in order to meet the proper fire safety design requirements. However, the z-shaped closures 1250a and 1250b may be used to create a concrete beam 1241b that is large enough and creates enough of a fire barrier so that additional fire proofing may not be required at the juncture between the floor and the demising wall. This can save significant time and cost during construction of the structure.

Flush Seat Configuration for Composite Joist Floor System

FIG. 13 illustrates a sectional side view of a composite joist floor system 1300 where the joist 1310 is supported by a wall 1360 running perpendicular to the joist 1310 in accordance with another embodiment of the present invention. The configuration of the joist 1310 and the joist shoe 1370 are generally similar to the joists and joist shoes described above, however, the composite joist floor system 1300 uses a "flush seat" configuration to support the end of the joist 1310.

Referring to FIG. 13, in the flush seat configuration the top of the upper chord 1312 is secured such that it is substantially flush with the top of the supporting member, such as the supporting wall or, in this case, a distribution member 1365 or header positioned at the top of a supporting wall 1360. The flush seat configuration includes a generally horizontal plate 1375 that is welded to the top surface of the end of the upper chord 1312. The horizontal plate 1375 extends beyond the end of the upper chord 1312 so that a portion of the plate 1375 rests upon the top surface of the distribution member 1365. In the illustrated embodiment, a substantially vertical plate 1377 extends downward from the horizontal plate 1375 at a location on the horizontal plate 1375 just beyond the end of the upper chord 1312. The vertical plate 1377 extends downward just below the lower surface of the joist shoe 1370. The joist shoe 1370 is welded to the joist such that it extends slightly (e.g., ¼ of an inch) beyond the end of the upper chord 1312. This slight extension of the joist shoe 1370 allows the vertical plate 1377 to be welded the horizontal plate 1375 without interfering with the end of the joist's upper chord 1312. The welding of the vertical plate 1377 to the bottom of the joist shoe 1370 applies the vertical load into the bottom of the joist shoe 1370 and minimizes eccentricity on the joist end.

In the flush seat configuration illustrated in FIG. 13, the corrugated steel decking 1320 extends over the horizontal plate 1375 and ends after it extends approximately half way (or, for example, at least 2.5 inches) across the supporting wall 1360. As also illustrated, in a preferred embodiment, the self-drilling, self-tapping stand-off screws 1320 installed into the joist's upper chord 1312 proximate to the flush seat configuration are preferably positioned closer to each other than the typical spacing of the self-drilling, self-tapping stand-off screws along the joist 1310.

FIG. 14 illustrates another embodiment of a flush seat configuration where two opposing joists 1410a and 1410b are supported by the same steel beam 1460. In the illustrated composite joist floor system 1400, the horizontal plates 1475a and 1475b, the vertical plates 1477a and 1477b, and the joist shoes 1470a and 1470b are each configured similar to the corresponding plates and shoes described above with reference to FIG. 13. In FIG. 14, however, the corrugated steel decking 1420 extends from the first joist 1410a completely over the beam 1460 to the second joist 1410b.

FIG. 15 illustrates a flush shoe configuration 1500 where the flush bearing seat 1574 is configured specifically for a masonry-type support member, such as a block wall, in accordance with an embodiment of the present invention. Specifically, the portion of the horizontal plate 1575 extending beyond the vertical plate 1577 is bent downward. In this way, the horizontal plate 1575 is pre-bent to concentrate the downward force more toward the center of the concrete channel 1565 rather than toward the top inside corner of the top block in the masonry wall 1560.

Diaphragm Attachment Using Stand-Off Screws

FIGS. 16a and 16b illustrate a top view and a side section view, respectively, of a composite floor system 2700 in accordance with an embodiment of the present invention. Specifically, FIGS. 16a and 16b illustrate how the composite floor system 2700 may be configured to transfer horizontal diaphragm shear forces 2705 from the concrete slab 2740 to the primary support structures, such as a cold-formed steel shear-wall 2760, in accordance with an embodiment of the present invention. In addition to transferring horizontal diaphragm loads from the slab to the wall, the techniques described herein also provide for the transfer of other forces between the two structures. For example, the force exerted by wind blowing against the an exterior wall can be transferred from the wall to the concrete slab more efficiently using the systems described herein. The corrugated decking 2720 and the concrete slab 2740 are not shown in FIG. 16a for clarity.

As illustrated in FIGS. 16a and 16b, in addition to the friction between the concrete slab 2740 and the top of the wall 2760, embodiments of the present invention use two primary techniques for transferring diaphragm shear forces from the concrete slab 2740 to the shear wall 2760. In some embodiments of the present invention both techniques are used together, while in other embodiments of the present invention one or none of the techniques may be used. In the first technique, the joist shoes 2770 are attached to the top of the wall 2760 by, for example, self-drilling screws 2780 or other fasteners. By securing the ends of the joists 2710 to the top of the wall 2760 and by using the self-drilling stand-off screws 2730 to couple the joist to the concrete slab as described above, the shear forces are transferred from the slab 2740 into the joist 2710 by the stand-off screws 2730 and then from the joist 2710 into the wall 2760 by the self-drilling screw 2780 or other fastener used to attach the joist 2710 to the wall 2760.

As illustrated in FIG. 16b, in one embodiment of the floor system, the joist shoes 2770 extend over the supporting wall 2760 beyond the end of the joist's upper chord 2712 so that there is sufficient room for the self-drilling screws to be drilled through the joist shoe 2770 and into the top of the wall 2760 and/or distribution plate 2762. In some embodiments, self-tapping, self-drilling stand-off screws are used to fasten the joist shoes 2770 to the wall 2760.

In the second technique for transferring horizontal diaphragm forces from the concrete slab 2740 to the shear wall 2760, self-drilling stand-off screws 2785, which may be the same size as or a different size from the stand-off screws 2730 installed in the decking 2720 and joists 2710, are installed into the top of the wall 2760 (or distribution plate 2762, member, wall track, or header, as the case may be) at design spacing. These stand-off screws 2785 then function to transfer the diaphragm shear forces from the concrete 2740 to the wall 2760. As described above, in preferred embodiments, the stand-off screws 2785 are heat treated in such a way that the lower portion of the screw has a greater hardness than the upper shank portion of the screw.

FIG. 16a illustrates an exemplary embodiment of the invention where a single row of stand-off screws 2785 are installed into the top of wall 2760. In other embodiments, more than one row of stand-off screws 2785 may be installed into the top of the wall 2760. Where more than one row of stand-off screws 2785 are used, the rows may be aligned and have the same screw spacing such that each stand-off screw 2785 is installed next to a corresponding stand-off screw in the other row(s). In other embodiments, the rows may be configured such that they are not aligned and/or have different screw spacings such that the stand-off screws 2785 are staggered relative to the stand-off screws 2785 in the other row(s).

FIG. 17 illustrates a side section view of a portion of the floor system 2700 at an external wall that is substantially parallel to the floor joists 2710, in accordance with an embodiment of the present invention. As illustrated in FIG. 17, two rows of stand-off screws 2785 are installed into the top of the wall 2760 to transfer horizontal diaphragm forces from the concrete slab 2740 to the external wall 2760. As described above, although two side-by-side rows of stand-off screws 2785 are illustrated in the FIG. 17, in other embodiments any number of rows may be used and the rows may be staggered relative to each other.

Although FIGS. 16 and 17 illustrate external walls, the stand-off screws can also be used in a similar manner to transfer diaphragm forces from the concrete slab 2740 to interior walls or support beams, as the case may be. In this regard, FIG. 18 illustrates an interior support wall 2761 in which stand-off screws 2785 have been installed into the top of the wall 2761 to transfer diaphragm forces from the concrete slab 2740 to the wall in accordance with an embodiment of the present invention.

Furthermore, although the figures illustrate installation of the stand-off screws 2785 into cold-formed steel wall studs and steel distribution plates or wall tracks, the stand-off screws may be similarly used in support structures made of other materials. For example, stand-off screws may be used at the tops of masonry walls or wood-framed walls. In such embodiments, the stand-off screws are preferably modified such that the stand-off screws have threads and hardnesses that are tailored to meet the requirements of the material being driven into. Exemplary stand-off screws specifically configured for installation into wood or masonry support structures are described in greater detail below.

Composite Wood Joist Floor System

FIG. 19 illustrates a composite joist floor system 2100 where the joists 2110 are made of wood in accordance with an embodiment of the present invention. As illustrated, the wood joists may comprise solid wood beams 2110b or wood trusses or I-beams 2110a. In the case of wood trusses or I-beams 2110a, the chords and the webs (which may be open webs or closed webs) may both be made of wood or, in other embodiments, the chords may be made of wood and the webs may comprise another material such as a metallic material. The wood joists 2110 are covered by a forming material 2120, which may be wood flooring, light gauge metal decking, or some other material. The stand-off wood screws 2130 are then installed through the flooring 2120 and into the joists 2110. In one embodiment, the forming material 2120 is pre-punched so that the stand-off wood screws 2130 can be installed therethrough without having to drill through the forming material 2120. Whether the forming material 2120 is pre-punched or not, the clamping collar 2126 on the stand-off wood screw 2130 draws the flooring 2120 tight against the wooden floor joist. A cementitious floor topping is placed over the forming material 2120 and encapsulates the stand-off shank portion of the stand-off wood screw 2130. As described above with respect to other embodiments of the present invention, the stand-off screws 2130 result in a stiffer and stronger wooden floor system by causing the cementitious floor topping to effectively function as an upper chord of the wood floor joists.

FIG. 20 illustrates a side view of a stand-off wood screw 2130 illustrated in FIG. 19, in accordance with an embodiment of the present invention. Each stand-off wood screw 2130 has an elongated shank 2217 with an unthreaded shank portion 2219 and integral threaded screw portion 2218 having helical threads. The threaded screw portion 2218 is configured to have a wood screw thread pattern. As illustrated in FIG. 19, the threaded screw portion 2218 may vary in length depending on the size and type of wood joist 2110a, 2110b used in the flooring system 2130.

The unthreaded shank portion 2219 may also vary in height depending on the thickness of the cementitious topping 2140 that is planned for the floor system 2100. For example, the unthreaded shank portion 2219 may typically range from about one (1) inch to about four-and-a-half (4.5) inches in length depending on the application and the thickness of the cementitious material. Located at the end of the stand-off wood screw 2130 opposite the drill tip 2222 is a driving head 2221 configured to engage a driving tool capable of rotating the stand-off wood screw 2130. In one embodiment, the driving head 2221 comprises a hexagonal head configured to mate with a hexagonal socket. An integral angular flange or clamping collar 2226 is located between the threaded and unthreaded portions 2218 and 2219 of the stand-off screw 2130. As described above with reference to FIG. 19, this clamping collar 2226 functions to draw the forming material 2120 down against the wood joist 2110. In one embodiment, a portion of the stand-off wood screw 2130 is unthreaded 2216 below the clamping collar 2226 between the clamping collar 2226 and the threaded screw portion 2218.

The stand-off wood screw is generally relatively ductile so that the screw may bend slightly with movement of the cementitious topping material and not break under the shear loads that the stand-off screw 2130 will likely experience under load. Furthermore, the fact that the stand-off screws are at least somewhat ductile allows a stand-off screw 2130 to share the shear loads in cementitious material with neighboring stand-off screws.

In other embodiments of the stand-off wood screw 2130, however, the screw may have a uniform hardness since the hardness required to drill into the wood floor may be soft enough to prevent the screw from breaking under the shear loads presented by the cementitious flooring layer 2140.

Stand-off wood screws 2130 of the type illustrated in FIG. 20 are not limited to use with wood joists and may also be used in conjunction with other wood structural members. For example, where wood distribution members or headers are used at the top of a support wall and where the concrete or cementitious material contacts the top of the wall, the stand-off wood screws 2130 can be installed into the wood distribution member or header to form a composite distribution member or header and/or to transfer diaphragm forces from the cementitious material to the wall.

Composite Cold-Formed Steel Joist Floor System

In some embodiments of the present invention, various different types of cold-formed steel floor joists are used in addition to or as an alternative to open web steel joists. For example, FIG. 21 illustrates three different exemplary cold-formed steel floor joists 2310a, 2310b, and 2310c. In each of these examples, self drilling, self-tapping stand-off screws 2330 are installed through the corrugated steel decking 2320 and into the cold formed steel floor joist 2310 and function to pull the decking 2320 against the joists 2310. The stand-off portion of the screws 2330 are then encapsulated in the concrete slab 2340 providing a composite structure that increases the stiffness and load carrying capacity of the floor.

Cold-Formed Steel Composite Header

In some embodiments of the present invention, one or more headers are used at the tops of supporting walls and/or over, doors, windows, or other openings in the walls. In conventional floor systems designed for heavy loads, the connections between the header and the jambs at either side of the opening are often some of the most expensive connections within the wall system since the load of the floor above the opening must be properly distributed to wall structures on either side of the opening. Embodiments of the present invention provide a floor system that has a composite header design that may reduce the cost of these connections.

FIGS. 22a and 22b illustrate a composite floor system 2400 having a composite header configuration in accordance with and embodiment of the present invention. In the illustrated embodiment, the header 2480 is a cold-formed steel header comprised of a plurality of cold-formed steel sections. Specifically, the header 2480 is comprised of two opposing C-sections 2464 and two opposing tracks 2462. As illustrated in FIG. 22b, the header 2480 generally spans an opening 2405 in the wall 2460. The header is generally supported on each end by a jamb 2406. As described above, z-shaped closures 2450 and pour stops 2455 can be used to define a channel over the top of the wall 2460. Concrete 2440 can be placed in this channel and cured to form a concrete distribution/collector beam 2441 on the top of the wall 2460 and extending over the header 2480. As illustrated in FIGS. 22a and 22b, one or more self-drilling, self-tapping stand-off screws 2485 may be installed into the header 2480 prior to the concrete placement. These stand-off screws 2485 may be of the same type and size as the stand-off screws 2430 installed into the upper chords of the joist 2410 or they may be of a different size and/or type as required by the design parameters.

When the concrete 2440 is placed over the wall 2460 and allowed to cure, the upper stand-off portions of the screws 2485 become encapsulated within the concrete beam 2441. In this way, a composite header is formed and loads in the cold-formed steel header 2480 may be transferred into the concrete beam 2441 and vice versa such that the concrete beam and the cold-formed steel header 2480 function as a single unit. By locking the concrete to the header via composite action, the cold-formed steel header 2480 may be constructed of a lighter gauge material. Conversely, the composite header can safely support increased vertical loads with reduced deflection compared to a normal non-composite header. The composite header may also reduce costly header-to-jamb connections for heavy loads by distributing much of the shear at the ends of the header into the jambs through the concrete. With the composite header, some of the vertical load will be transferred through the concrete slab into the jambs. This contrasts with a normal header where all of the vertical load must be transferred out of the header via direct connections between the header and the jambs. As further illustrated in FIG. 22a, in some embodiments of the invention the self-drilling, self-tapping stand-off screws 2485 also function to attach the z-shaped closure 2450 and the pour stop 2455 to the cold-formed steel header 2480.

FIG. 22a also illustrates how, in some embodiments, the joist seat or shoe 2470 may be spaced apart from the joist's upper chord 2412 and connected by the end diagonal 2425 and/or other connecting members 2426. Such a configuration in combination with appropriately sized z-shaped closures 2450 and pour stops 2455 allow for variations in the height of the concrete distribution/collector beam 2441 that is formed above the wall 2460.

Improved Stand-Off Screw and Composite Floor System for Transferring Forces Between the Concrete Slab and the Support Structures FIG. 23 illustrates a composite floor and wall system 2500 in accordance with another embodiment of the present invention. As described above, a concrete floor system may comprises rebar 2545 embedded within the concrete 2540 to reinforce the concrete slab 2540. In general, the rebar is spaced both perpendicular and parallel to the walls. In some embodiments, the perpendicular and parallel rebar members are welded or otherwise coupled together at their intersections to form a welded wire fabric. These welds may be made before or after positioning the rebar over the corrugated decking 2520 in the floor system. In other embodiments, the rebar may be positioned in other formations in the concrete slab based on the particular design requirements.

FIG. 23 illustrates an embodiment of the present invention where rebar 2545 in the concrete slab 2540 is coupled to a stand-off screw 2585 installed into the top of a supporting wall 2560. Specifically, FIG. 23 illustrates the top of a masonry wall 2560. The masonry wall 2560 may comprise a concrete-filled channel 2565 running through the uppermost blocks or bricks in the wall 2560 so that masonry screws may be inserted into the concrete and so that forces from the floor may be more evenly distributed throughout the wall 2560. As also illustrated in FIG. 23, the concrete-filled channel 2565 may have rebar 2562 provided therein for reinforcing the concrete in the channel 2565. In general, when standard masonry screws or stand-off screws 2585 having masonry threads are installed into the concrete, the concrete is pre-drilled to provide a hole for the masonry screw or stand-off screw to be threaded into.

As described above, a stand-off screw 2585 may be installed into the top of a supporting wall 2560 and z-closures 2550 and pour stops 2555 may be used to create a concrete distribution/collector beam 2541 at the top of the wall that encapsulates the stand-off end of the stand-off screw 2585. As also described above, installing the stand-off screws 2585 into the top of the wall in this manner creates composite action between the concrete beam 2541 and the wall 2560 or the header, as the case may be. The stand-off screws 2585 also function to transfer horizontal diaphragm forces from the concrete slab 2540 to the shear wall 2560. To improve the connection between the floor and the wall and to, thereby, improve the transfer of forces between the floor and the wall and increase the composite action so that the walls and the floors function more like a single unit, embodiments of the present invention couple the end of each rebar member 2545 that intersects with the wall 2560 to the top of a stand-off screw 2585 installed in the top of the wall 2560. In an exemplary embodiment of the present invention, specially-designed stand-off screws are used that allow the rebar to be more easily coupled to the stand-off end of the screw.

For example, FIGS. 23 and 24 illustrate a stand-off screw 2585 configured to attach to a rebar member or some other extension member at the end of the screw opposite the screw's tip 2587, in accordance with an embodiment of the present invention. As illustrated in FIG. 24, the stand-off screw 2585 generally comprises a lower threaded portion 2586 and an upper un-threaded shank portion 2588. In the illustrated embodiment, the lower threaded portion 2586 comprises threads configured for drilling into concrete or other masonry materials. In other embodiments, the lower threaded portion 2586 may be configured for drilling into other materials such as steel or wood. Similar to the stand-off screws described above with respect to FIG. 4, the stand-off screw 2585 may be specially heat treated so that tip and a lower portion of the screw is harder than the upper portion of the screw.

Similar to other stand-off screws described above, the stand-off screw 2585 illustrated in FIGS. 23 and 24 generally has a driving head 2592, such as a hexagonal head, proximate to the end of the screw opposite the tip 2587 and configured to engage a driving tool capable of rotating the stand-off screw 2585. However, unlike the other stand-off screws described above, this stand-off screw 2585 has an extension coupling portion 2593 located above the driving head 2592 at the extreme end of the stand-off screw 2585.

The extension coupling portion 2593 is configured to couple to a rebar member in the floor system or some other member that will effectively extend the length of the stand-off screw 2585. In the embodiment illustrated in FIGS. 23 and 24, the extension coupling portion 2593 comprises a threaded portion. As illustrated in FIG. 23, a couple nut 2595 having two opposing female connectors may be used to join the end of the stand-off screw 2585 to the end of the rebar member 2545 or other extension. Where the end of the stand-of screw 2585 is threaded, at least one of the female connectors in the couple nut 2595 has corresponding threads so that the couple nut may be screwed on to the end of the stand-off screw 2585. In one embodiment, the end rebar member 2545 is also threaded and screws into the second female connector of the couple nut 2595. In other embodiments, the second female connector of the couple nut 2595 is not threaded and is configured to receive and hold the end of the rebar 2545 therein by other means. For example, an adhesive, a fastener, and/or a weld may be used to hold the end of the rebar in the end of the couple nut 2595 at least until the concrete 2540 cures around the connection.

Of course, the stand-off screw 2585 illustrated in FIG. 24 may also be used without connecting it to a rebar member to perform the functions of the stand-off screws described above with respect to other embodiments of the present invention. For example, FIGS. 25 and 26 illustrate embodiments of the present invention in which the stand-off screw 2585 is being used for functions other than or in addition to coupling the wall to a rebar member in the floor.

More particularly, FIG. 25 illustrates a stand-off screw 2585 used to attach a joist shoe 2570 to the supporting wall 2560 in accordance with an embodiment of the present invention. In the illustrated embodiment, the supporting wall 2560 is a masonry wall and the joist shoe 2570 is extended to allow for installation of the stand-off-screw 2585 therethrough. In the illustrated embodiment, where the joist shoe 2570 is metal and the wall is masonry, the stand-off screw 2585 used in this system will generally have threads designed for drilling into masonry and the joist shoe 2570 may be pre-punched or drilled to allow the lower threaded portion of the screw 2585 to pass therethrough. Preferably, if the joist is pre-punched or pre-drilled, the pre-punched pr pre-drilled hole has a diameter greater than the diameter of the screw's lower threaded portion but less than the diameter of the screw's clamping collar 2590.

FIG. 26 illustrates how the stand-off screws 2585 may also be used to attach a z-shaped closure 2550 and a pour stop 2555 to a wall 2560, while also functioning to couple rebar 2545 to the wall 2560 and/or to transfer horizontal diaphragm forces from the slab 2540 to the wall 2560. Where the z-shaped closure 2550 and the pour stop 2555 are metal and the wall 2560 is masonry, the z-shaped closure 2550 and the pour stop 2555 are generally pre-punched to have holes at the required design intervals to allow the threaded portions of the stand-off screws 2585 to pass therethrough.

As described above, extension members other than rebar may also be coupled to the ends of the stand-off screws 2585. For example, in an embodiment of the present invention where the concrete distribution/collector beam that is to be formed over a supporting wall is particularly large, the stand-off screws 2585 available may be shorter than what would be ideal for coupling the concrete distribution/collector beam to the wall. In such an embodiment, extensions may be added to the end of the stand-off screw 2585, via a couple nut or via other fastening systems, to increase the length of the stand-off screw 2585 and/or to change the shape of the end of the stand-off screw 2585.

Therefore, it should be appreciated that the improved stand-off screw 2585 illustrated in FIGS. 23-26 permits the efficient transfer of diaphragm loads from the concrete floor slab into the supporting walls. This may be particularly advantageous for structures having masonry supporting walls. The conventional method of joining a masonry wall to a concrete floor would be to embed rebar into the masonry wall during construction of the wall such that portions of the rebar extend out of the top of the masonry wall. In this conventional method, the reinforcing bars present a trip hazard for any one walking on the top of the wall during construction of the structure. In contrast to the conventional method, the stand-off screws 2585 can be installed just prior to the placing of the concrete floor slab, thereby reducing the tripping potential. Furthermore, the stand-off screw 2585 installation does not require skilled labor and the installation spacing is easily adjusted to match the design diaphragm shear loads.

Balcony Configuration for Composite Joist Floor System

FIGS. 27a and 27b illustrate a composite joist floor system 1600 configured to provide for a balcony 1680 that extends from the structure parallel to the floor joists 1610a, 1610b, and 1610c, in accordance with an embodiment of the present invention. Specifically, FIG. 27a illustrates a cross-sectional front view of the composite joist floor system 1600, including the backspan 1685 used to support the cantilevered balcony 1680. FIG. 27b illustrates a cross-sectional side view of the composite joist floor system 1600. To sufficiently support the balcony 1680, the composite joist backspan 1685 must generally be thicker than the rest of the composite joist floor. Therefore, in order to maintain a level floor, the corrugated steel decking 1621 must be lowered to accommodate the increased concrete thickness in the backspan 1685. As such, additional angles 1687 are welded to the sides (e.g., the vertical webs 1611) of the joists 1610a-c to provide seats for the edges of the corrugated steel decking 1621 below the level of the standard corrugated steel decking 1620. Since joist 1610b is a standard joist, the upper chord 1612 of the joist 1610b is encapsulated in concrete within the backspan 1685.

To prevent concrete from pouring out of the gaps between the standard corrugated steel decking 1620 and the lowered corrugated steel decking 1621, a couple of different closures are used. For example, as illustrated in FIG. 27a, z-shaped closures 1650 are positioned such that the horizontal lower flange is coupled to the peaks in the lower corrugated steel decking 1621 and the horizontal upper flange is coupled to the peaks of the standard corrugated steel decking 1620. Angle-shaped closures 1654 may be used to substantially prevent concrete 1640 from escaping through the corrugations under the lower flanges of the z-shaped closures 1650 and under the lower corrugated steel decking 1621. As illustrated in FIG. 27b, z-shaped closure 1652 is positioned along the rear of the backspan 1685 such that the horizontal lower flange extends below at least one valley in the lower corrugated steel decking 1621 and the horizontal upper flange extends over at least one peak in the standard corrugated steel decking 1620.

FIGS. 28a and 28b illustrate a composite joist floor system 1700 configured to provide for a balcony 1780 that extends from the structure perpendicular to the floor joists 1710a, 1710b, and 1710c, in accordance with an embodiment of the present invention. Specifically, FIG. 28a illustrates a cross-sectional side view of the composite joist floor system 1700, including the backspan 1785 used to support the cantilevered balcony 1780. FIG. 28b illustrates a cross-sectional front view of the composite joist floor system 1700 and specifically illustrates stepped joist 1710c. To sufficiently support the balcony 1780, the composite joist backspan 1785 must generally be thicker that the rest of the composite joist floor. Therefore, in order to maintain a level floor, the corrugated steel decking 1721 must be lowered relative to the standard corrugated steel decking 1720 to accommodate the increased concrete thickness in the backspan 1785. As such, an additional angle 1787 is welded to the side (e.g., the web) of the joist 1710b to provide a seat for one edge of the corrugated steel decking 1721 below the level of the standard corrugated steel decking 1720. In some embodiments, where the backspan is under a certain size, the lowered corrugated steel decking 1721 may be supported by the angle 1787 on one side and the wall 1760 or other supporting member on the other. However, in the illustrated embodiment, a joist 1710c is required to provide additional support for the backspan 1785 midway between the wall 1760 and the joist 1710b.

FIG. 28b illustrates joist 1710c in accordance with an embodiment of the present invention. Specifically, joist 1710c has a step down in its span to support the corrugated steel decking 1721 of the backspan. FIGS. 28a and 28b also illustrate how z-shaped closures and angle-shaped closures may be used to prevent concrete from pouring out of the gaps between the standard corrugated steel decking 1720 and the lowered corrugated steel decking 1721. As illustrated in FIG. 28a, z-shaped closure 1752 is positioned along the rear of the backspan 1785 such that the horizontal lower flange is coupled to the peaks in the lower corrugated steel decking 1721 and the horizontal upper flange is coupled to the peaks of the standard corrugated steel decking 1720. Angle-shaped closures 1754 may be used to substantially prevent concrete 1740 from escaping through the corrugations under the lower flange of the z-shaped closure 1752 and under the lower corrugated steel decking 1721. As illustrated in FIG. 28b, z-shaped closures 1752 are positioned on either side of the backspan 1785 such that the horizontal lower flanges each extend below at least one valley in the lower corrugated steel decking 1721 and the horizontal upper flanges each extend over at least one peak in the standard corrugated steel decking 1720.

FIG. 29 illustrates a composite joist floor system 1800 where the concrete floor ends at a joist 1810 in accordance with an embodiment of the present invention. In such a system, the joist 1810 supports one end of the corrugated steel decking 1820 by a portion of a horizontal flange of the upper chord 1812. The remainder of the upper chord 1812 supports a bent plate, such as a quarter-inch bent plate, that has a substantially horizontal portion 1856 that extends outward away from the joist 1810 and then bends upward at a right angle to form a substantially vertical portion 1857. The vertical portion 1857 is used to contain the concrete 1840 when it is placed over the steel decking 1820. An angle-shaped closure 1855 may be used over the end of the corrugated steel decking 1820 to prevent the placed concrete from escaping through the gaps between the corrugated steel decking 1820 and the upper chord 1812 of the joist 1810. In one embodiment, one or more head studs 1831 are welded to the vertical portion 1857 and extend inward from the vertical portion 1857 toward the joist 1810 so that they are encapsulated by the concrete 1840. Preferably, steel reinforcing bars and/or welded wire fabric 1845 is also encapsulated within the concrete 1840 to provide additional reinforcement for the concrete.

Corridors and Mechanical Headers for Supporting Heavy Loads

Many structures require one or more corridors in which HVAC, plumbing, and other large and sometimes heavy loads may be routed. For example, the main pipes and ducts in a structure are often hung from the ceiling of such a corridor. FIG. 30 illustrates a composite joist floor system 1900 where a joist 1910 interacts with a corridor 1980 running perpendicular to the joist 1910 in accordance with an embodiment of the present invention. As can be seen in FIG. 30, the configuration of the joist and the steel decking, load bearing wall studs, concrete, and closures supported by the joist are similar to those described above with respect to other embodiments of the invention. A supporting wall 1960 or other supporting member will typically be located where the joist 1910 intercepts the corridor 1980. For example, the end of the joist 1910 may be supported by the wall studs in the manner described above with reference to FIGS. 1 and 2.

In contrast to the other floor systems described above, the floor spanning the corridor 1980 may not require a joist since the corridor is generally relatively narrow. As such, the corridor 1980 may comprise corrugated steel decking spanning the corridor by extending from the supporting wall 1960 to another supporting wall (not shown) on the other side of the corridor 1980, the corrugations of the corrugated steel decking 1982 being substantially perpendicular to the walls. Since the concrete 1940 located over the corrugated steel decking 1982 in the corridor is generally thicker than the concrete located over the standard corrugated steel decking 1920 and since heavy loads are often hung from the ceiling in the corridor, the corrugated steel decking 1982 used in the corridor 1980 is typically of a stronger design than the standard corrugated steel decking 1920 used in many other areas of the structure. For example, in one embodiment, the corrugated steel decking over the corridor is a 2-inch deep corrugated steel composite floor decking.

In some instances, the vertical loads generated from hanging pipes, ducts, or other mechanical equipment cannot be safely supported by inserting mechanical anchors through the metal deck into the concrete slab. As such, in some embodiments, mechanical headers are used to provide support for mechanical equipment that cannot be safely hung from the floor spanning the top of the corridor. FIG. 31 illustrates a composite joist floor system 3000 having a corridor 3080 running perpendicular to the joists 3010*a* and 3010*b* and having a mechanical header 3090, in accordance with an embodiment of the present invention. As illustrated, the mechanical header 3090, which is generally made of steel, spans the corridor 3080 and is supported at each end by supporting walls or beams 3060*a* and 3060*b*. Typically the mechanical headers span a distance that ranges from 6 to 15 feet. In this way, the mechanical header 3090 provides support points for the heavy mechanical items, such as ducts 3001 and/or pipes 3002, to hang in the corridor 3080.

FIG. 32 provides a more detailed illustration of the mechanical header 3080 illustrated in FIG. 31, in accordance with an exemplary embodiment of the present invention. As illustrated, the mechanical header 3080 may be comprised of a first angle 3081 and a second angle 3082. The first angle 3081 and the second angle 3082 may be oriented relative to each other so that they combine to approximately form a "U" shape and so that a flange of the first angle 3081 at least partially overlaps a flange of the second angle 3082. The two overlapping flanges may then be coupled together by, for example, one or more welds, fasteners, adhesives, or other coupling techniques.

A third angle 3085 and a fourth angle 3086 are welded or otherwise coupled to each end of the U-shaped member formed by the combination of the first angle 3081 and the second angle 3082. As illustrated in FIG. 31, the third angle 3085 and the fourth angle 3086 rest on top of the supporting walls or beams 3060*a* and 3060*b*, respectively, and function as the seats for the mechanical header 3090. In a preferred embodiment of the mechanical header 3090, the third angle 3085 and the fourth angle 3086 on each end of the header 3090 are sufficiently narrow such that the flanges that rest on top of the supporting walls or beams 3060*a* and 3060*b* fit between the corrugations of the corridor's decking 3020*c*. This may make installation of the mechanical header 3090 easier and allows the decking 3020*c* to bear uniformly on the top of the supporting wall or beam 3060*a* and 3060*b* as opposed to being lifted up to travel over the seats of the mechanical header 3090.

Referring again to FIG. 32, in some embodiments of the invention, the mechanical header 3090 has one or more holes 3083 punched or otherwise formed into the bottom flange of the header 3090 to provide anchor points for hanging equipment from the header. In one embodiment, the holes 3083 are pre-punched at a predetermined spacing, such as every six inches, to allow for flexibility in where items can be hung once the mechanical header is installed.

FIG. 31 illustrates how threaded rods 3095 may be inserted through the pre-punched holes 3083 in the header 3090 to suspend various mechanical and/or HVAC equipment, such as ducts 3001 and/or pipes 3002, in the corridor 3080, in accordance with an embodiment of the present invention. In a preferred embodiment, no specialty connectors or clamps are required to hang the ducts. Instead, one merely inserts a threaded rod 3095 through the pre-punched holes 3083 in the bottom flange of the mechanical header 3090 and threads a nut onto the threaded rod 3095 above the bottom flange. A lower support plate 3096 or section having holes punched therethrough may be used to span two threaded rods 3095 to provide support for pipes, ducts, or other equipment. The two threaded rods 3095 are inserted through the holes in the support plate 3096 and nuts are threaded onto the threaded rods 3095 below the support plate 3096. Adjustments in the vertical location of the support plate 3096 can be made by adjusting the length of the threaded rods 3095 and/or the position of the nuts on the threaded rods.

Although embodiments of the present invention described herein are generally described as providing a floor structure for a building, it will be apparent to one of ordinary skill in the art than other embodiments of the present invention can be similarly used to provide a roof or ceiling structure for a building. Likewise, although some embodiments of the present invention are described as providing a balcony structure for a building, other embodiments of the present invention can be similarly used to provide an overhang structure for a building.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:
1. A building structure comprising:
 a plurality of floor joists;
 one or more support structures for supporting the plurality of floor joists, wherein the one or more support structures at least comprise a wall with a plurality of studs and an upper wall member;
 decking operatively coupled to the plurality of floor joists;
 a plurality of decking stand-off fasteners operatively coupling the decking to the plurality of floor joists;
 a plurality of support stand-off fasteners extending from the one or more support structures, wherein the plural- ity of support stand-off fasteners at least extend from the upper wall member of the wall with the plurality of studs;

wherein a cementitious slab is formed over the decking operatively coupled to the plurality of floor joists and over at least one of the one or more support structures;

wherein the cementitious slab encapsulates at least a portion of the plurality of decking stand-off fasteners and the plurality of support stand-off fasteners; and wherein the plurality of decking stand-off fasteners and the plurality of support stand-off fasteners help transfer forces between the cementitious slab, the decking, the plurality of floor joists, and the one or more support structures.

2. The building structure of claim 1, further comprising a closure positioned at a top of the wall to form a channel for the cementitious slab over the wall.

3. The building structure of claim 2,
wherein one or more of the plurality of support stand-off fasteners operatively couple the closure to the top of the wall.

4. The building structure of claim 1, wherein one or more of the plurality of support stand-off fasteners operatively couple one or more of the plurality of floor joists to the one or more support structures.

5. The building structure of claim 1, wherein the plurality of floor joists each comprise:
an upper chord;
a lower cord:
a web operatively coupled to the upper chord and the lower chord; and
a joist shoe on at least one end of the floor joist; and
wherein the joist shoe is located between the upper chord and the lower chord and is operatively coupled to one of the one or more support structures.

6. The building structure of claim 5, wherein the joist shoe is spaced apart from the upper chord and the lower chord.

7. The building structure of claim 5, wherein the joist shoe extends beyond at least a portion of the upper chord to provide sufficient room for utilizing a tool to operatively couple the joist shoe to the one of the one or more support structures.

8. The building structure of claim 5, further comprising:
a closure positioned at a top of one of the one or more support structures to form a channel for the cementitious slab over the top of the one of the one or more support structures; and
rebar located within the channel.

9. The building structure of claim 8, wherein the rebar is located below or adjacent to the upper chord.

10. The building structure of claim 1, wherein the plurality of decking stand-off fasteners and the plurality of support stand-off fasteners are configured for transferring horizontal diaphragm forces.

11. The building structure of claim 1, wherein the plurality of decking stand-off fasteners and the plurality of support stand-off fasteners comprise a lower stand-off portion and an upper stand-off portion, wherein the upper stand-off portion is configured for encapsulation in the cementitious slab.

12. The building structure of claim 11, wherein the lower stand-off portion of the plurality of decking stand-off fasteners and the plurality of support stand-off fasteners have a greater hardness than that of the upper stand-off portion of the plurality of decking stand-off fasteners and the plurality of support stand-off fastener.

13. The building structure of claim 11, wherein the upper stand-off portion of the plurality of decking stand-off fasteners and the plurality of support stand-off fasteners are more ductile than the lower stand-off portion of the plurality of decking stand-off fasteners and the plurality of support stand-off fasteners.

14. The building structure of claim 1, wherein each of the stand-off fasteners comprises a lower screw portion and an upper stand-off portion, wherein the lower screw portion of the decking stand-off fasteners is screwed through the decking and into the plurality of floor joist, the lower screw portion of the support stand-off fasteners is screwed into the one or more support structures, and wherein the upper stand-off portion of the decking stand-off fasteners extends from the decking and the plurality of floor joists and is encapsulated within the cementitious slab located above the decking and the plurality of floor joists, and the upper stand-off portion of the support stand-off fasteners extends from the one or more support structures and is encapsulated within the cementitious slab located above both the one or more support structures.

15. The building structure of claim 14, wherein the lower screw portion comprises a self-tapping tip for drilling into the metallic structure.

16. The building structure of claim 1, further comprising:
a welded wire fabric encapsulated within the cementitious slab.

17. A building structure comprising:
a plurality of floor joists, wherein the plurality of floor joists each comprise:
an upper chord;
a lower cord:
a web operatively coupled to the upper chord and the lower chord; and
a joist shoe on at least one end of the floor joist; and
wherein the joist shoe is located between the upper chord and the lower chord, is spaced apart from the upper chord and the lower chord, and is operatively coupled to one of the one or more support structures;
one or more support structures for supporting the plurality of floor joists;
decking operatively coupled to the plurality of floor joists;
a plurality of decking stand-off fasteners operatively coupling the decking to the plurality of floor joists;
a plurality of support stand-off fasteners extending from the one or more support structures;
wherein a cementitious slab is formed over the decking operatively coupled to the plurality of floor joists and over at least one of the one or more support structures;
wherein the cementitious slab encapsulates at least a portion of the plurality of decking stand-off fasteners and the plurality of support stand-off fasteners; and
wherein the plurality of decking stand-off fasteners and the plurality of support stand-off fasteners help transfer forces between the cementitious slab, the decking, the plurality of floor joists, and the one or more support structures.

18. The building structure of claim 17, further comprising:
a closure positioned at a top of the wall to form a channel for the cementitious slab over the wall; and
wherein one or more of the plurality of support stand-off fasteners operatively couple the closure to the top of the wall.

19. The building structure of claim 17, wherein the plurality of decking stand-off fasteners and the plurality of support stand-off fasteners are configured for transferring horizontal diaphragm forces.

20. The building structure of claim 17, wherein each of the stand-off fasteners comprises a lower screw portion and an upper stand-off portion, wherein the lower screw portion of the decking stand-off fasteners is screwed through the decking and into the plurality of floor joist, the lower screw portion of the support stand-off fasteners is screwed into the one or more support structures, and wherein the upper stand-off portion of the decking stand-off fasteners extends from the decking and the plurality of floor joists and is encapsulated within the cementitious slab located above the decking and the plurality of floor joists, and the upper stand-off portion of the support stand-off fasteners extends from the one or more support structures and is encapsulated within the cementitious slab located above both the one or more support structures.

* * * * *